United States Patent
Lurie et al.

(10) Patent No.: US 11,928,705 B2
(45) Date of Patent: Mar. 12, 2024

(54) INSTANT REBATES FOR DEMAND RESPONSE ENROLLMENT AND CLAWBACKS

(71) Applicant: Simple Energy, Inc., Boulder, CO (US)

(72) Inventors: Yoav Lurie, Boulder, CO (US); Justin Segall, Boulder, CO (US); Michel Jaroenvanit, Boulder, CO (US); John Vajda, Boulder, CO (US); Sean McColgan, Broomfield, CO (US); Jarod Earl Stewart, Louisville, CO (US); Nicolae Radu Girleanu, Broomfield, CO (US); Ilya A. Sukhanov, Boulder, CO (US); Michael Konrath, Boulder, CO (US)

(73) Assignee: Uplight, Inc., Boulder, CO (US)

( * ) Notice: Subject to any disclaimer, the term of this patent is extended or adjusted under 35 U.S.C. 154(b) by 392 days.

(21) Appl. No.: 16/197,259

(22) Filed: Nov. 20, 2018

(65) Prior Publication Data

US 2019/0130434 A1    May 2, 2019

Related U.S. Application Data

(63) Continuation-in-part of application No. 16/052,283, filed on Aug. 1, 2018, now Pat. No. 10,332,144,
(Continued)

(51) Int. Cl.
*G06Q 30/02* (2023.01)
*G06F 9/00* (2006.01)
(Continued)

(52) U.S. Cl.
CPC .......... *G06Q 30/0239* (2013.01); *G06F 9/00* (2013.01); *G06F 16/9535* (2019.01);
(Continued)

(58) Field of Classification Search
CPC .......... G06Q 30/02–0277; G06Q 50/06; G06F 16/9535; H04L 29/08162
See application file for complete search history.

(56) References Cited

U.S. PATENT DOCUMENTS

| 7,720,708 B1 * | 5/2010 | Elkins, II ........... G06Q 30/0207 705/14.23 |
| 10,068,245 B2 | 9/2018 | Lurie et al. |

(Continued)

FOREIGN PATENT DOCUMENTS

| KR | 1020140088093 A | 7/2014 |
| WO | 2018081011 A1 | 5/2018 |

OTHER PUBLICATIONS

Alvarez, Raquel, "Office Action Regarding U.S. Appl. No. 16/052,283", dated Oct. 26, 2018, p. 17, Published in: US.

(Continued)

*Primary Examiner* — Raquel Alvarez
(74) *Attorney, Agent, or Firm* — Neugeboren O'Dowd PC

(57) ABSTRACT

Systems, methods, and apparatus are disclosed for providing instant rebates before a transaction is completed. This involves ingest of customer and rebate data from two or more utilities, where the data is parsed and normalized into a standard format across all of the utilities. The customer data is then stored in an accounts database, while the rebate data is further processed along with utility rebate rules to determine a set of device and demand response rebate eligibilities for a variety of scenarios. The resulting rebate profiles can be stored in a rebates database and linked to corresponding customer account data in the accounts database. Third-party frontends can then request rebate eligibility based on a customer identifier and retail channel, and various services can work in tandem to query the rebated database and return a set of eligibilities with so little latency (Continued)

that the eligibility check appears instant from a customer's standpoint.

12 Claims, 42 Drawing Sheets

Related U.S. Application Data which is a continuation of application No. 15/791,011, filed on Oct. 23, 2017, now Pat. No. 10,068,245.

(60) Provisional application No. 62/588,910, filed on Nov. 20, 2017, provisional application No. 62/532,269, filed on Jul. 13, 2017, provisional application No. 62/412,743, filed on Oct. 25, 2016.

(51) Int. Cl.
*G06F 16/9535* (2019.01)
*G06Q 30/0207* (2023.01)
*G06Q 50/06* (2012.01)
*H04L 12/28* (2006.01)
*H04L 67/1006* (2022.01)

(52) U.S. Cl.
CPC ......... *G06Q 30/02* (2013.01); *G06Q 30/0222* (2013.01); *G06Q 30/0224* (2013.01); *G06Q 30/0236* (2013.01); *G06Q 50/06* (2013.01); *H04L 12/2838* (2013.01); *H04L 67/1006* (2013.01)

(56) References Cited

U.S. PATENT DOCUMENTS

| | | | |
|---|---|---|---|
| 2002/0147663 A1 | 10/2002 | Walker et al. | |
| 2009/0070273 A1* | 3/2009 | Moryto | G06Q 50/188 705/80 |
| 2009/0259538 A1 | 10/2009 | Miller et al. | |
| 2010/0010658 A1 | 4/2010 | Etheredge et al. | |
| 2014/0188295 A1 | 7/2014 | Saito et al. | |
| 2014/0188583 A1 | 7/2014 | Thatcher | |
| 2016/0371762 A1* | 12/2016 | Fergis | G06Q 30/0631 |

OTHER PUBLICATIONS

Gruber, Stephen, "Response to Office Action Regarding U.S. Appl. No. 16/052,283", dated Jan. 25, 2019, p. 11, Published in: US.
Kim, Yeonkyung, "International Search Report and Written Opinion Re Application No. PCT/US2017/057901", dated Jan. 30, 2018, p. 11.
Alvarez, Raquel, "Final Office Action Regarding U.S. Appl. No. 15/791,011", dated May 29, 2018, p. 13, Published in: US.
Alvarez, Raquel, "Office Action Regarding U.S. Appl. No. 15/791,011", dated Dec. 19, 2017, p. 13, Published in: US.
Simple Energy Inc., "Demand Response Enrollment Center Overview", "Known to exist as early as Oct. 2017", p. 9, Published in: US.
Gruber, Stephen, "Response to Office Action Regarding U.S. Appl. No. 15/791,011", dated Mar. 19, 2018, p. 21, Published in: US.
Gruber, Stephen, "Response to Final Office Action Regarding U.S. Appl. No. 15/791,011", dated Jun. 19, 2018, p. 11, Published in: US.

* cited by examiner

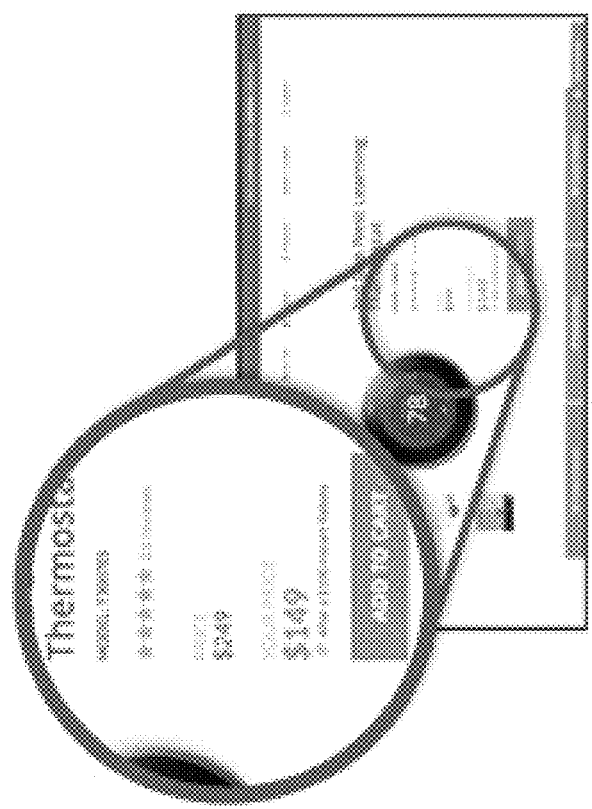
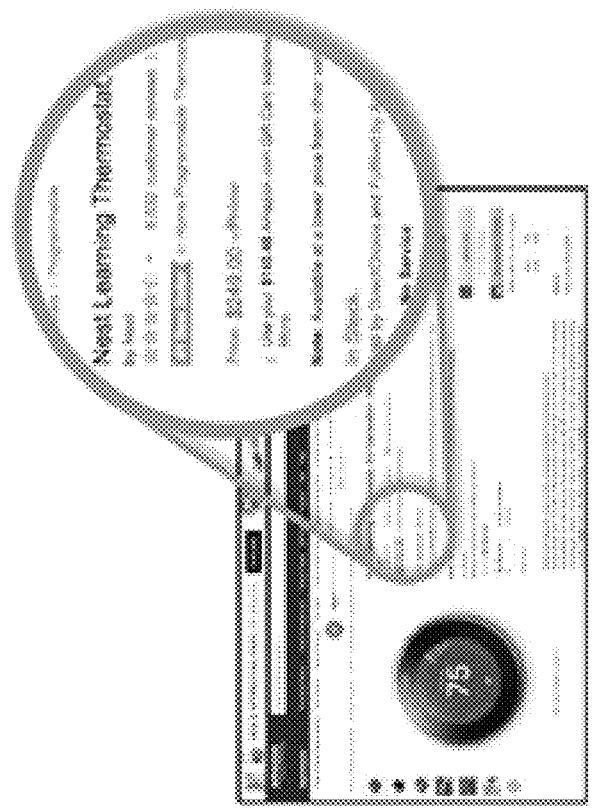
FIG. 1

Apply Rebates Step 1/2

You must agree to the following in order to redeem instant rebates.

- I am an O&R, NY residential electric customer with central Air Conditioning.
- I am an O&R, NY residential natural gas heating customer.
- I agree to participate in O&R's Bring Your Own Thermostat Program and accept the Terms and Conditions. I understand that my thermostat may be adjusted briefly during times of peak demand and that I may opt-out at any time.
- This device will be installed in my permanent residence in NY, which is serviced by O&R, and will control my central air conditioning unit.

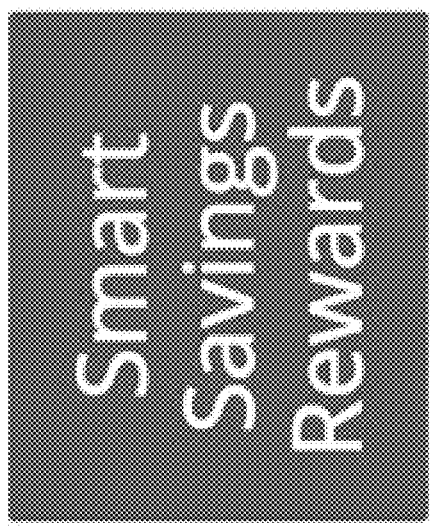
FIG. 39

FIG. 40

Thank you for placing your order! Your thermostat will be shipped within 1-2 business days.

To complete your enrollment in the Smart Savings Rewards program, please install your thermostat and connect it to Wi-Fi and central air conditioning within 60 days of purchase.

| Item | Qty | |
|---|---|---|
| Nest Thermostat E | 1 | $169.00 |

| | |
|---|---|
| Subtotal | $169.00 |
| Discount | $135.00 |
| Shipping | FREE |
| *Tax | $13.52 |
| **Total Charge | $47.52 |

SHIPPING ADDRESS
_____

*State law requires us to collect taxes on the value of items prior to discounts.
**Your card will be charged as displayed ($95 on January 15, 2018 if you do not install and connect the smart thermostat to Wi-Fi and central air conditioning by that date.

FIG. 41

INSTANT REBATES FOR DEMAND RESPONSE ENROLLMENT AND CLAWBACKS

CROSS REFERENCE TO RELATED APPLICATIONS

The present application for patent is a continuation-in-part of U.S. patent application Ser. No. 16/052,283, filed Aug. 1, 2018, entitled "ENERGY PRODUCT INSTANT REBATE ENGINE," which is a continuation of U.S. patent application Ser. No. 15/791,011, filed Oct. 23, 2017, and issued as U.S. Pat. No. 10,068,245, entitled "ENERGY PRODUCT INSTANT REBATE ENGINE," which claims priority to U.S. Provisional Application No. 62/532,269, entitled "ENERGY PRODUCT INSTANT REBATE ENGINE AND CUSTOMER ENGAGEMENT ENGINE," filed Jul. 13, 2017, and U.S. Provisional Application No. 62/412,743, entitled "ENERGY PRODUCT INSTANT REBATE ENGINE AND CUSTOMER ENGAGEMENT ENGINE," filed Oct. 25, 2016. The present application for patent also claims priority to Provisional Application No. 62/588,910, entitled "INSTANT REBATES FOR DEMAND RESPONSE ENROLLMENT AND CLAWBACKS," filed Nov. 20, 2017, and assigned to the assignee hereof and hereby expressly incorporated by reference herein.

FIELD OF THE DISCLOSURE

The present disclosure relates generally to energy rebates, and more specifically to instantly pre-checking rebate eligibility before a customer makes a purchase of an energy-saving product. In particular, but not by way of limitation, the present disclosure relates to systems, methods and apparatuses for providing instant rebates to customers who may agree to enroll in a demand response program while purchasing an energy-saving product.

DESCRIPTION OF RELATED ART

Over $700 mm is spent annually on residential demand response programs. Much of this is used to fund incentives for customers to install a smart thermostat and enroll it in a Bring Your Own Device (BYOD) program. Currently, demand response programs offer rebates, but rebate eligibility checking and redemption often takes weeks to complete. Typically, a user purchases an energy-saving device, installs it, and then sends in rebate forms including an application to enroll in and receive an up-front rebate for participating in a demand response program. The utility company then takes weeks to process the rebate and send a check. There is a desire for systems, methods, and apparatus that can provide a rebate for participation in a demand response program at the time of purchasing an energy-saving device, such as a smart thermostat.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect of the disclosure can be characterized as a method for determining product rebate eligibility before a transaction is completed. The method can include providing an ingest subsystem, providing a rebate rules registry in communication with the ingest subsystem, providing an accounts database in communication with the ingest subsystem, and providing a rebates database in communication with the rebate rules registry. The method can also include parsing and normalizing customer and rebate data, via the ingest subsystem, the data sourced from two or more utility companies. Before the parsing and normalizing, formats of the customer and rebate data across the two or more utility companies is inconsistent. The parsing and normalizing can form normalized customer data and normalized rebate data, and can transform it into a format that is consistent across all of the two or more utility companies. The method can further include storing persistent utility rebate rules in a rebate database, wherein the persistent utility rebate rules constitute rebate eligibility parameters that apply to at least two of the two or more utilities. The method yet further includes storing runtime rebate rules in the rebate database, wherein the runtime rebate rules represent rebate eligibility parameters for a provider of energy-saving products and are customer-specific. The method also includes storing the normalized customer data in the accounts database. The method further includes passing the normalized rebate data from the ingest subsystem to the rebate rules registry. The method yet further includes applying, via the rebate rules registry, the persistent utility rebate rules to the normalized rebate data to generate rebate profiles, and storing the rebate profiles in the rebate database. The rebate profiles can include a plurality of rebate eligibilities for a plurality of redemption scenarios, yet each rebate profile is not customer-specific. After application of the runtime rules, the rebate profiles can be validated for a given customer.

Another aspect of the disclosure can be characterized as a non-transitory, tangible processor readable storage medium, encoded with processor executable code to perform a method for determining product rebate eligibility before a transaction is completed. The method can also include parsing and normalizing customer and rebate data, via the ingest subsystem, the data sourced from two or more utility companies. Before the parsing and normalizing, formats of the customer and rebate data across the two or more utility companies is inconsistent. The parsing and normalizing can form normalized customer data and normalized rebate data, and can transform it into a format that is consistent across all of the two or more utility companies. The method can further include storing persistent utility rebate rules in a rebate database, wherein the persistent utility rebate rules constitute rebate eligibility parameters that apply to at least two of the two or more utilities. The method yet further includes storing runtime rebate rules in the rebate database, wherein the runtime rebate rules represent rebate eligibility parameters for a provider of energy-saving products and are customer-specific. The method also includes storing the normalized customer data in the accounts database. The method further includes passing the normalized rebate data from the ingest subsystem to the rebate rules registry. The method yet further includes applying, via the rebate rules registry, the persistent utility rebate rules to the normalized rebate data to generate rebate profiles, and storing the rebate profiles in the rebate database.

The rebate profiles can include a plurality of rebate eligibilities for a plurality of redemption scenarios, yet each rebate profile is not customer-specific. After application of the runtime rules, the rebate profiles can be validated for a given customer.

In another aspect, a method for determining product rebate eligibility before a transaction is completed is described. The method can include accessing customer and rebate data from two or more energy utility companies, the customer and rebate data including at least a customer identifier, customer address, rebates used by the customer, and optionally rebates that the customer is eligible for according to utility records, the formats of the customer and rebate data across the two or more energy utility companies being inconsistent. The method can further include parsing and normalizing the customer and rebate data into a format that is consistent across all of the two or more energy utility companies. The method can further include storing at least the customer identifier and customer address in an accounts database. The method can yet further include storing utility rebate rules and frontend rebate rules in a rebates database, and passing the customer identifier, customer address, rebated used by the customer and rebates that the customer is eligible for (if available) to a rebate rules registry. The method can yet further include generating rebate profiles, via the rebate rules registry, by applying the utility rebate rules to the customer and rebate data and storing the rebate profiles in the rebates database. The method can further include receiving, at a rebates broker module: (a) a first indication that a customer has selected a product for viewing at a website or app interface of: (1) one of the utility companies; (2) an online retailer of energy-saving products for home/commercial/industrial spaces; (3) a manufacturer of energy-saving products for home/commercial/industrial spaces; or (4) a brick-and-mortar retailer of energy-saving products for home/commercial/industrial spaces. The method can further include, receiving at the rebates broker module: (b) a second indication of a channel of trade; (c) a third indication of a utility company associated with the customer; and (d) optionally a fourth identification of the customer. The method can further include passing the first, second, third, and optionally the fourth identifications to a rules engine, the rules engine querying the rebates database for rebate eligibilities matching the first, second, third, and if available, the fourth indications; returning the rebate eligibilities to the rebates broker module; and returning, via the rebates broker module, the rebate eligibilities to the website or app interface. The method can further include storing the rebate eligibilities on a storage device supporting the website or app interface, and selecting one of the rebate eligibilities based on a product that the customer selects for viewing.

The method can yet further include: the website or app interface passing an indication of a completed transaction, include a rebate redemption indicator and a product purchased, to the broker module; and the broker module passing the rebate redemption indicator to an RRTS module, which provides a report of multiple rebate redemption indicators to the two or more utility companies and updates the rebate profiles in the rebates database to show new numbers of rebates that have been redeemed.

Another aspect of the disclosure can include a system for instant rebates. The system can include a secure server with a utility data input configured to receive raw (1) customer account data and (2) raw rebate eligibility and value data from a utility company. The system can further include an ingest server comprising: a customer profile output; an a rebate profile output; a data validation module stored on a first memory and executable on a first processing portion to access utility data on the secure server and analyze this utility data to determine if the utility data meets a set of recognized formats, and if it does not, then returning an error log, configured for transmission to a corresponding utility company, the error log detailing portions of the utility data that failed to match the set of recognized formats, the data validation module generating validated utility data; a normalization module stored on the first memory and executable on the first processing portion to transform the validated utility data into normalized utility data by adjusting formatting in the validated utility data that does not match preconfigured formats, wherein the normalization module splitting the normalized utility data into customer profiles and rebate profiles and providing these to the corresponding customer profile output and rebate profile output. The system can further include an accounts database coupled to the customer profile output. The system can also include a rebates database coupled to the rebates profile output and a database-to-services API. The system can yet further include a plurality of services running on one or more servers comprising: a broker service; a rules engine; an accounts service; and a rebates consolidation service. The method can further include a services to third-party API configured to: expose a third-party application's rebate to services; expose eligibility data from the services to the third-party application corresponding to the rebate; and receive transaction data from a computing device on which the third-party application is running. In an embodiment, each customer profile can include at least a customer's utility company, location, number of previous energy-related product purchases, and identifiers of previous energy-related products purchased.

In yet another aspect, the disclosure can be described as a method of validating rebate eligibility before a transaction is completed. The method can include (1) ingest, (2) rebate profiles creation, (3) instant eligibility, and (4) checkout. Ingest can include receiving or accessing utility data including customer account data and rebate data describing previous rebate redemptions for the customers. Ingest can then include parsing and normalization of the utility data into a format that is consistent across all of the utilities. This may include a custom mapping algorithm for each utility that maps the disparate utility data into the standard format. Validation can also be performed on the utility data to ensure that a minimum set of fields are met by the data. If not, or if any errors occur during ingest, then an error log can be passed back to corresponding utilities asking for corrections to the utility data. Rebate profiles creation can include passing the rebate rules data to a rebate rules registry (this data optionally including [utility, customer, address, eligible rebates (optional), rebates used] or [utility, eligible rebates]), which accesses utility rules and vendor rules stored in the rebates database, and applying these rules to the rebate data to generate rebate profiles to also be stored in the rebates database. Instant eligibility can include a customer viewing products which triggers a frontend to make an API call to a broker for a set of rebate eligibilities to cover some or all products that the customer may view. The call can include data such as a customer account number, customer address, customer utility, and list of products that eligibility is requested for. The broker can instruct a rules engine to access the rebates database and find a set of rebate scenarios in the rebate profile corresponding to the customer that match the info included in the call to the API (e.g., retail channel, customer information, list of products). The rules engine can pull all eligible scenarios without much processing, since the rebate eligibility has been largely pre-processed by the rebate rules registry. Some vendor or runtime rules may be processed, but these typically use far less processing power than processing of the utility rules. The rules engine then passes the results back to the broker, which passes these back to the frontend via the API. The frontend can then present eligible rebates to the customer as the customer looks at various products, without having to do an eligibility check on a product-by-product basis as the customer switches between products. Once checkout is complete, all rebate redemptions are pushed to a rebate redemption transaction service, which collects all redemptions and updates the rebates database and the utilities.

In one aspect a method is disclosed for reducing latency in product rebate eligibility. The method can include ingesting customer and rebate data from one or more utility companies, via an ingest subsystem, to form normalized customer data and normalized rebate data, wherein the normalized rebate data includes rebate rules specific to ones of the one or more utility companies. The method can include storing persistent utility rebate rules in a rebates database, wherein the persistent utility rebate rules constitute rebate eligibility parameters. The method can include storing runtime rebate rules in the rebates database, wherein the runtime rebate rules represent rebate eligibility parameters for a provider of energy-related products and are customer-specific. The method can include applying, via a rules engine, the persistent utility rebate rules to the normalized rebate data to generate rebate profiles, and storing the rebate profiles in the rebate database, wherein the rebate profiles include a plurality of rebate eligibilities for a plurality of redemption scenarios, and wherein each rebate profile is not customer-specific. The method can include querying, via the rules engine, the rebates database for ones of the rebate profiles corresponding to a customer identification received from an API of a frontend client service. The method can include applying, via the rules engine, the runtime rebate rules to the rebate profiles to identify one or more customer-specific rebates, wherein the one or more customer-specific rebates is a demand response enrollment rebate. The method can include returning, via the rules engine, the customer-specific rebate to the API, so that the one of the frontend client services that provided the customer identification can apply the customer-specific rebate to a customer's purchase.

In one aspect a non-transitory, tangible processor readable storage medium, encoded with processor executable code to perform a method for determining product rebate eligibility before a transaction is completed is disclosed. The method can include ingesting customer and rebate data from one or more utility companies, via an ingest subsystem, to form normalized customer data and normalized rebate data. The method can include storing persistent utility rebate rules in a rebates database, wherein the persistent utility rebate rules constitute rebate eligibility parameters. The method can include storing runtime rebate rules in the rebate database, wherein the runtime rebate rules represent rebate eligibility parameters for a provider of energy-related products and are customer-specific. The method can include applying, via a rules engine, the persistent utility rebate rules to the normalized rebate data to generate rebate profiles, and storing the rebate profiles in the rebate database, wherein the rebate profiles include a plurality of rebate eligibilities for a plurality of redemption scenarios, and wherein each rebate profile is not customer-specific and each rebate profile being unique to one of the utility companies and applicable to all customers of the one of the utility companies. The method can include providing an API in communication with the broker module and the accounts service, and configured to interface with one or more frontend client services hosted on one or more frontend devices, the one or more frontend client services configured for interfacing with customers of the one or more utility companies. The method can include receiving a customer identification at the broker module from one of the frontend client services. The method can include calling, via the broker module, the rules engine, with the customer identification as an input. The method can include querying, via the rules engine, the rebates database for ones of the rebate profiles corresponding to a customer identification received from an API of a frontend client service. The method can include applying, via the rules engine, the runtime rebate rules to the rebate profiles to identify one or more customer-specific rebates, wherein the one or more customer-specific rebates is a demand response enrollment rebate. The method can include returning, via the rules engine, the customer-specific rebate to the API, so that the one of the frontend client services that provided the customer identification can apply the customer-specific rebate to a customer's purchase.

In another aspect, a method for enrolling an energy-related device in a demand response program during checkout and generating an instant demand response rebate during the checkout is disclosed. The method can include receiving a purchase selection of a customer of an energy-related device at a front end device. The method can include verifying, via a rebates engine, eligibility of the energy-related device and customer for a demand response rebate and a demand response enrollment, both the demand response rebate and demand response enrollment associated with a utility. The method can also include applying the demand response rebate to the energy-related device at the front end device during purchase of the energy-related device. The method can further include communicating, via the rebates engine, a confirmed order to an orders component. The method can also include communicating, via the orders component, the confirmed order of the energy-related device to an e-commerce engine and a demand response enrollment component. The method can yet further include generating, via a vendor and the e-commerce engine, an identification of the energy-related device. The method can further include initiating, via a customer communication component, an email communication campaign with the customer. The method can also include communicating the energy-related device's identification information to the rebates engine. The method can yet further include confirming, via the rebates engine, an installation and a communication between the energy saving device and the utility. The method can also include communicating, via the rebates engine, confirmation of the installation and the communication to the demand response enrollment component. The method can yet further include ending, via the customer communication component, the email communication campaign.

BRIEF DESCRIPTION OF THE DRAWINGS

FIG. 1 shows one embodiment of a frontend user interface (on the right) as implemented by a utility company and compared to an equivalent AMAZON user interface (on the left);

FIG. 17 illustrates another user interface that can be displayed on a frontend;

FIG. 25 illustrates another user interface that can be displayed on a frontend;

FIG. 26 illustrates another user interface that can be displayed on a frontend;

FIG. 27 illustrates another user interface that can be displayed on a frontend;

FIG. 39 illustrates an exemplary energy-saving device selection view on an e-commerce engine in accordance with embodiments discussed herein;

FIG. 40 illustrates an exemplary embodiment of a terms and conditions agreement view in accordance with embodiments discussed herein;

FIG. 41 illustrates an exemplary confirmation view of an enrolled energy-saving device

DETAILED DESCRIPTION

Figure 2:
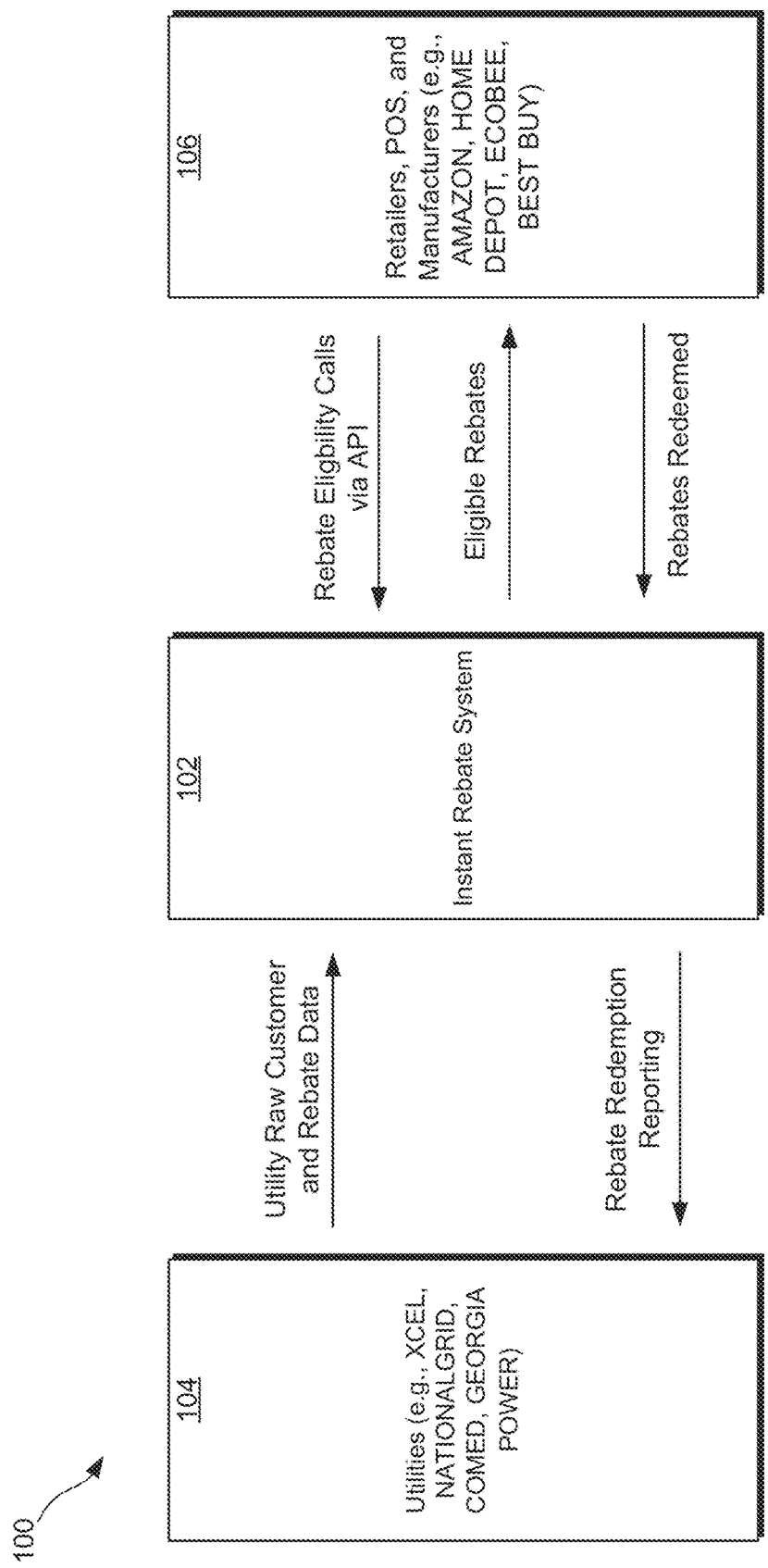
FIG. 2 shows one method of operating marketplace system for instant rebate eligibility.

The word "exemplary" is used herein to mean "serving as an example, instance, or illustration." Any embodiment described herein as "exemplary" is not necessarily to be construed as preferred or advantageous over other embodiments.

Preliminary note: the flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the purposes of the present application, "instant rebate" refers to rebates whose eligibility and application to a transaction occur before the transaction is competed (e.g., during checkout when purchasing an energy-saving device).

For purposes of this disclosure, a "frontend" is a client-side service, device, or customer interface. Specifically, various services and databases will be described that determine rebate eligibility and track rebate redemption. These will generally be referred to as the server side of the system. The frontend or client side are those services, devices, and/or interfaces that interact with the server side, but are also responsible for interfacing directly with customers. The frontend can include frontend client services hosted on vendor server devices or customer devices. In some cases, the frontend refers to both the frontend client service and the device hosting the frontend client service. In yet other cases, the frontend can include the frontend client service, a device or devices hosting the client server, and a customer device that the hosting device or devices send an app or browser interface to.

For purposes of this disclosure, a "rebate" is a monetary incentive provided by a utility company and regulated by a state or federal agency. However, in some cases, a rebate can include incentives and promotions such as those that do not involve monetary rewards and/or are not regulated. Non-monetary rewards can include gift cards, product giveaways, opportunities (e.g., tickets) to participate in a product giveaway, and user profile points that can be earned toward digital award thresholds and used for comparison and competition with neighbors and other customers of a given utility. Non-regulated rebates, rewards, or incentives can also be generated by channels other than a utility (e.g., a retailer or manufacturer can provide a rebate, reward, or incentive).

Instant Rebate Generation

Implementing an instant rebate system is more complex than one would at first assume. For instance, the system should act as an interface between three disparate parties: the utility, the customer, and the product vendor/manufacturer. The system may also address situations where the energy-saving device (or other energy-related device such as those that consume or store energy) is not installed within a time limit required by the rebate (in traditional systems this situation is addressed by merely not paying the rebate until the device is installed). This disclosure will hereafter refer to "energy-related devices," which may include energy-saving, energy storing, or energy consuming devices (e.g., a smart thermostat, smart water heater or controller, EV charger, networked outlet, networked light bulb, etc.). The system may also address issues suggested below by also pre-enrolling the energy-related device so that the device is automatically enrolled once it comes online and is connected to a valid HVAC system.

Systems, methods, and apparatus are disclosed for providing instant rebates before a transaction is completed. The eligibility can be returned to frontend systems (e.g., website user interface or an app user interface to name two) such as utility company websites, manufacturer websites, and retailer websites.

This involves ingest of customer and rebate data from two or more utilities, where the data is parsed and normalized into a standard format across all of the utilities. One existing challenge with instant rebates is addressing the plethora of data formats provided by a plethora of different utility companies. Thus, standardizing ingest is a key to instant rebates in the utility space. The customer data is then stored in an accounts database, while the rebate data (e.g., a rebate "program" or rebate rules that apply to all customers of a utility, but differ between utilities) is further processed along with persistent utility rebate rules to determine a set of rebate profiles, each rebate profile being unique to a utility and applicable to all customers of a utility. Each utility can have multiple rebate profiles. For instance, there may be a rebate profile applicable to a first category of products (e.g., thermostats) while another rebate profile is applicable to a second category of products (e.g., lighting or demand response enrollment). The resulting rebate profiles can be stored in a rebates database and associated with the corresponding utility. Third-party frontends can then request rebate eligibility based on a customer identifier and retail channel, and various services can work in tandem to query the rebate database and return a customer-specific rebate with so little latency that the eligibility check appears instant from a customer's standpoint. Runtime or vendor rebate rules can also be stored in the rebates database and can be applied to the rebate profiles to determine the customer-specific rebate. The runtime rules can be applied on the server or client side.

As an example, rebate data may include a rule allowing a $100 rebate on smart thermostat purchases. This rebate rule may be applicable to all customers of a given utility. Persistent utility rebate rules that apply across two or more utilities can then be applied to give a rebate profile. For instance, a persistent utility rebate rule may be that only two smart thermostat rebates can be redeemed. So, the rebate profile would include a $100 rebate available for the purchase of the first two smart thermostats associated with a given address or utility account number. This rebate profile can be called on for application to any customer of the utility. However, the rebate may be available across multiple vendor channels including the utility company's website, a retailers website (e.g., NEST), and a point-of-sale website (e.g., HOME DEPOT). Each of these channels may have their own runtime rebate rules. For instance, NEST may require a customer to attest that a customer belongs to a utility company, while the utility company requires a single sign on to confirm a customer's identity. Both of these rules can be runtime rules. If a customer attempts to make a smart thermostat purchase through the utility company's website, then the single sign on runtime rule will be applied to the rebate profile noted above, such that validation for the customer requires a single sign on, and the system analyzing previous rebate redemptions for the customer to ensure that no more than two smart thermostat redemptions are made. If a customer attempts to make a smart thermostat purchase through NEST's website, then the declaration runtime rule will be applied to the rebate profile noted above, such that validation for the customer requires a declaration to be made in addition to the system checking a number of smart thermostat redemptions associated with the customer's address or utility account number. As this example shows, persistent utility rebate rules include the broadest rules—applying to all customers of multiple utility companies, the rebate data include the next-broadest set of rules—those applying to all customers of a given utility, and the runtime rules being the narrowest and being customer-specific.

FIG. 1 shows one embodiment of a frontend user interface (on the right) as implemented by a utility company (e.g., GEORGIA POWER) and compared to an equivalent AMAZON user interface (on the left). Consider that prior art rebates typically involve a paper rebate form that must be filled out and returned via mail or filled out electronically and submitted via the Internet, leading to long delays before a rebate is validated and paid out. Instant coupon systems provide quicker turnaround, but are limited to situations where the product supplier (e.g., manufacturer or distributor) provides the rebate (e.g., AMAZON coupons). Rebates on energy—saving products involve a rebate from a utility company on a product sold by a different entity (a manufacturer, distributor, or retailer). Because of this more complicated relationship, instant coupon solutions are not applicable nor helpful in informing one of skill in the art as to how to provide instant rebates in the energy-related products context.

The herein disclosed systems, methods, and apparatus provide manufacturers and retailers of energy-related products a "turn-key" solution acting as an intermediary service and device(s) between utilities, customers, and manufacturers/retailers. The remainder of this disclosure will refer to manufacturers and retailers of energy-related products as "vendors." Some exemplary but non-limiting examples of energy-related products include smart or WIFI thermostats, LED lighting, smart power strips, water flow sensors, leak sensors, flow-reducing faucet heads, power-consumption monitors, home security and smart locks, electric vehicle chargers, solar panels, solar inverters, solar energy storage. Vendors may also provide services such as solar installation or HVAC repair and installation, to name two non-limiting examples.

FIG. 2 shows one method of operating marketplace system for instant rebate eligibility. When a customer turns to a frontend 106, and before a purchase has been made, (1) a utility 104 can provide customer account data and rebate data (describing available rebates, rules associated with rebate eligibility, and number and product type of previous rebate redemptions) to the instant rebate system 102, (2) the frontend 106 can provide a transaction query to the instant rebate system 102 via an API between the frontend 106 and the instant rebate system 102, and (3) the instant rebate system 102 can return eligible rebates to the frontend 106. Once a transaction is completed, the frontend 106 can pass rebates redeemed to the instant rebate system 102 and the instant rebate system 102 can (4) update internal records of the instant rebate system 102 regarding rebates redeemed, and (5) report on the rebate redemption to the utility 104.

Figure 3:
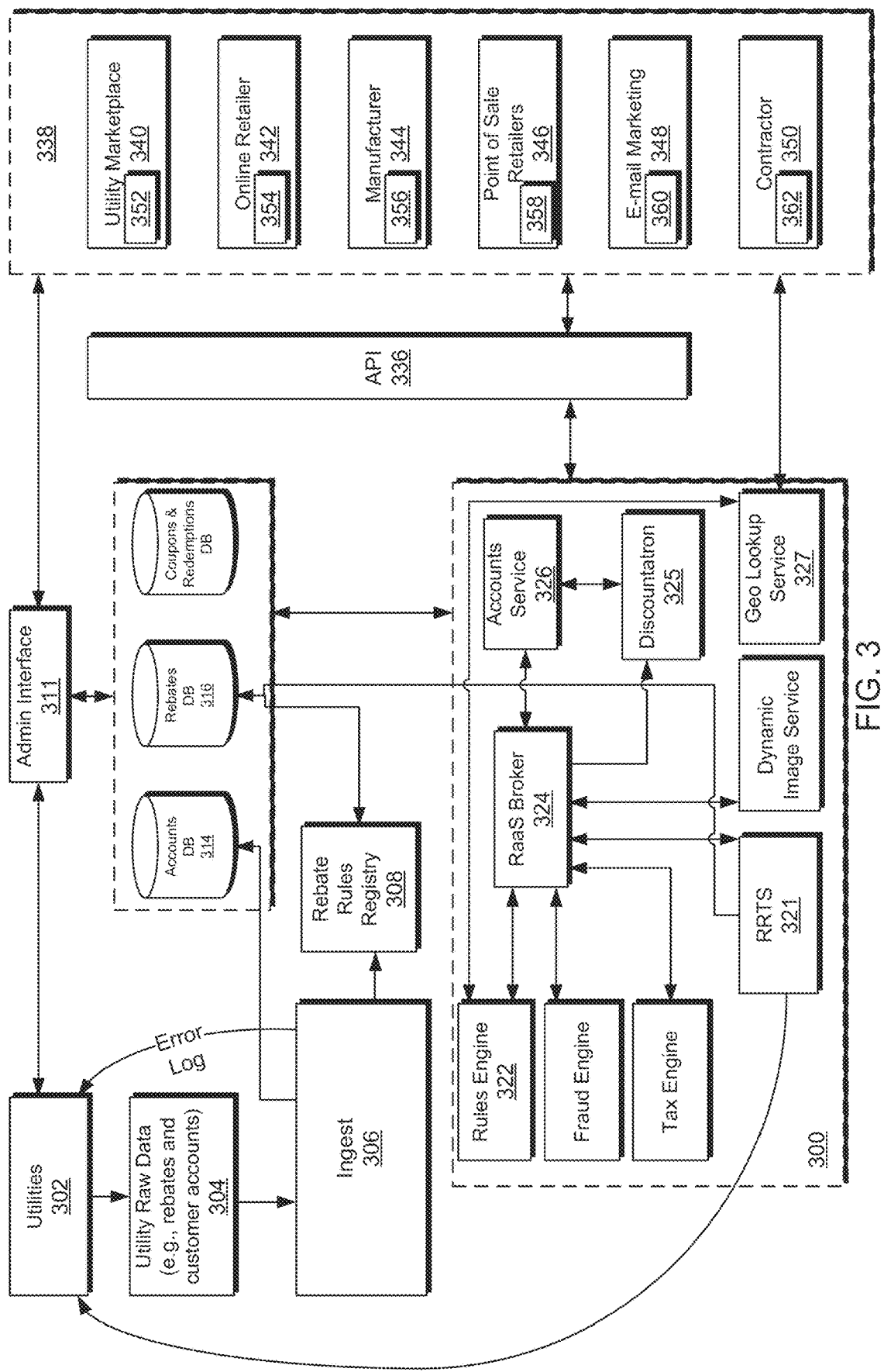
FIG. 3 illustrates a more detailed first embodiment of the system shown in FIG. 2.

FIG. 3 illustrates a more detailed first embodiment of the system shown in FIG. 2. Here, the system acts as an intermediary between one or more utilities 302 providing energy and rebates for reductions in energy usage, and one or more frontends 340, 342, 344, 346, 348, 350 presenting means for utility customers to purchase energy-related products. The frontends 340, 342, 344, 346, 348, 350 can include devices hosting websites, apps, and other interfaces to customers. Frontends can also be vendor servers, such as web servers, that serve websites and app interfaces to customer devices (e.g., laptop computer, smartphone, or tablet computer). Alternatively, the frontend devices can be customer devices. Various entities can operate and host these frontends 340, 342, 344, 346, 348, 350. For instance, in this non-limiting illustration, there is an online retailer frontend 342 (e.g., HOME DEPOT, BEST BUY, and AMAZON), a manufacturer frontend (e.g., NEST, ECOBEE, TRANE), a point-of-sale retailer frontend 346 (e.g., HOME DEPOT, BEST BUY, and AMAZON), and a contractor frontend 350 (e.g., a solar installation contractor). A utility 302 may also have a frontend 340 for offering energy-related products. In some cases, e-mail marketing campaigns from the utility, online retailers, manufacturers, and/or point-of-sale retailers can include a hyperlink to an e-mail marketing frontend 348 that may or may not be the same as the frontends 340, 342, 344, 346, 350 noted above. In some embodiments, the frontends 340, 342, 344, 346, 348, 350 can be implemented as a customer's web browser, an app, or a device hosting a web browser or app (e.g., a web server).

The following description will reference the system diagram in FIG. 3 as well as the method block diagrams in FIGS. 3-5 and 8. Operation begins with ingest rebate eligibility processing (see method FIG. 5) to pre-process rebate eligibility for utility programs (i.e., eligibility that applies to many customers of a utility). By pre-processing rebate eligibility for utility programs, rather than pre-processing on a customer-by-customer basis, changes to a rebate program or persistent utility rebate rules can be made without redoing the ingest process for all customers of a utility. Additionally, pre-processing at least part of rebate eligibility, means that completing eligibility processing for individual customers (i.e., the runtime portion) can be performed with far less latency than any known procedure. This bifurcation of eligibility processing enables the herein disclosed "instant" rebate validation—a feature not enabled by prior art systems. Runtime eligibility processing takes the eligibility from ingest and completes eligibility processing on a per-customer basis (see method FIGS. 3-5, and 6-8).

Ingest Rebate Eligibility Processing

The one or more utilities 302 have utility raw data 304 (e.g., customer account data and available rebate data such as a rebate program) that may be stored on utility databases and accessed by an ingest subsystem 306. Alternatively, the utilities 302 can pass the utility raw data 304 to the ingest subsystem 306. In some cases, a secure server, such as an SFTP or S3 server can mediate the utility raw data 304 transfer between the utilities 302 and the ingest subsystem 306.

The ingest subsystem 306 can parse, validate, and normalize the utility raw data 304 (Block 504), or otherwise put the data 304 into a standard format that is consistent across all the utilities 302. Further details of the ingest subsystem 306 are discussed relative to FIG. 9. The ingest subsystem 306 can then store normalized data in an accounts database 314. For instance, a customer account number and address may be stored in the accounts database 314. Other identifiers besides a customer account number may also or alternatively stored in the accounts database 314.

In some cases, a customer may have multiple utility accounts (e.g., separate water and natural gas utilities), and the ingest subsystem 306 can sync multiple utility accounts to a single customer. For instance, the ingest subsystem 306 can track customer names and addresses, and if a common name or common address is seen in two sets of incoming data from different utilities, then the different utility accounts can be synced to a single user. Alternatively, the ingest subsystem 306 may require a match in both name and address to sync two separate utility accounts to a single customer.

The normalized data can also be passed to a rebate rules registry 308 (Block 506) that accesses persistent utility rebate rules stored in a rebates database 316 and applies these to the normalized data to form rebate profiles (Block 512). The persistent utility rebate rules are rules or rebate eligibility that applies to at least two of the two or more utilities 302. In other words, while the normalized rebate data is utility-specific, the persistent rebate rules apply across multiple utilities. Since the persistent rebate rules are not utility-specific, they are not part of rebate programs, and thus do not arrive via the ingest subsystem 306.

Using these persistent utility rebate rules, the rebate rules registry 308 can generate rebate profiles (Block 512), each comprising the application of the persistent utility rebate rules to the normalized rebate data to provide rebate profiles that are utility-specific but not customer-specific. In other words, the rebate rules registry 308 pre-determines rebate eligibility for each utility, but not for each customer (runtime rules applied later will determine customer-specific eligibility). The rebate profiles can then be stored in the rebates database 316 (Block 514) alongside the persistent utility rebate rules. A rebate profile can be generated for a utility's rebate program—a set of rebate rules covering a certain type of product and applicable to many or multiple customers of that utility. For instance, a rebate program may be directed to smart thermostats, may limit a total number of rebates for the utility (e.g., 10,000), and have a two-month window for redemption. This rebate program can be part of the normalized rebate data from the ingest subsystem 306. A persistent utility rebate rule may dictate that only two thermostat rebates per household are allowed, and this may apply to all utilities in Colorado. The rebate rules registry 308 can apply the persistent utility rebate rule to the program such that the resulting rebate profile dictates that a $100 rebate is available for the first 10,000 smart thermostat purchases made within a two-month window and where no household can redeem more than two of these rebates. This rebate profile is specific to the utility offering the rebate, but is not customer-specific until runtime rebate rules are applied. Once the rebate profiles are generated and stored in the rebates database 316, ingest is complete.

Figure 4:
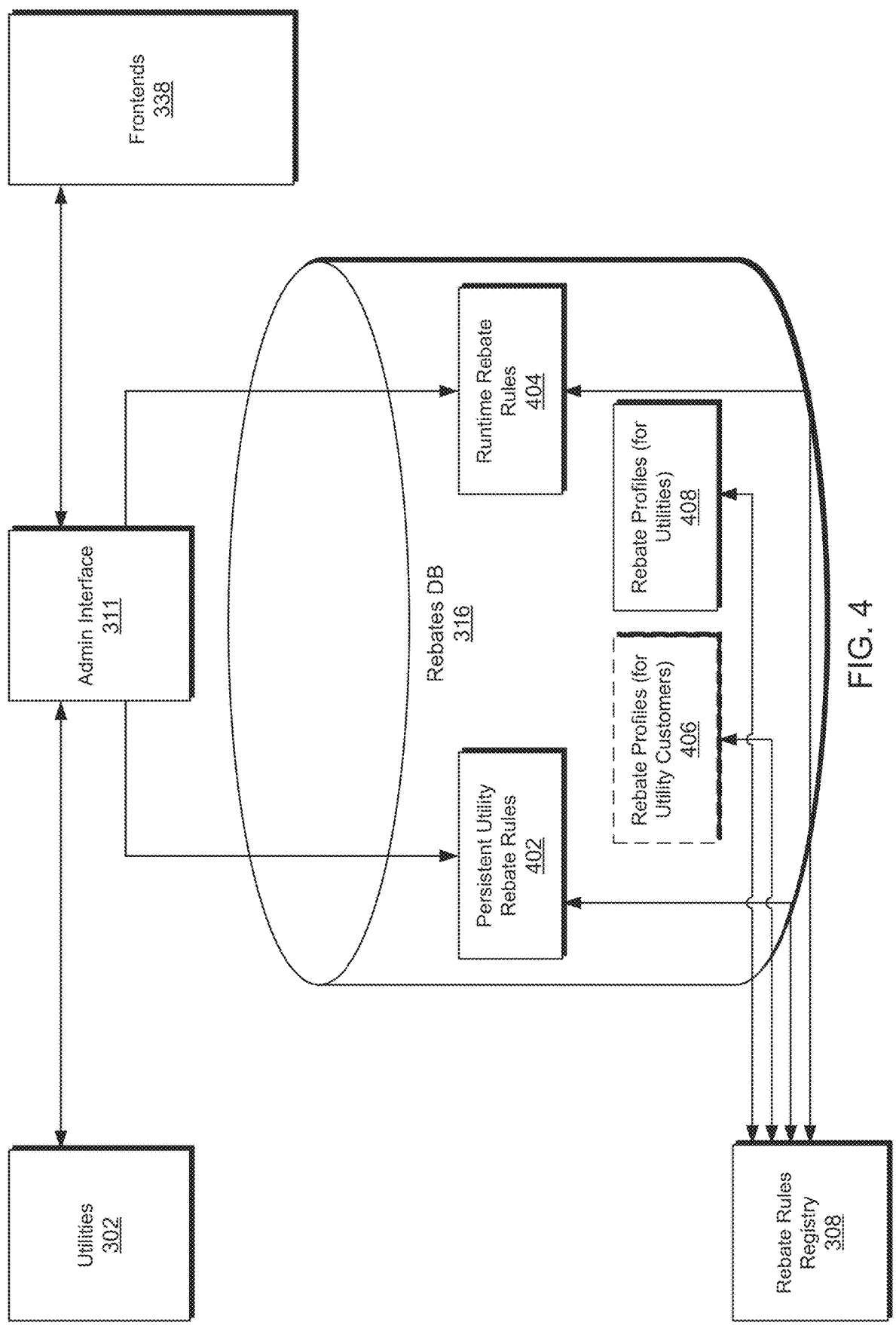
FIG. 4 illustrates an embodiment of a detailed view of the rebates database shown in FIG. 3.
Figure 5:
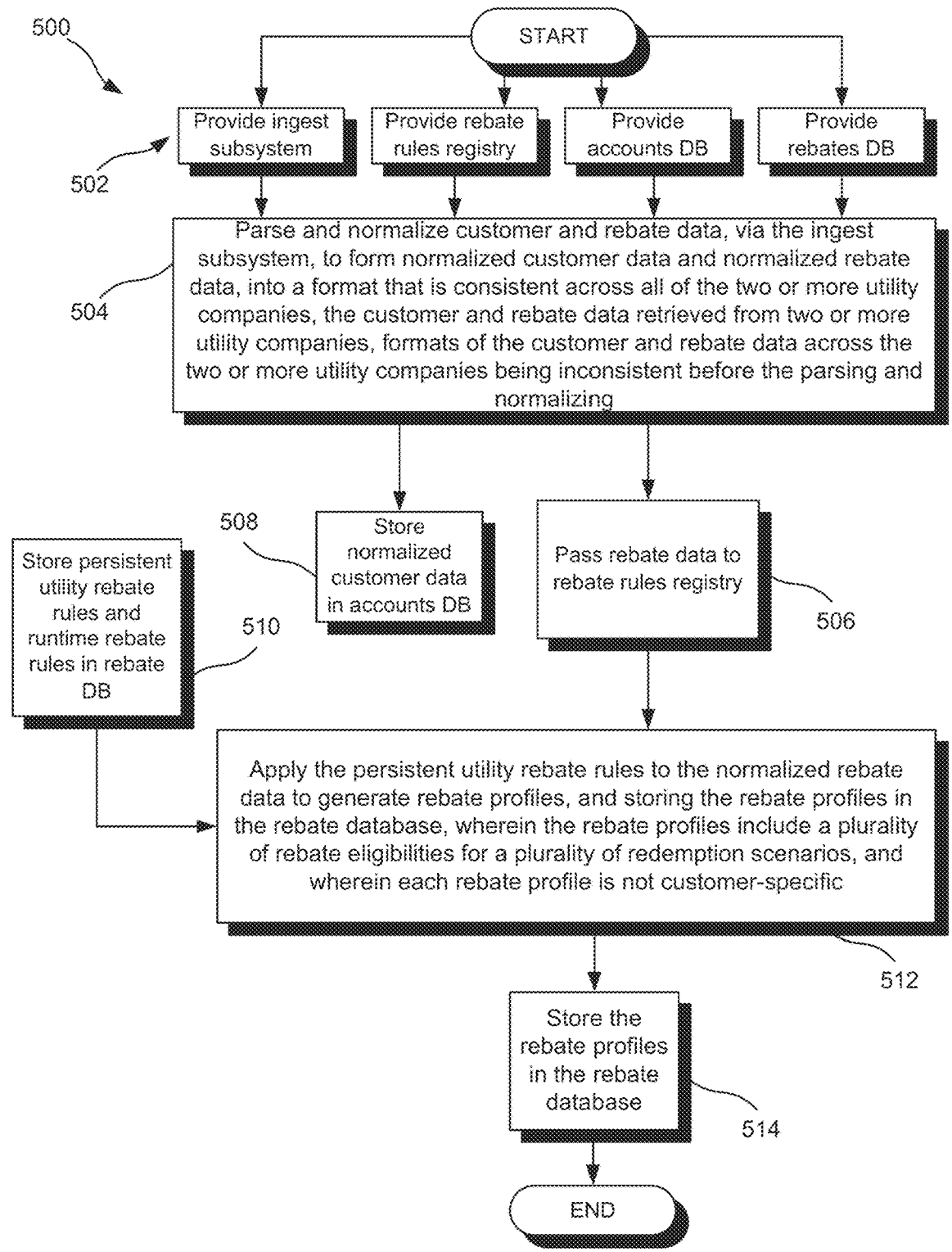
FIG. 5 illustrates an embodiment of a method for ingest rebate eligibility processing.
Figure 6:
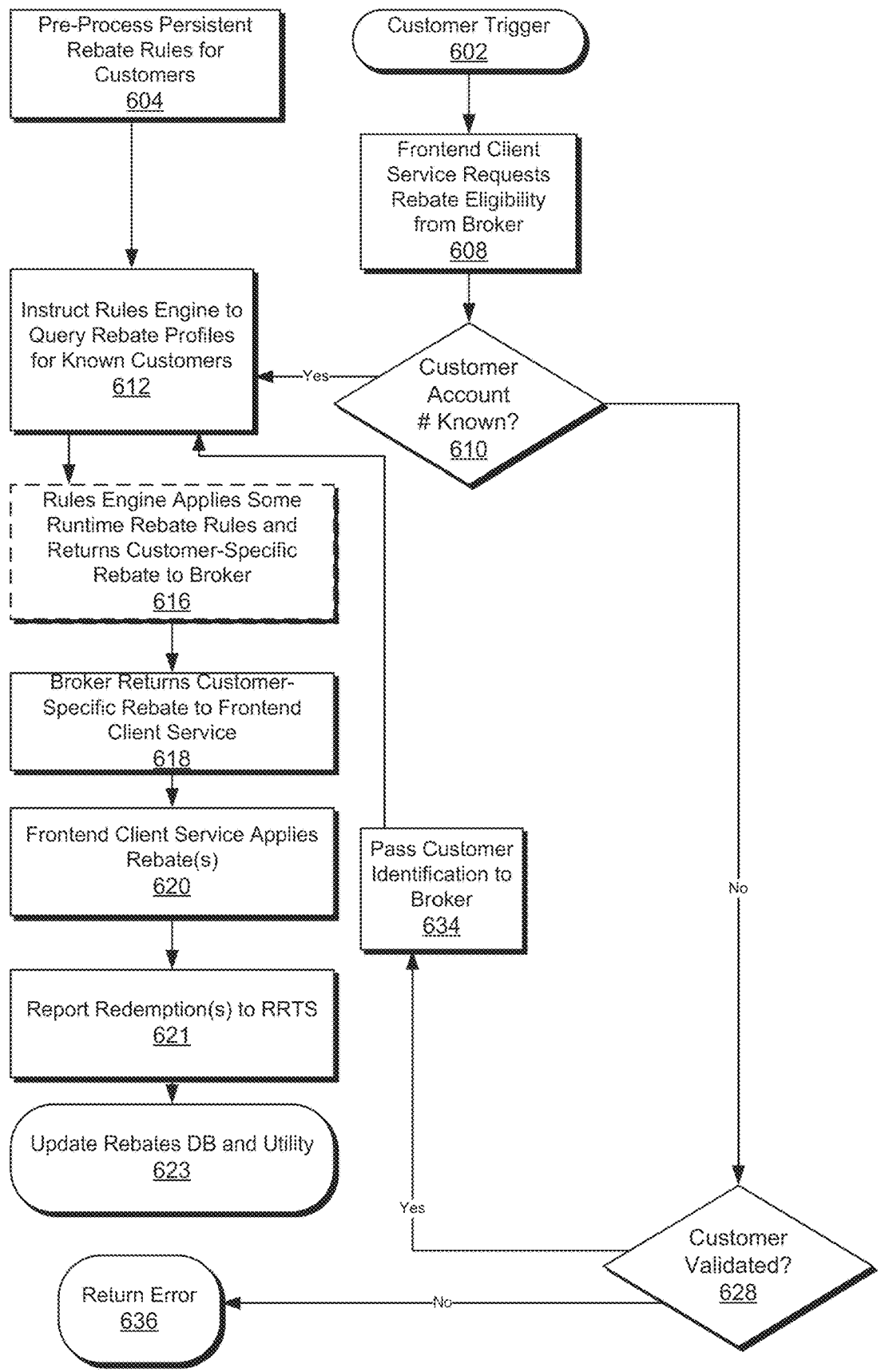
FIG. 6 illustrates a first method of runtime rebate eligibility processing.
Figure 7:
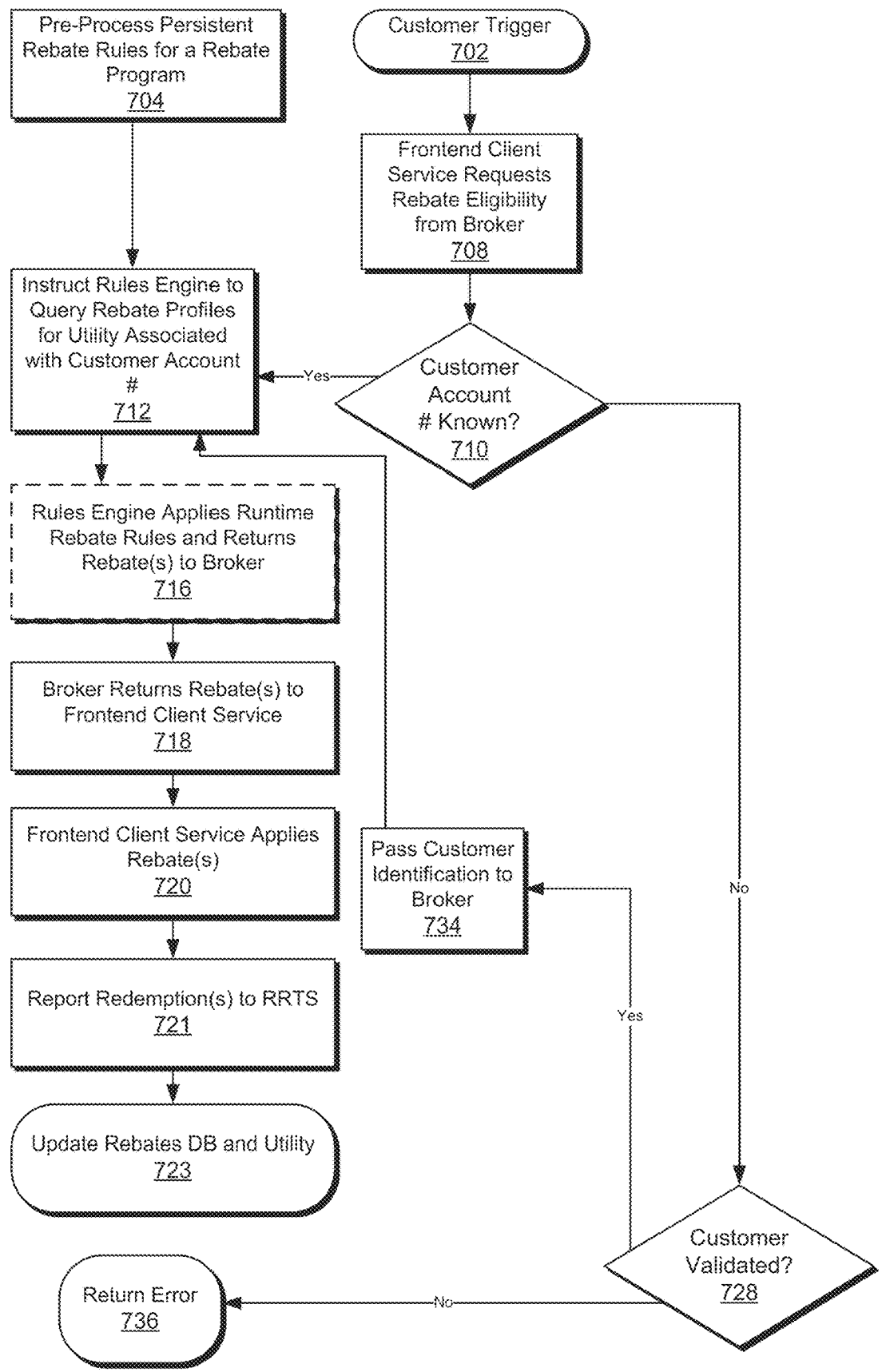
FIG. 7 illustrates a second method of runtime rebate eligibility processing.

Details of the rebates database 316 can be seen in FIG. 4. The rebates database 316 can include persistent utility rebate rules 402, runtime rebate rules 404, and rebate profiles 406 (optional) and/or 408. In some embodiments, the rebate profiles may be separated into two distinct sets of profiles 406, 408, one 406 providing profiles for an entire utility (e.g., all customers of a utility), while another 408 provides profiles for specific customers. In other embodiments, there may only be rebate profiles for entire utilities (i.e., no customer-specific rebate profiles). The rebate database may also include a number of previous purchases of energy-related-products identified by customer, and identification of energy-related-products previously purchased.

An admin interface 311 can be used to generate and store the persistent utility rebate rules to the rebate database 316 (Block 510), and the generation of these persistent utility rebate rules can be carried out via interaction with each of the utilities 302. Some persistent utility rebate rules can apply to all customers of a utility (Block 606) while others can be customer-specific (Block 604). The admin interface 311 can also be used to generate and store the runtime rebate rules 404 to the rebate database 316 (Block 510). The admin interface 311 can be hosted on a distinct device, or can be part of a device hosting the databases 314, 316 and/or the validation engine 300.

In an embodiment, the customer account data can include an account number and customer address. In an embodiment, the rebate data can include rebates that have been used by a given customer. Rebate data can also include available rebates for all customers of the utility (e.g., a rebate program). Rebate data can include available rebates for a given customer based on the utility's rebate rules.

Figure 9:
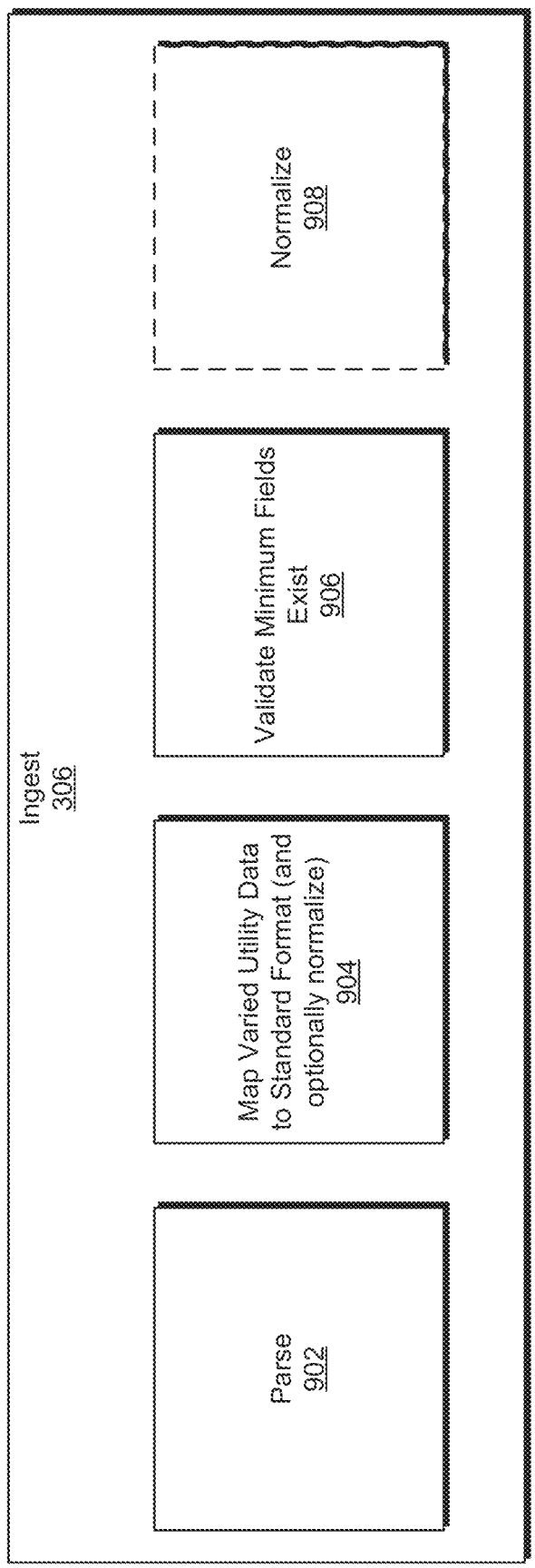
FIG. 9 illustrates one embodiment of subcomponents of the ingest subsystem shown in FIG. 3.

In an embodiment, the ingest subsystem 306 can be embodied as illustrated in FIG. 9. In this embodiment, the ingest subsystem 306 can include a parser module 902, a mapping module 904, and a validation module 906. The mapping module 902 can optionally include normalization functionality (e.g., converting data inputs having disparate formats to a standard output format). Alternatively, a normalization module 908 can perform this functionality separate from the mapping module 904. The validation module 906 can be configured to analyze the fields in the parsed and mapped data (or the parsed, mapped, and normalized data), and to compare the fields to a set of required minimum fields. Where the minimum is not met, an error log can be created and returned to a corresponding utility 302 informing that utility 302 of the missing field and requesting correction.

The ingest subsystem 306 may include machine-readable program code stored on a memory and executable by a processor. This memory and processor may be separate from or the same as those on which the rules engine 322, broker 324, and accounts service 326 are stored and executable on. In other words, the ingest subsystem 306 can be a standalone server device or set of server devices, or incorporated into one or more server devices of other subsystems. In some embodiments, one or more of the parser module 902, mapping module 904, validation module, and the optional normalization module 908 can be hosted on a server device or set of server devices separate from a server device or set of server devices hosting the remaining modules of the ingest subsystem 306.

Runtime Rebate Eligibility Processing

Given the rebate profiles, the system awaits a customer trigger at one of the frontends 340, 342, 344, 346, 348, 350. A customer trigger typically takes the form of a customer clicking on an "eligibility" button or link, adding a product to a digital shopping cart, or moving to a digital checkout. However, other customer triggers can include a customer viewing an energy-related product on an online retailer website, or a customer viewing a set of energy-related products at a manufacturer's website, to name two non-limiting examples. The trigger is typically received or observed in one of the frontends 338.

Frontend client services 352, 354, 356, 358, 360, 362 in one of the frontends 338 detect the customer trigger (Blocks 3502 or 602), and the frontend client service 352, 354, 356, 358, 360, 362 makes a call or request through an API 336 to a rebates-as-a-service broker 324 (RaaS broker or broker) (Block 3508 or 608). The customer trigger can include an indication of an intent to purchase an energy-related device, such as adding an energy-related device to a browser shopping cart. The procedure then splits based on whether the customer is known. In the illustrated methods, this means knowing a customer account number for their associated utility. However, other means of identifying a customer can also be used. Assuming an account number is used to identify a customer, where the customer has logged into the frontend 340, 342, 344, 346, 348, 350 (e.g., single sign on) (decision 3510 or 610=Yes), the frontend client service 352, 354, 356, 358, 360, 362 can provide a customer account number with the request to the broker 324. The request may also include a utility company that the customer is a customer of, an address of the customer, one or more products that the customer is checking rebate eligibility for via the frontend 340, 342, 344, 346, 348, 350, a frontend 340, 342, 344, 346, 348, 350 source or channel (e.g., retailer 342, POS 346, utility 340, manufacturer 344, etc.), or any combination of the above.

Returning to Decisions 710 and 610, where the customer is not known, (e.g., has not logged in) (Blocks 710 or 610=No), the customer is prompted for further identifying information, and the eligibility is further refined, at a later point (e.g., during checkout). If the customer is not identified in this further process (Blocks 728 or 628=No), then an error is returned. If validation is accomplished (Block 728 or 628=Yes), then the customer identification (e.g., a customer's account number for a utility) is passed to the broker 324 (Blocks 734 or 634). Thus, whether the customer is known at Decision 710 or 610, or only after further validation, the broker 324 moves to Blocks 712 or 612 with an identification of the customer, typically a customer account number. In an embodiment, the customer validation (Decision 728 or 628) can include a two-part process as described relative to FIG. 8 later in this document.

Given the customer account number, of another customer identification, the broker 324 can then instruct a rules engine 322 to query the rebate profiles in the rebates database 316 for a utility (or utilities) associated with the customer account number (Block 712), or other customer identification. The query can look for rebate profiles for utilities 408 that match input parameters of the query such as customer identification (e.g., customer account number), products, and retail channel. Alternatively, the query can look for rebate profiles for customers 406 (Block 612) that match input parameters of the query such as customer identification (e.g., customer account number), products, and retail channel.

With one or more rebate profiles in hand, the rules engine 322 can optionally then apply runtime rebate rules 404 (Block 716 or 616). Either way, the result of the query and optional application of runtime rebate rules 404 is one or more rebates that the customer is eligible for. These rebates can be related to purchase of the energy-related device, enrollment in a demand response program with the customer's utility, or a combination of both. For instance, there can be instant rebates for both the device purchase and demand response enrollment, both of which can be applied cumulatively at checkout. Before, after, or as part of this step, the frontend client service may present the customer with a set of terms and conditions to agree to before the demand response rebate can be applied/deducted.

The rules engine 322 can pass the one or more rebates to the broker 324, and the broker 324 can return the one or more rebates to the requesting frontend client service 352, 354, 356, 358, 360, 362 (Block 718 or 618).

The frontend client service 352, 354, 356, 358, 360, 362 can then apply the one or more rebates (Block 720 or 620). For instance, the rebate value, or sum or multiple rebates, can be subtracted from a total amount owed in a digital shopping cart.

The customer can then complete the transaction and data describing the redemption of one or more rebates can be passed by the frontend client service 352, 354, 356, 358, 360, 362 to a rebate redemption transaction service (RRTS) 321 (Block 721 or 621). This reporting may occur via the broker 324 or may occur directly to the RRTS 321. At this time, the purchase device can be pre-enrolled in a demand response program as discussed further with regards to FIGS. 34-36. Completion of the transaction can also initiate a communication campaign with the customer to push the customer to complete installation of the energy-related device and connect it to the Internet so that the utility can carry out the demand response program. If installation and connection to the utility is not completed within a specified period of time, the instant rebate related to the demand response program may be clawed back.

The RRTS 321 can collect all rebate redemptions and periodically report back to the utilities 302 (Block 723 or 623). The RRTS 321 can also update the rebate profiles 406 in the rebates database 316 to reflect new rebate redemptions (Block 723 or 623). In this way, additional instant rebate eligibilities for the same or different customers can be made in real-time without having to wait for updates from the utilities 302.

While this embodiment has been described such that the rules engine 322 performs most of the runtime rebate eligibility processing, in other embodiments, the rules engine 322 can pass along more raw data to the frontend client service 352, 354, 356, 358, 360, 362, and the frontend client service 352, 354, 356, 358, 360, 362 can perform a greater proportion of the runtime rebate eligibility processing. In other words, the processing workload for runtime rebate eligibility processing can be distributed between the rules engine 322 and the frontend client service 352, 354, 356, 358, 360, 362.

Runtime rebate rules 404 can be generated and stored in the rebates database 316 by the admin interface 311 (Block 510) based on interaction with the frontends 340, 342, 344, 346, 348, 350. The runtime rebate rules 404 can represent rebate eligibility parameters or rules for one or more providers of energy-related products (e.g., NEST or BEST BUY to name two). The runtime rebate rules 404 can be customer-specific, meaning that once these are applied the resulting rebate will be customer-specific. For instance, a runtime rebate rule 404 may dictate that only two rebates can be stacked in a digital shopping cart or that no rebates can be stacked in a digital shopping cart.

Figure 8:
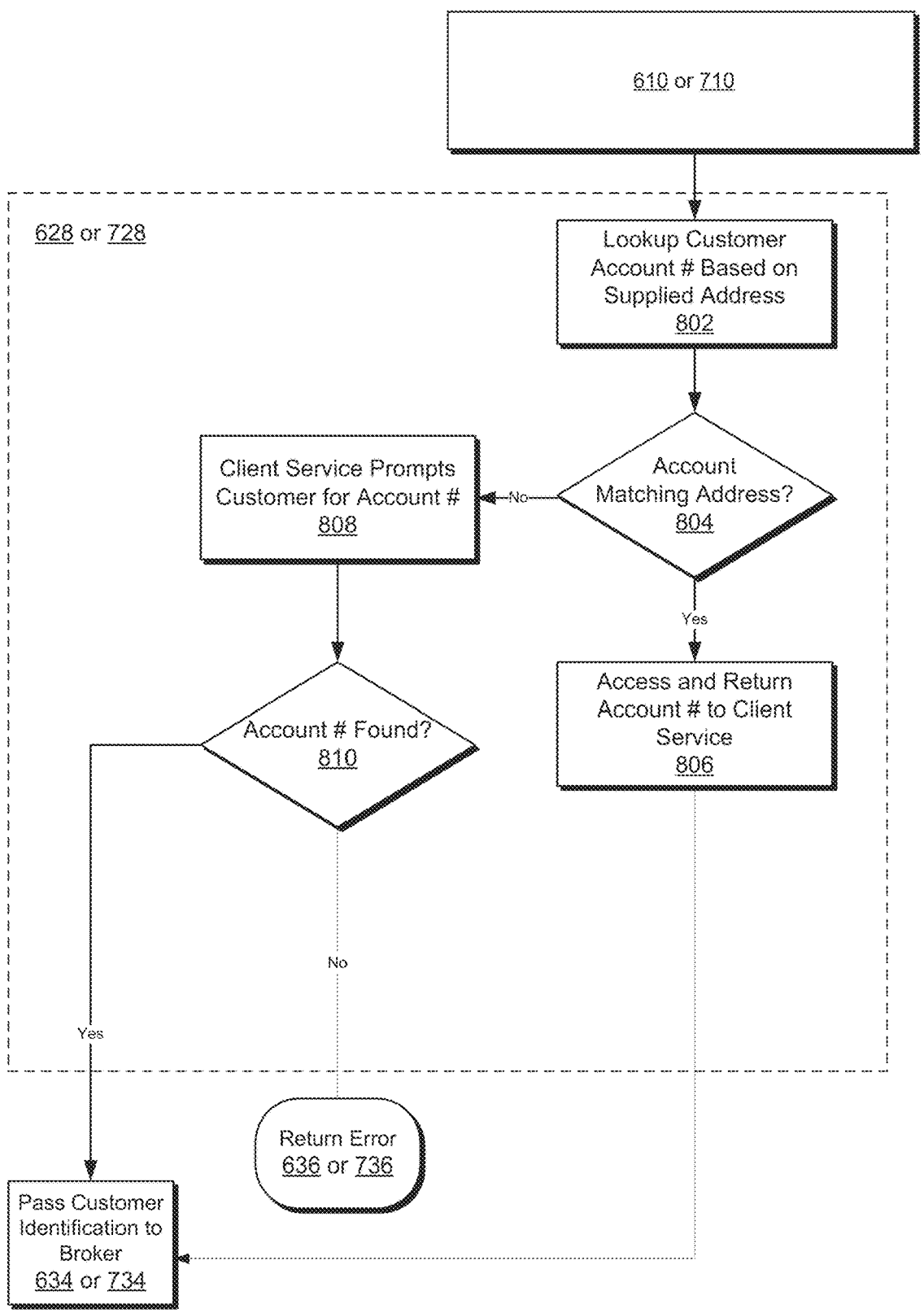
FIG. 8 illustrates an embodiment of customer validation when single sign on or other methods to obtain a customer identification or account number are not performed up front.

FIG. 8 illustrates an embodiment of customer validation 628 or 728 when single sign on or other methods to obtain a customer identification or account number are not performed up front. The validation 628 or 728 can start by looking up a user account number based on a first customer identifier (e.g., address) that the customer has provided (Block 802). This can be performed via the accounts service 326 and the accounts database 314. The one of the frontend client services 352, 354, 356, 358, 360, 362 making the rebate eligibility request can pass a customer validation request to the accounts service 326, and the accounts service 326 can query the accounts database 314 to find a matching identifier (e.g., a customer account with a matching address). If a match is found (Decision 804=Yes), then the accounts service 326 can pull a customer account number from the accounts database 314 associated with the matching customer account and return the customer account number to the one of the frontend client services 352, 354, 356, 358, 360, 362 that requested the customer validation (Block 806). The one of the frontend client services 352, 354, 356, 358, 360, 362 can then call the broker 324 using the customer account number (Block 634 or 734).

Returning to Decision 804, where a matching customer account is not found (Decision 804=No), the accounts service 326 returns an indicator to the one of the frontend client services 352, 354, 356, 358, 360, 362, which then prompts the customer for a second customer identifier (e.g., customer account number) (Block 808). If the accounts service 326 finds a customer account matching the provided customer account number (Decision 810=Yes), then the accounts service 326 can pass the validated customer account number to the broker 324 (Block 634 or 734). Alternatively, the broker 324 can pass an indication of the customer account validation back to the one of the frontend client services 352, 354, 356, 358, 360, 362, which can then pass the validated customer account number to the broker 324 (Block 634 or 734). If the second customer identifier (e.g., customer account number) does not match a customer account (Decision 810=No), then the accounts service 326 can return an error to the frontend client service 352, 354, 356, 358, 360, 362 (Block 636 or 736). In this case, the customer may be precluded from applying the rebate.

The RaaS broker 324 has been described as an intermediary between various subcomponents of the validation engine 300. This architecture helps to reduce latency, but in other embodiments, the broker 324 can be excluded, and services, clients, databases, etc. can make calls directly to each other.

Partial Runtime Rebate Validation

In some embodiments, a potential rebate may be presented by the frontend client services 352, 354, 356, 358, 360, 362 before runtime rebate validation occurs. For instance, a customer may be presented with a display that states, "You may be eligible for a $100 rebate if you purchase an energy-related smart thermostat or a WIFI enabled water heater." Possible rebates may be displayed to select customers where the process of selecting which customers see a potential rebate can be referred to as "partial runtime rebate validation." Partial runtime rebate validation may start with one of the frontend client services 352, 354, 356, 358, 360, 362 requesting partial validation from a geographic lookup service 327. The request may be made directly to the geographic lookup service 327 rather than via the API 336. The request can include a customer geo identifier, which gives some indication of a location of the customer's device. For instance, the customer geo identifier can include an IP address, GPS coordinates, cell phone tower triangulation data, or WIFI access point location, to name a few non-limiting examples. The geo lookup service 327 can then pass the geo identifier to the rules engine 322, which queries the accounts database 314 to determine what utility the customer may belong to. The geo lookup service 327 can thereby determine what utility or utilities the customer is likely to be a customer of, and then request rebate eligibilities from the broker 324 for the utility or utilities that the customer is likely to belong to. The broker 324 can determine all eligible rebates for customers of the utility and return these to the geo lookup service 327, which then returns these to the one of the frontend client services 352, 354, 356, 358, 360, 362. If the customer is interested in a product with one of these partial rebates, the customer can generate a customer trigger (Blocks 602 or 702) and full validation is carried out as described above.

As noted earlier, a unique feature of this disclosure is the ability to "stack" (or combine) rebates from different utilities for a customer of multiple utilities. Since the ingest subsystem 306 is configured to sync or link customer account data from multiple utilities 302 to a single customer, this also allows the rules engine 322 to return rebates to the frontend 338 from multiple utilities 302 and to apply rules that dictate whether rebates from multiple utilities 302 can be stacked or combined.

Further, where the rules engine 322 returns multiple rebates and two or more rebates can be applied to a given transaction (i.e., stacked or combined), then the rules engine 322 may also determine which combination of rebates is best (i.e., results in the greatest total reduction in expenditure for the customer). This can see the rules engine 322 run through various combinations of rebates and associated rules as well as a summing of the resulting combinations of rebates to determine a best combination. The best combination or combinations can then be returned to the frontend 338 for application to the customer's transaction.

The persistent utility rebate rules 406 can include rebate type (e.g., fixed price v. percentage of sales price) rebate value, rebate total limit (e.g., the maximum value of a percentage-based rebate), cashback value, start and end times, usage limits, stackable in cart (e.g., are multiple rebates from the same utility applicable in a single transaction or are multiple rebates from different utilities applicable to a single product or a single transaction), product collection restriction, specific user limits, zip code restrictions, utility energy cost rates, customer loyalty (e.g., rebate eligibility based on a number of years that a customer has been with the utility), service area (e.g., does a customer address fall within a rebate-eligible geographic boundary), trade ally (e.g., is a product being sold by a retail channel that the utility has a rebate agreement with), weather profiles (e.g., rebate eligibility for different types of products limited to certain customer climates), premises profiles (e.g., homes of a certain age are eligible or not eligible for a given rebate; homes with a certain level of existing efficiency, such as double panes windows or a heat pump, are eligible for a certain rebate; homes using no more than a threshold amount of energy are eligible for a certain rebate), and credit profiles (e.g., a rebate may only be available to customers with a credit score of 600 or above).

The runtime rebates rules 404 can include checking the commodity type (e.g., gas/electric/water or a specific combination), single sign on required, frontend channel restrictions, stackability of rebates from different utilities, and stackability of rebates for a single utility, to name a few.

The frontend 338 can include a frontend 346 for point-of-sale retailers (e.g., in store HOME DEPOT or BEST BUY). Here, the frontend client service 358 may reside on server hosting software for a brick-and-mortar retailer. For instance, the frontend client service 358 may provide information to a web application accessible to customers in the store via their smartphones. The client server 358 may provide a user interface that suggests rebates may be available to in-store customers. A customer can access a link on their smartphone or other computing device in the store to see eligibility. Provision of instant rebate eligibility via this web app can be similar to that discussed earlier relative to other frontends 338.

The frontend 338 can also include a frontend 348 for e-mail marketing. In this case, a utility 302 can provide a list of customers and a list of e-mail addresses for those customers to the accounts database 314. Eligibility for these customer accounts can be determined in similar ways to those described above—before any trigger or request is received from a frontend 338. The utility 302 can request that an e-mail be sent to some or all of its customers who are deemed eligible for a rebate for a given one or more products. The e-mail can include a link, that when selected, directs a customer to enter further information that validates eligibility before a transaction is made. The customer can then complete a transaction and see an instant rebate applied to their total via the means described earlier for transaction completion.

While the one or more utilities 302 have been described in terms of gas, electric, and other energy utility companies, in other embodiments, the one or more utilities 302 can include or can be expanded to include entities such as water utilities, government entities, insurance companies, etc.

Figure 10:
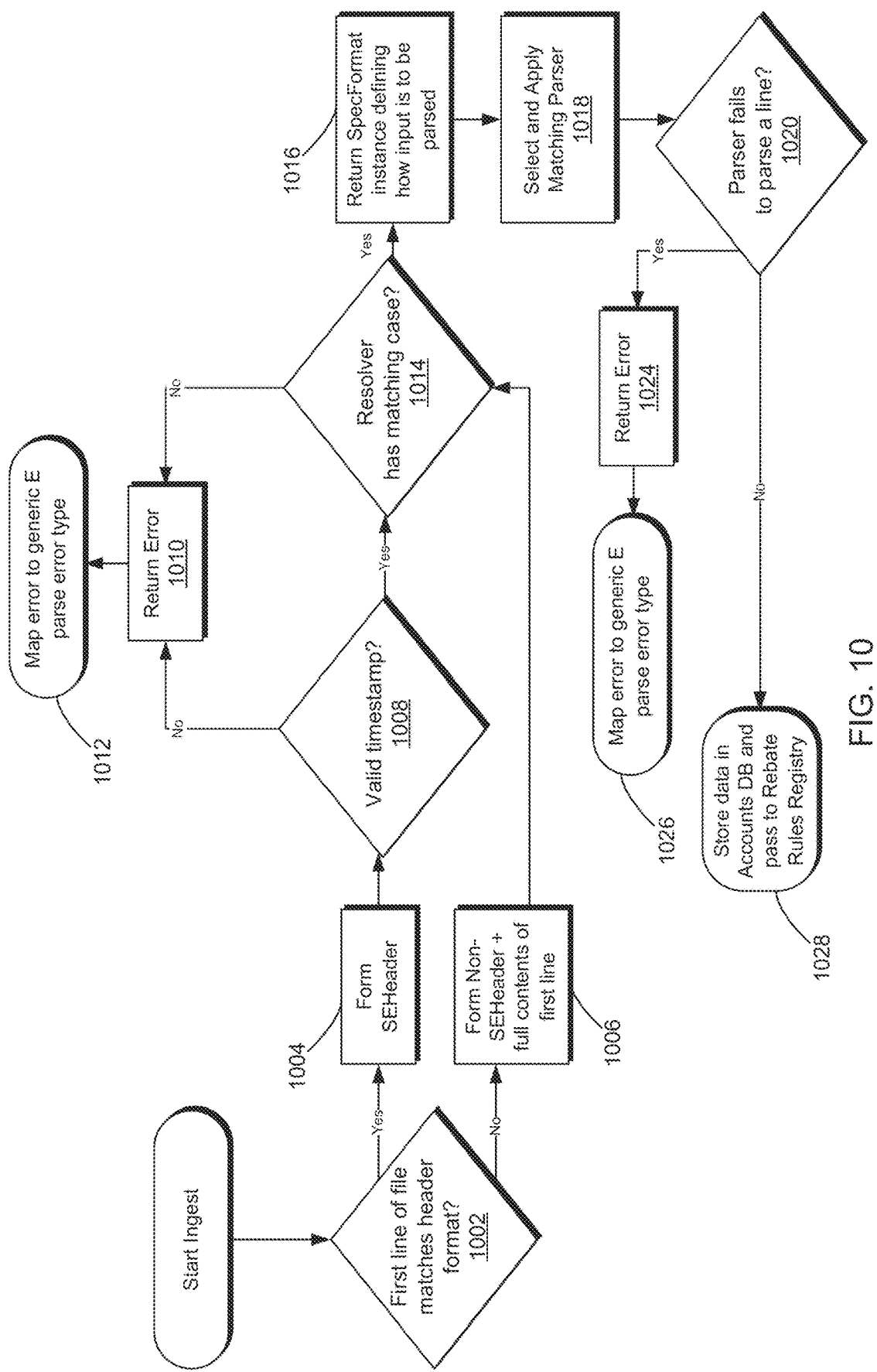
FIG. 10 illustrates one embodiment of details of a method of operating the ingest subsystem shown in FIG. 3.

FIG. 10 illustrates a method of ingesting utility customer and rebate data from two or more utilities, where at least two of the utilities utilize disparate data formats. The method 1000 can include determining if the first line of a file for ingest matches a known header format (Decision 1002). If so, then an SEHeader can be formed (Block 1004), and if not, then a non-SEHeader can be formed and the header can include the full contents of the first line (Block 1006). Given an SEHeader, the method 1000 can determine if the file includes a valid timestamp (Decision 1008), and if not (Decision 1008=No), an error can be returned (Block 1010), and the error can be mapped to a generic E parse error type (Block 1012). If a valid timestamp is found (Decision 1008=Yes), then the method can determine if a resolver module has a matching case (Decision 1014). If not (Decision 1014=No), then an error can be returned (Block 1010), and the error can be mapped to a generic E parse error type (Block 1012). If a matching case is found (Decision 1014=Yes), then the method 1000 can return a SpecFormat instance defining how an input is to be parsed (Block 1016), and the method 1000 can select and apply a matching parser from a set of parsers (Block 1018). If the parser succeeds in parser all lines of the file (Decision 1020=No), then the method 1000 stores the data in the accounts database 314 and passes the data to the rebate rules registry 308 (Block 1022). If the parser fails to parse any line of the file (Decision 1020=Yes), then the method returns an error (Block 1024) and maps the error to a generic E parse error type (Block 1026).

The instant rebate system can integrate with various frontends or third-party provider customer interfaces (e.g., SHOPIFY) for providing rebate information and cart discount updates to the third-party provider. There are two primary API endpoints used by the third-party provider or its frontend: (1) product rebates—an endpoint that the third-party provider calls to determine the available rebates for a given product or collection; and (2) cart rebate calculation—an endpoint that the third-party provider calls to determine the best possible combination of rebates for a given cart. The former is relatively simple, correlating a given product or collection ID with a matching rebate. The cart rebate calculation, however may perform validation of various user data to confirm eligibility in addition to computing the rebate for a cart of products. In some embodiments, this can be accomplished by associating one or more utility rebate rules or runtime rules with a given rebate (e.g., one rebate per household, must purchase a water heater having an X energy efficiency rating, must be purchased between dates X and Y, etc.), and then for each customer account, associating that customer account directly with the rebate rule, as shown below in FIG. 5.

Figure 11A:
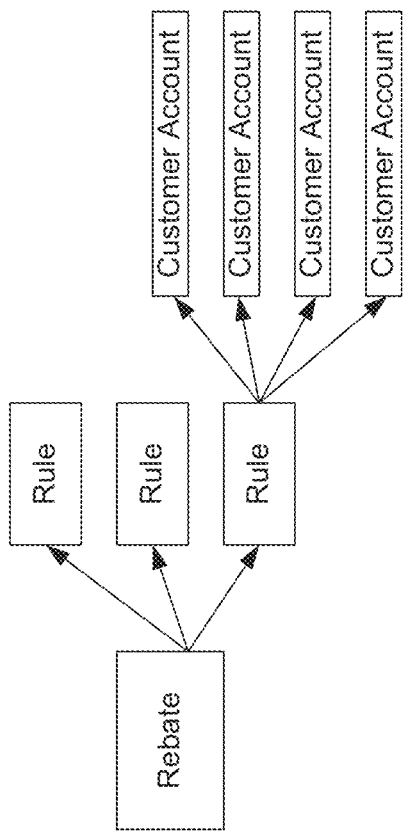
FIG. 11A shows a known tree storage structure for storing and relating rebates, rebate rules, and customer accounts.

As seen in FIG. 11A multiple customer account data sets, or boxes to the right, are associated with a single rule. However, there are several challenges that arise when associating customer account data directly with rules. For one, the association is performed by breaking out customer account variables into individual datum, each completely separate from the other data for that customer account. This increases table size, makes indexing and analysis difficult, and is an overly-generalized approach that is not needed. Because each rebate is individually associated with a customer account and all the associated data in that customer account, ingest files contain a lot of duplication. If there are N rebates, and M customer accounts, then the instant rebate engine receives M×N records so that the ingest can associate the data. The size of a database table used to record the association grows proportionate to the number of customer accounts in the system times the number of rules needing customer account data for validation. As this table grows, performance suffers. If a new rebate or rule is added later, there little to no way of using existing customer account data, so a new ingest operation is typically performed for all customer accounts to associate with the new rebate and/or rules. The association of customer account data to rebate rules typically entails significant computation at the time of ingest, which means undesired latency. Further, the implementation of groups may involve associating data with group-level rules, which then involves utility, manufacturer, and retail partners being aware of this grouping functionality and incurs a large amount of redundant data.

Figure 11B:
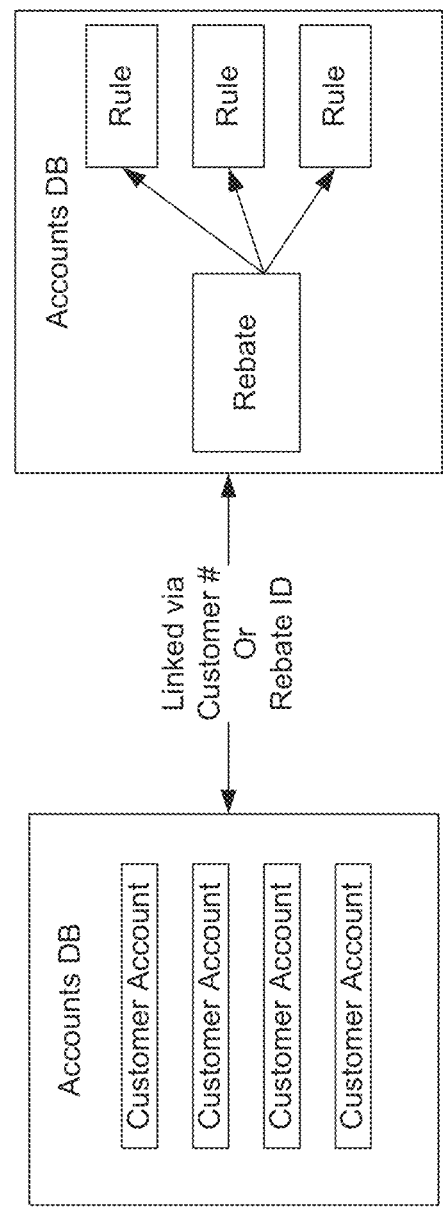
FIG. 11B shows a novel storage structure for storing and relating rebates, rebate rules, and customer accounts.

To overcome these challenges, the customer account data and the rebates (or programs) and rules can be stored separately as shown in FIG. 11B, and linking the two databases via customer account numbers or rebate IDs. Instead of associating customer account data directly with rules, a separate table for each customer account data set can be created. In this design, rebates and rules are stored independent of the customer account data, and the rebate rules registry 308 can take the cart, customer-provided validation data, stored user data, and rebate rules together for evaluation. There are a number of benefits to this approach: (1) customer account data has a proper schema, with one customer account per row in a table, thus allowing better database utilization, indexing, and analysis of customer accounts in the system; (2) rebates and their associated rules can be modified as needed without requiring a full ingest of customer account data; (3) group functionality for rebates will be an admin-only construct (e.g., utility, manufacturer, and retailer partners do not need to know about them or worry about their implementation); and (4) the rebate engine becomes more amenable to pluggability. While this is not necessary for smaller instant rebate engines, to accommodate scaling (i.e., as validation rules become more complex), this solution is a substantial improvement and reduction in latency when system are scaled to numerous utilities and thousands of customer accounts. Abstracting out the evaluation of the rules from the actual storage also makes testing and replacing the evaluator much simpler.

The various components of the validation engine 300 can be embodied or stored in one or more memories. Alternatively, the various components of the validation engine 300 can be embodied in one or more non-transitory, tangible computer-readable storage media encoded with processor executable instructions. These components can be executed on one or more processors associated with the memory or storage media. The one or more processors and memory can reside on one or more computing devices (e.g., servers). For instance, the broker 324 and the rules engine 322 may reside on a single server along with the rebates database 316, while the accounts server 326 and the accounts database 314 reside on a second server. Alternatively, the broker 324 can reside on a first server, while the rules engine 322 and rebates database 316 reside on a second server, the accounts service 326 resides on a third server, and the accounts database 314 resides on a fourth server. Numerous other combinations of hardware implementations can be carried out by one of skill in the art. Further, there is no requirement that any of these components reside on a single computing device. For instance, the rules engine 322 may be distributed among two or three servers and the various databases may be distributed between multiple servers.

The following descriptions show how the systems and methods described in FIGS. 2-11 can be implemented with more concrete and recognizable examples. These examples are not limiting, but rather merely meant to help elucidate the more general systems and methods already described and shown.

Figure 12:
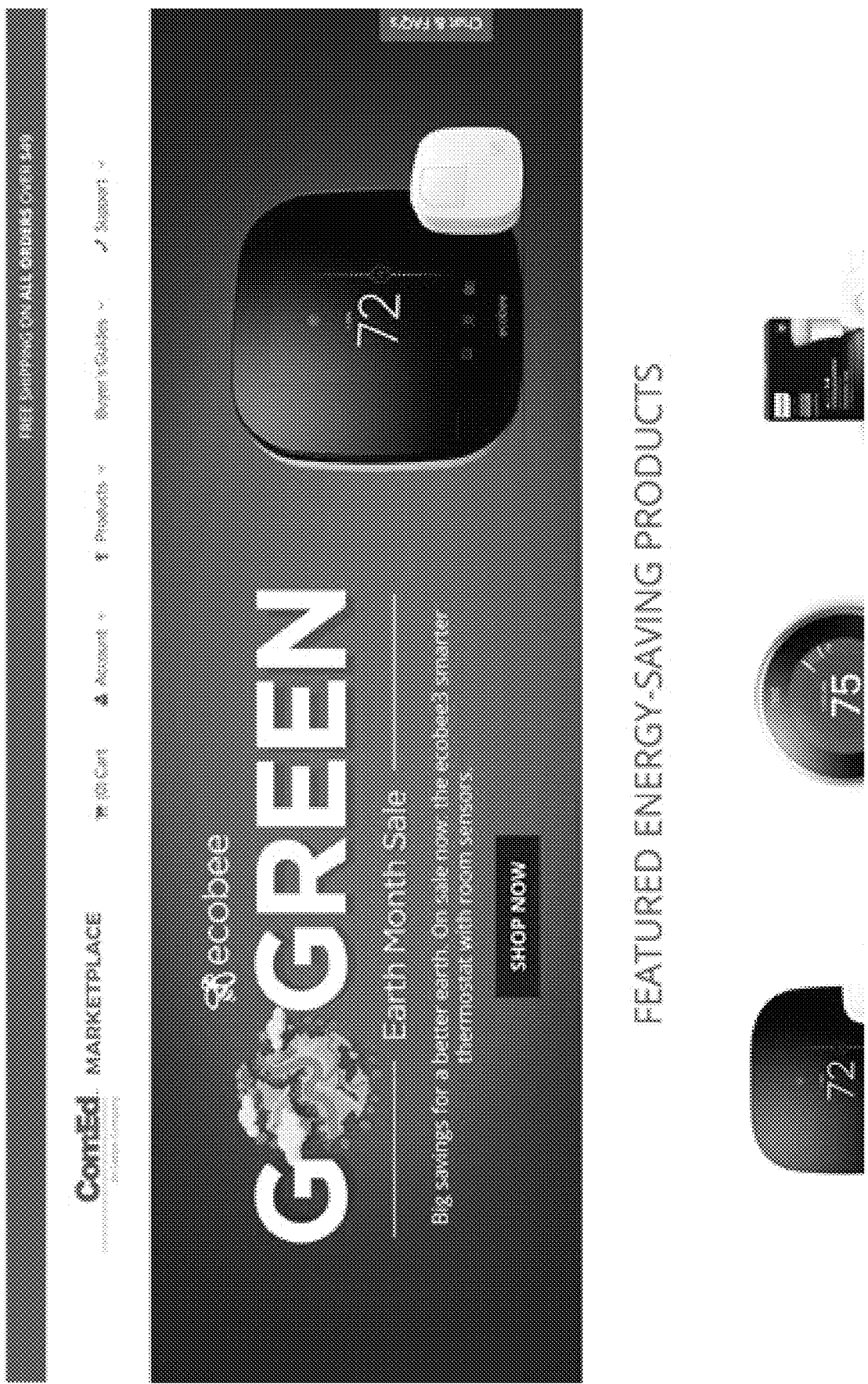
FIG. 12 illustrates a user interface that a customer may encounter as displayed on a personal computing device, and generated by one of the frontends discussed earlier.
Figure 13:
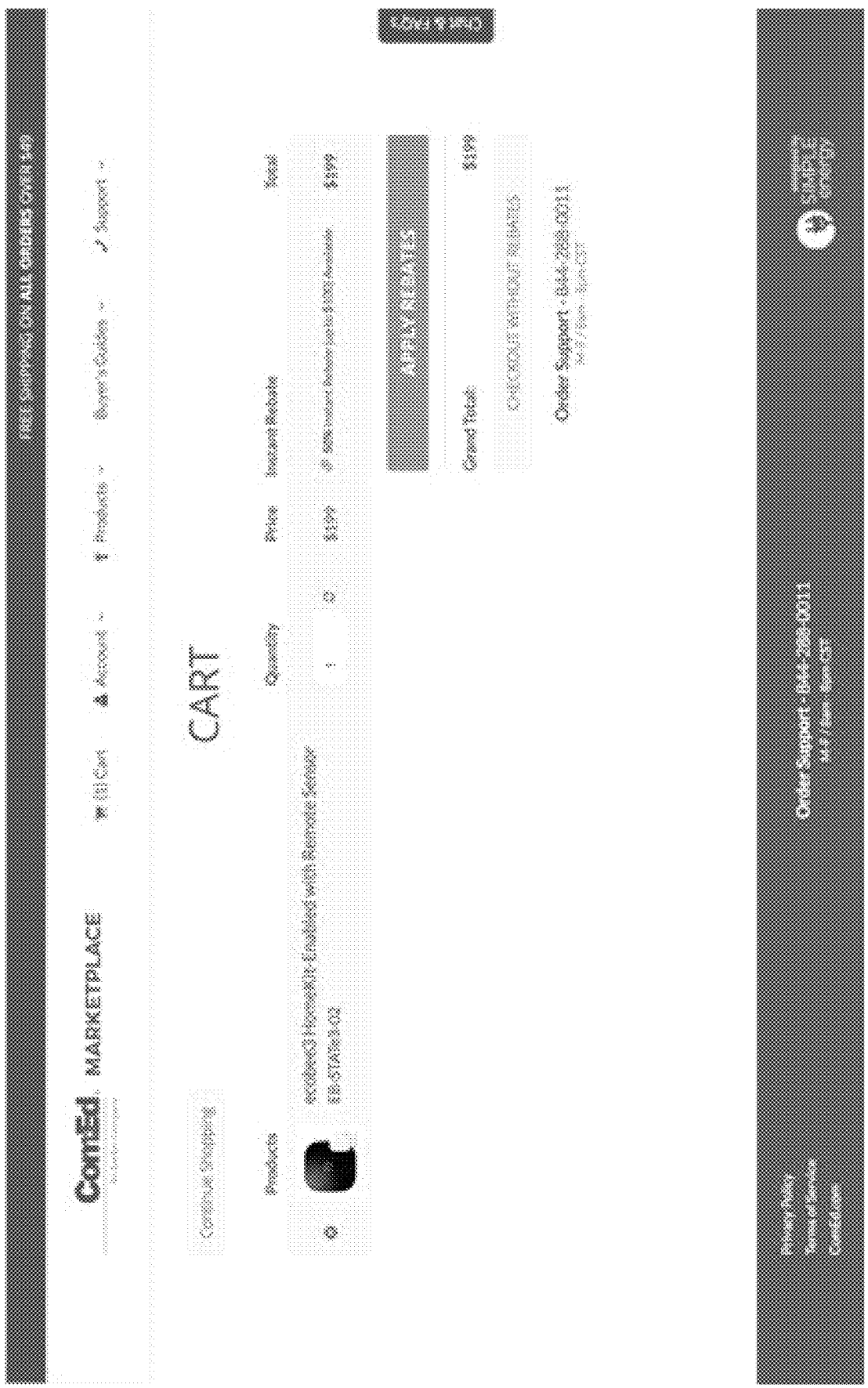
FIG. 13 illustrates another user interface that can be displayed on a frontend.

FIG. 12 illustrates a user interface that a customer may encounter as displayed on a personal computing device, and generated by one of the frontends 340, 342, 344, 346, 348, 350 discussed earlier. If the customer opts to purchase one of the devices displayed, then the corresponding frontend 340, 342, 344, 346, 348, 350 may provide a checkout user interface (FIG. 13) including an indication that rebates are available and a maximum rebate value or percentage available as shown below. This process of providing a validated rebate to the user involves numerous steps as discussed above, yet is performed with such speed, that the customer is not aware of the backend operations behind the instant rebate display.

Once a customer selects the "Apply Rebates" button or any other indication of a desire to utilize the rebate(s), the system can perform 'instant' validation to determine final rebate eligibility for the customer and optionally acquire a coupon from the product vendor or utility that can be automatically applied to the utility or product vendor web site or app.

Figure 14:
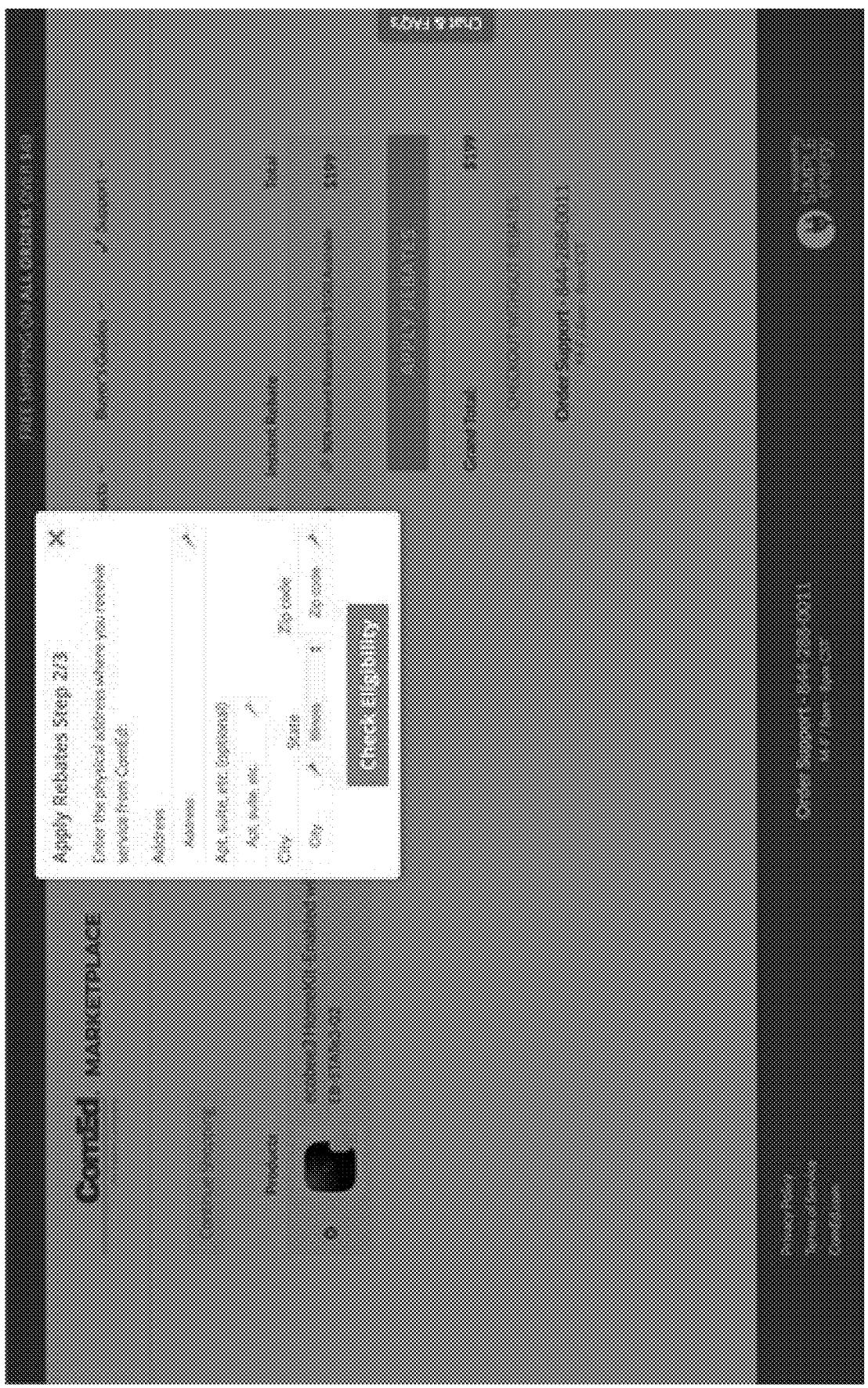
FIG. 14 illustrates another user interface that can be displayed on a frontend.

To ensure that rebates are only applied to customers of an appropriate utility, a single sign on authorization may be used (login is only possible for utility customers) or the accounts service 326 can validate a customer's account and/or address where single sign on is not used. The accounts service 326 can receive or request an address and/or utility account identifier from the customer via the frontend as seen in FIG. 14.

The customer can provide the requested info via the frontend which is then relayed back to the accounts service 326, which queries the accounts database 314 to find a matching customer account. If so, then the customer's association with a utility has been validated.

Figure 15:
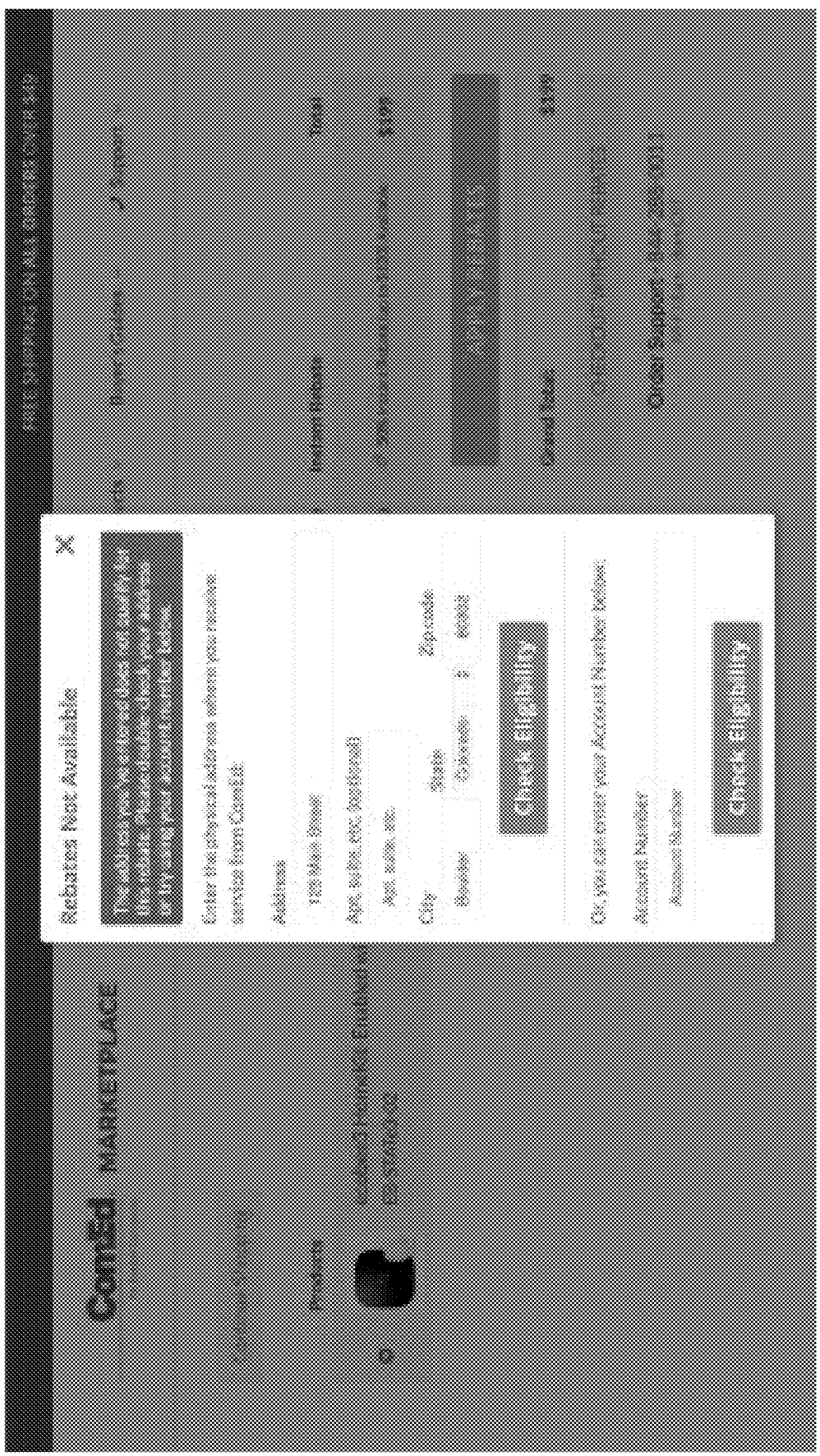
FIG. 15 illustrates another user interface that can be displayed on a frontend.

However, if the accounts service 326 finds that the customer's input does not match a customer account in the accounts database 314, then the accounts service 326 may return an error to the frontend (see FIG. 15). In some cases, the frontend may present a second prompt to the customer asking for a secondary means of identification, such as a utility customer account number (see FIG. 15).

In some cases, there may be a desire for a physical barcode that a user can take into a brick and mortar store and pick up a product purchased via the instant rebate system. For these cases, a barcode service (not illustrated) can convert a coupon code into a barcode that can be printed and used in brick and mortar stores. This conversion is dynamic and thus may not use long-term storage, such as recording the barcode or coupon code to a database. Cache and non-volatile memory may be used in this conversion process.

Figure 16:
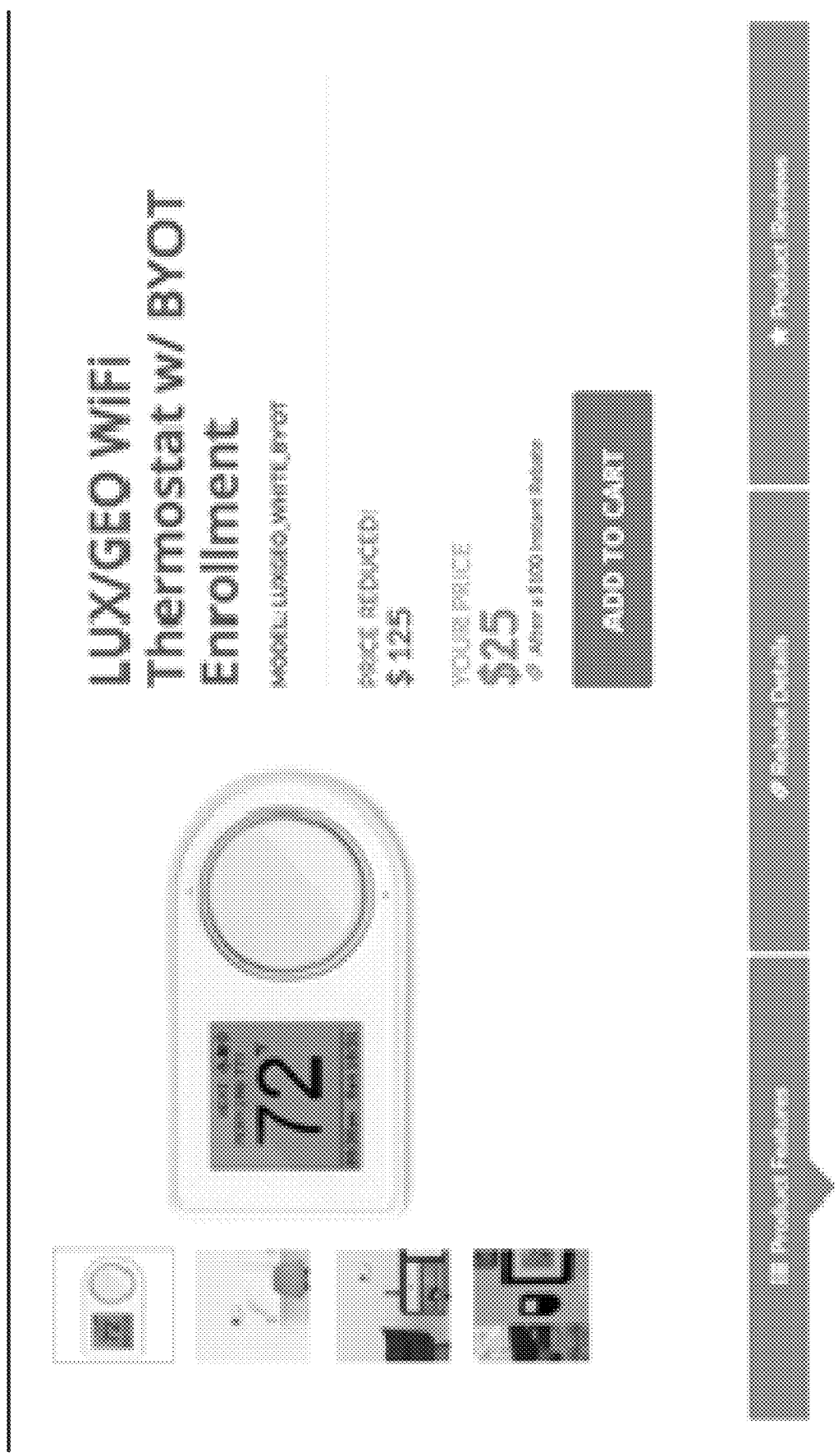
FIG. 16 illustrates another user interface that can be displayed on a frontend.

Eligibility may be validated after a customer declaration is made. For instance, FIG. 16 shows a user interface with a partially-validated rebate displayed. If the user adds the product to the cart, then FIG. 17 shows a declaration that the customer may have to attend to.

Figure 18:
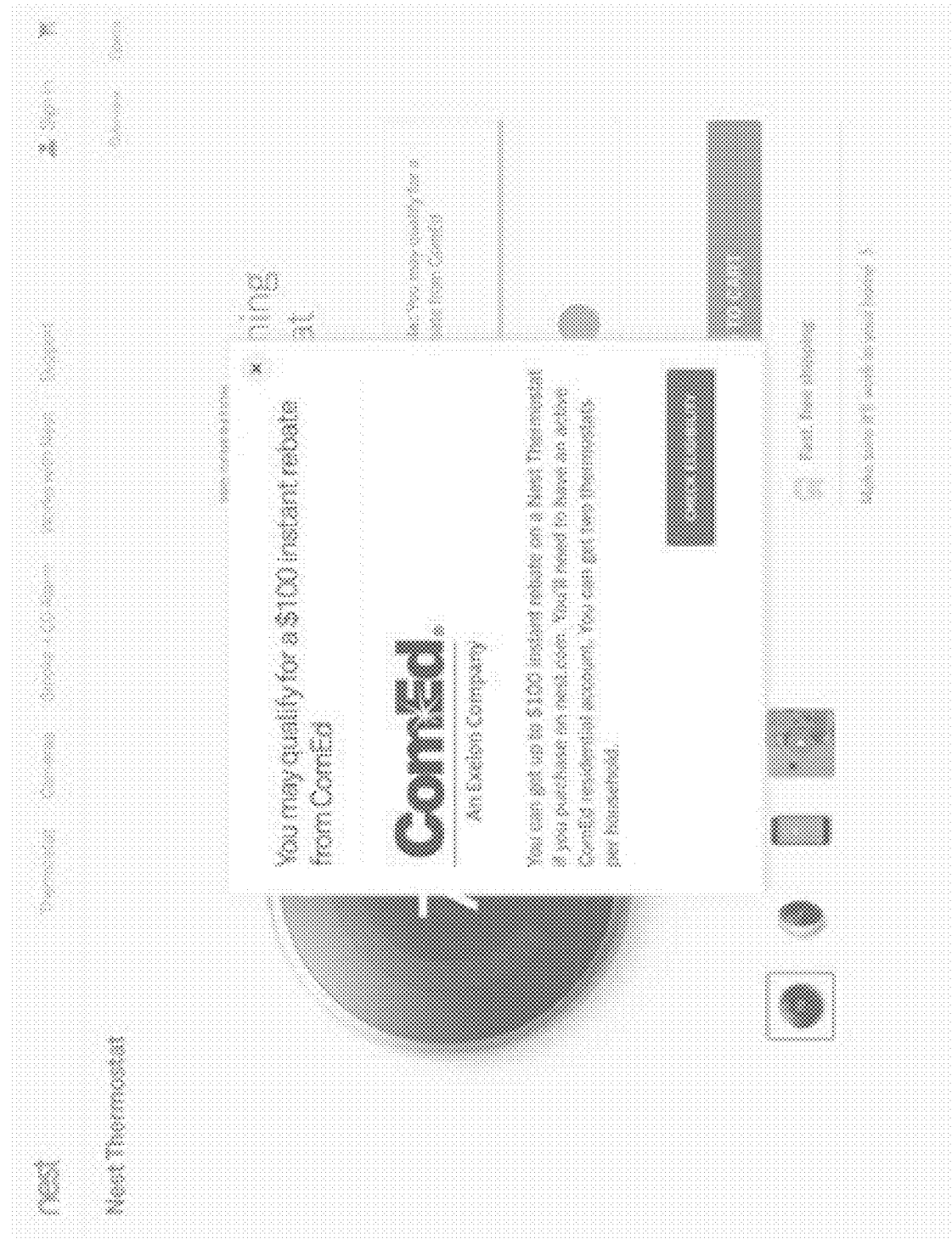
FIG. 18 illustrates another user interface that can be displayed on a frontend.
Figure 19:
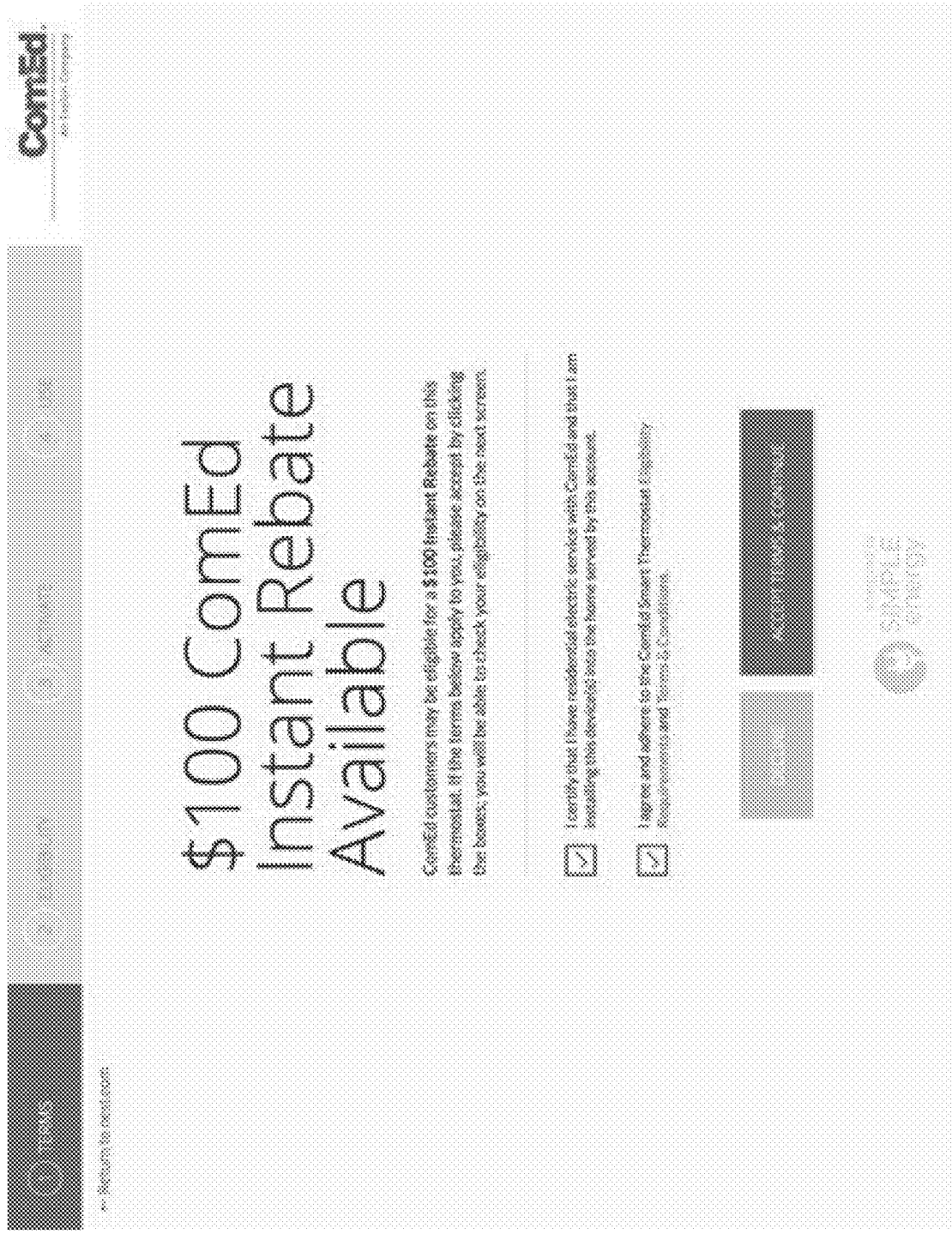
FIG. 19 illustrates another user interface that can be displayed on a frontend.
Figure 20:
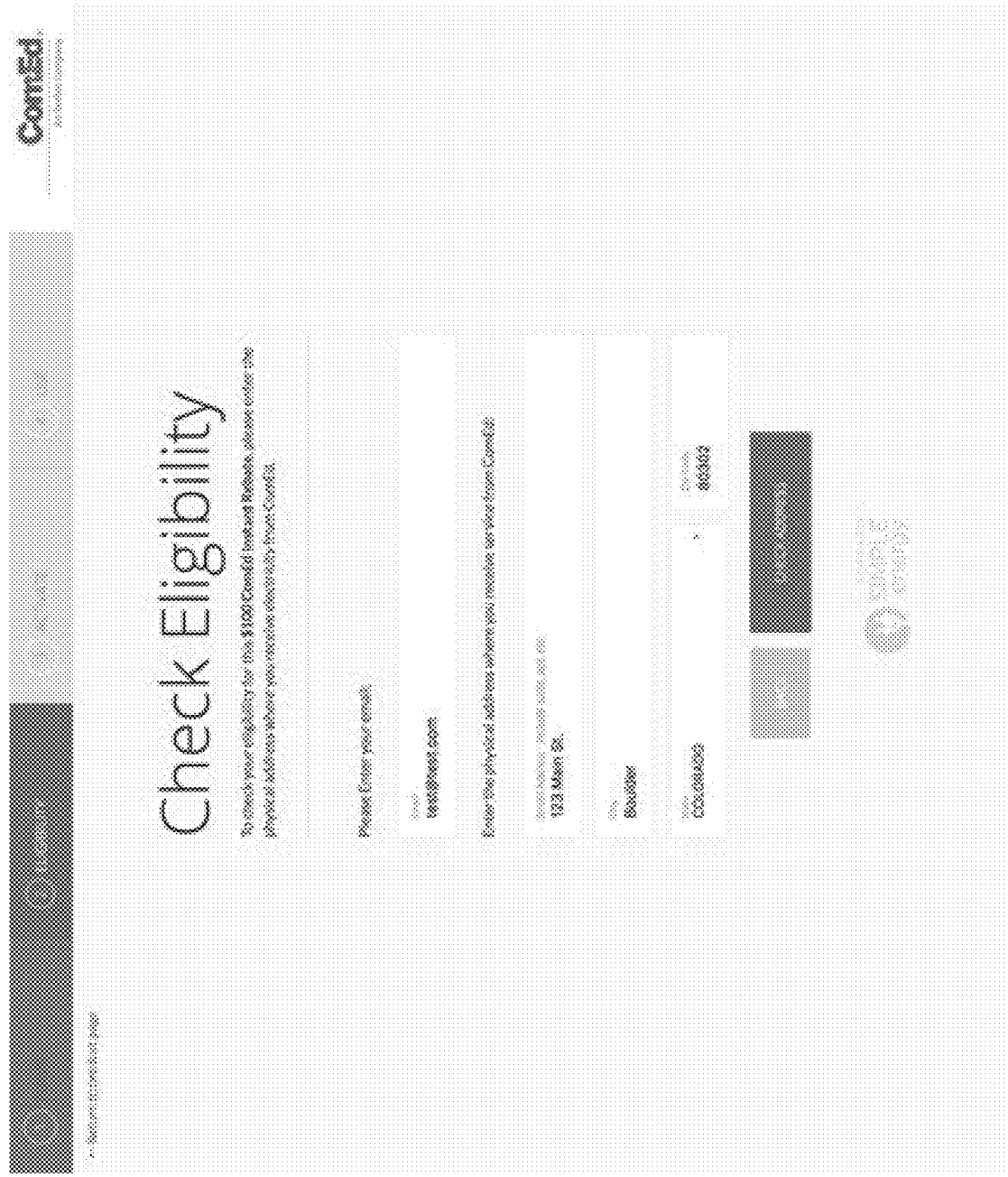
FIG. 20 illustrates another user interface that can be displayed on a frontend.

Other embodiments of validation may see a customer redirected from a product vendor site to a validation website (e.g., associated with the customer's utility company as seen in FIG. 18). Here, the customer is redirected to a website having a series of steps used to validate the eligibility. For instance, the customer may be prompted to enter a declaration followed by an address/account check (see FIGS. 19 and 20).

Figure 21:
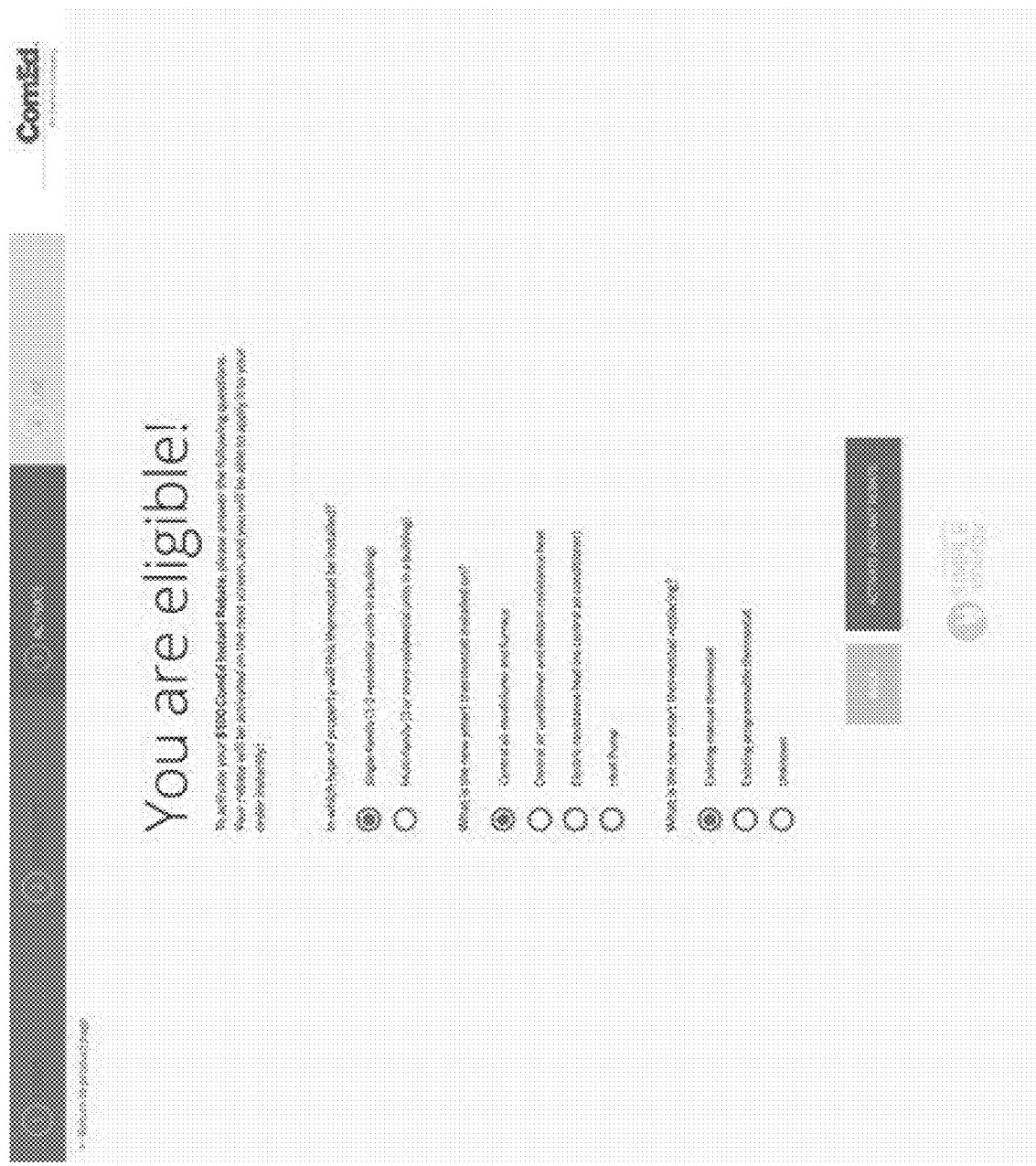
FIG. 21 illustrates another user interface that can be displayed on a frontend.

The instant rebate system 702 may also prompt a customer to fill out a survey before the rebate can be applied (see FIG. 21).

Figure 22:
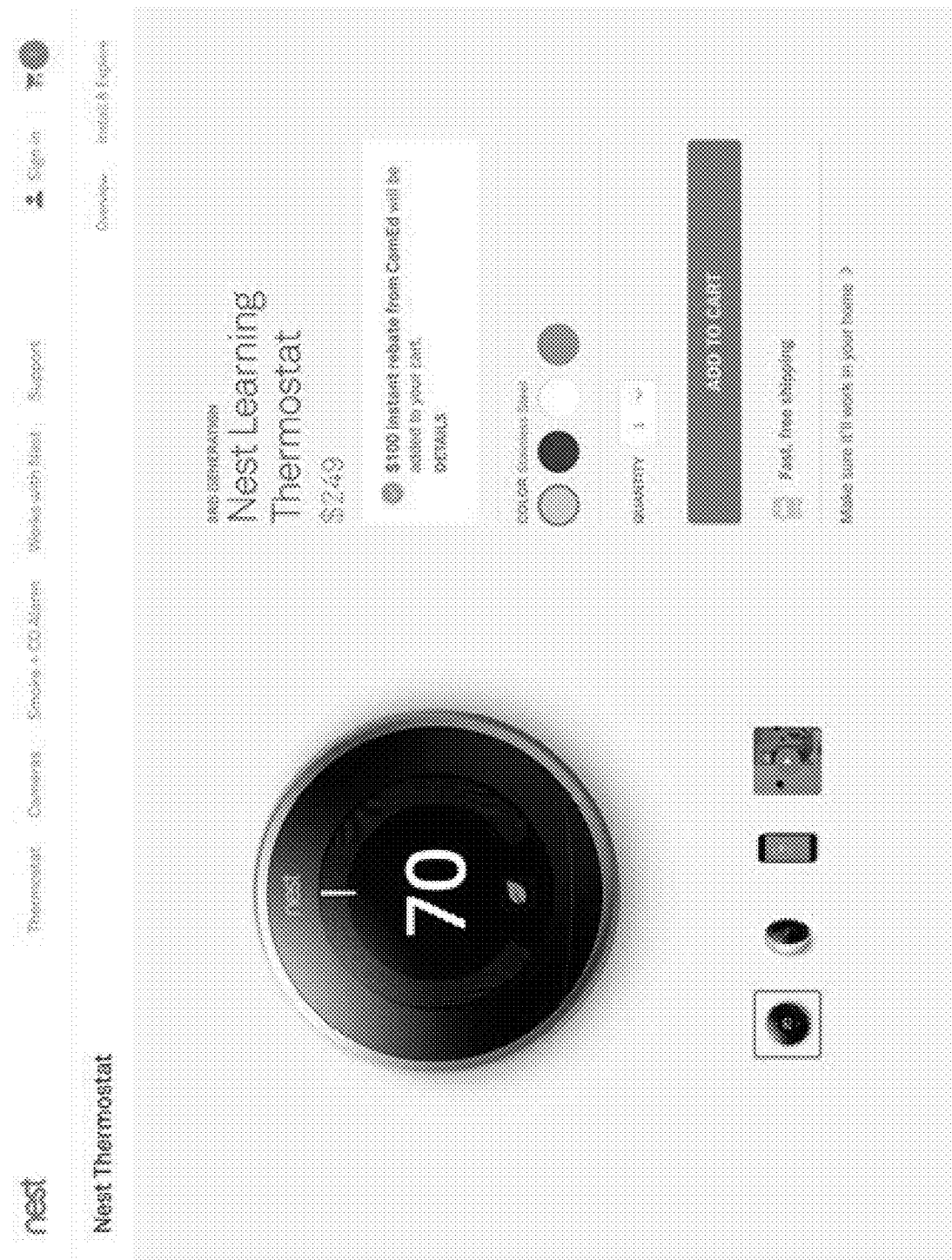
FIG. 22 illustrates another user interface that can be displayed on a frontend.
Figure 23:
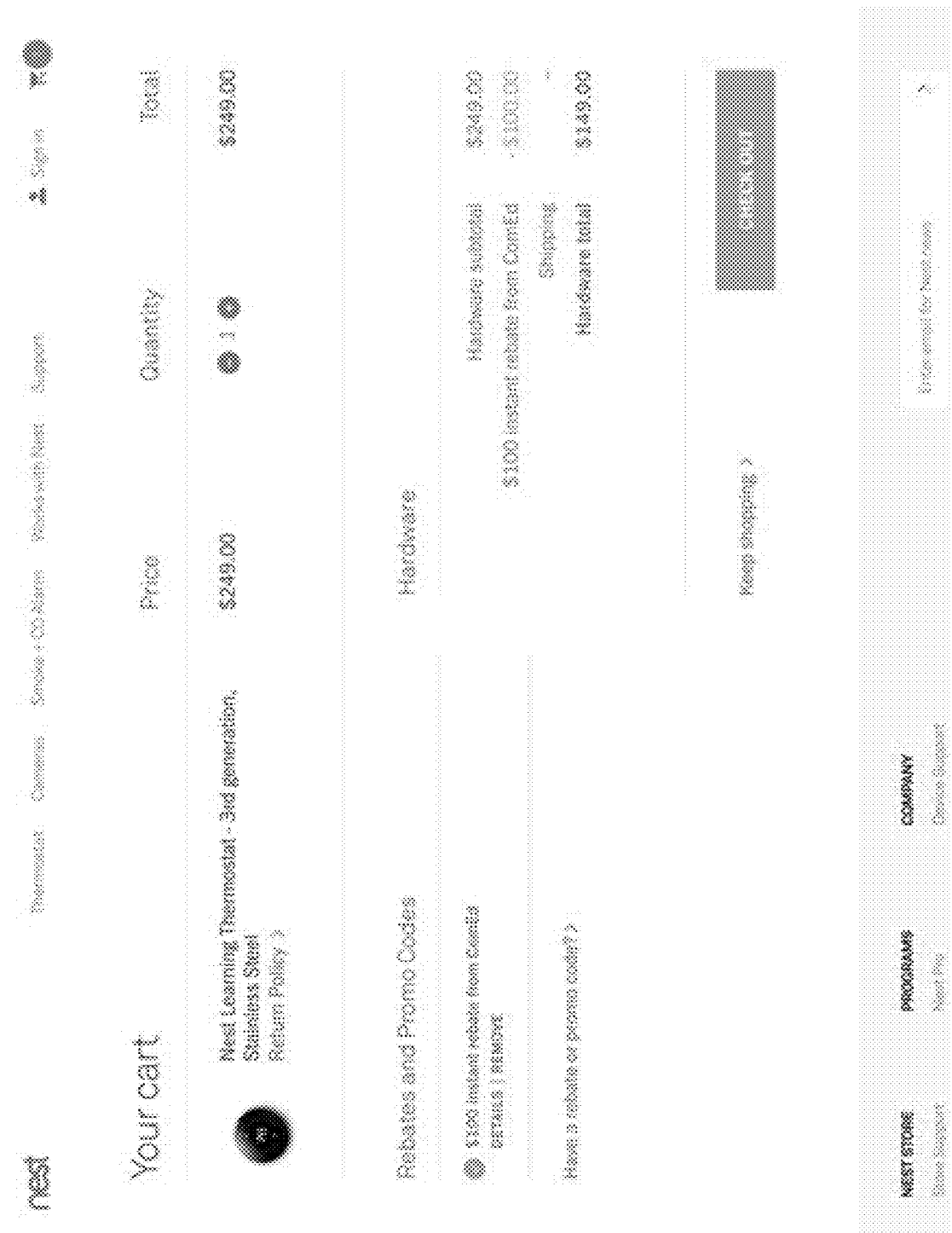
FIG. 23 illustrates another user interface that can be displayed on a frontend.
Figure 24:
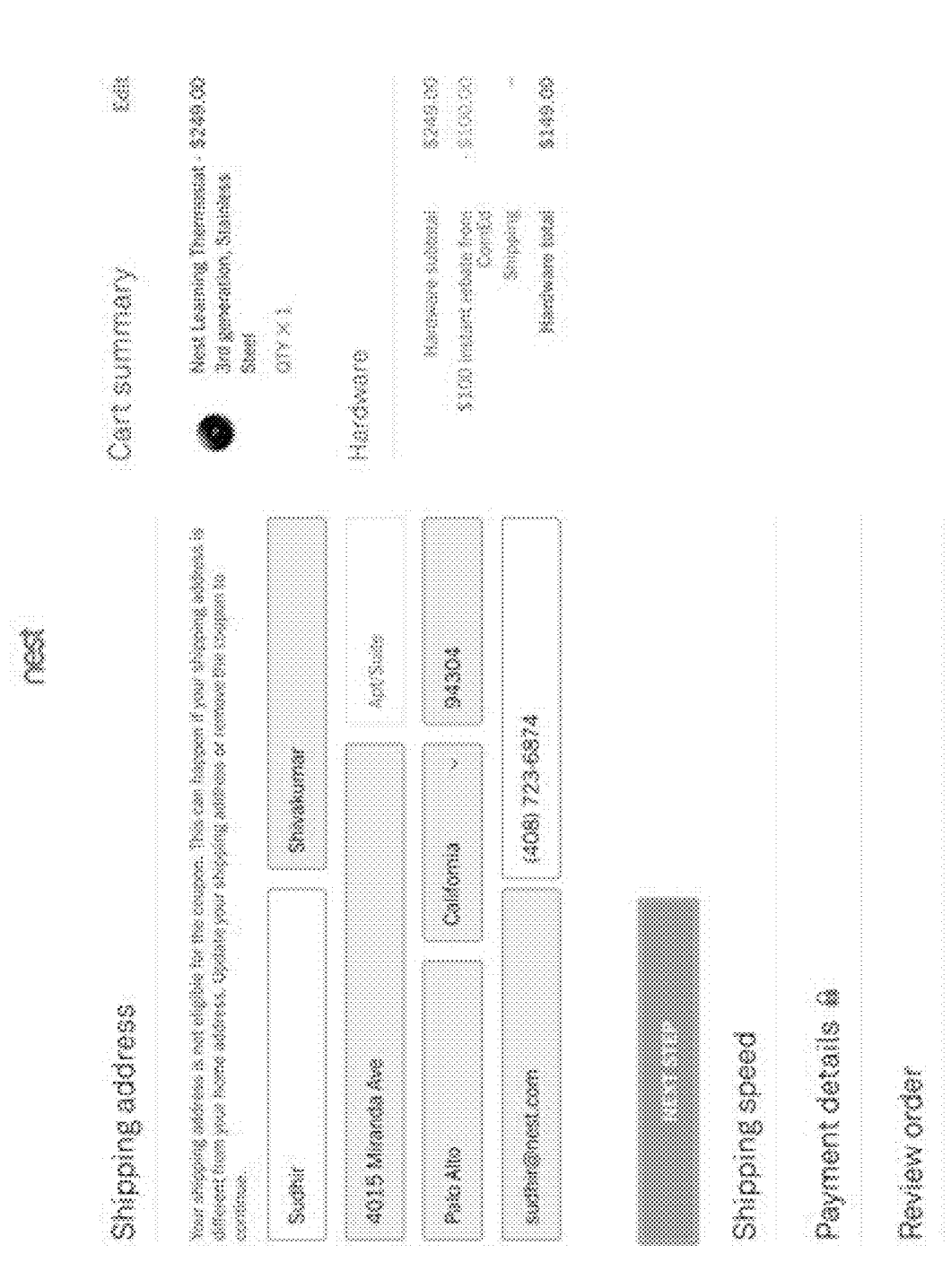
FIG. 24 illustrates another user interface that can be displayed on a frontend.
Figure 25:
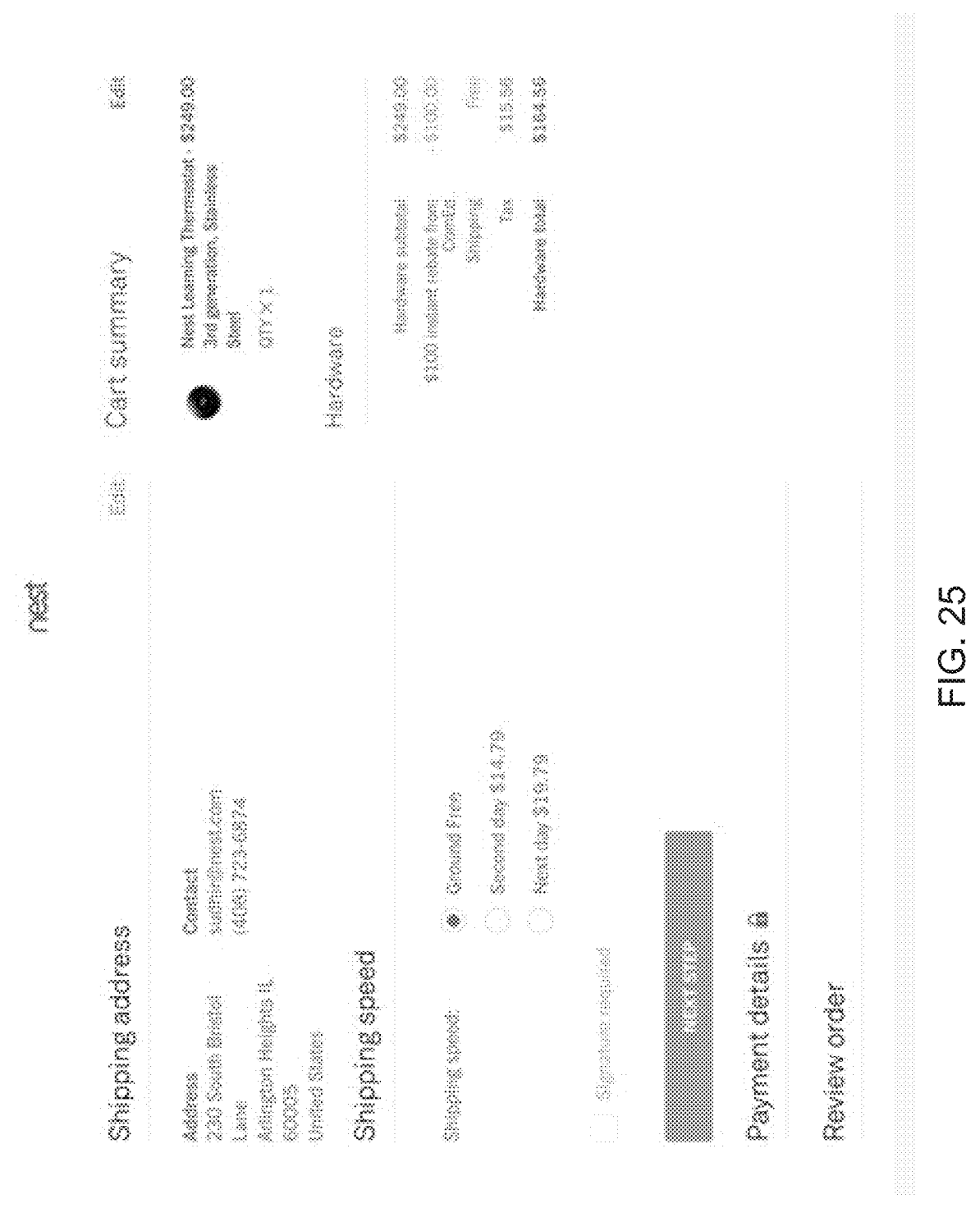
Figure 26:
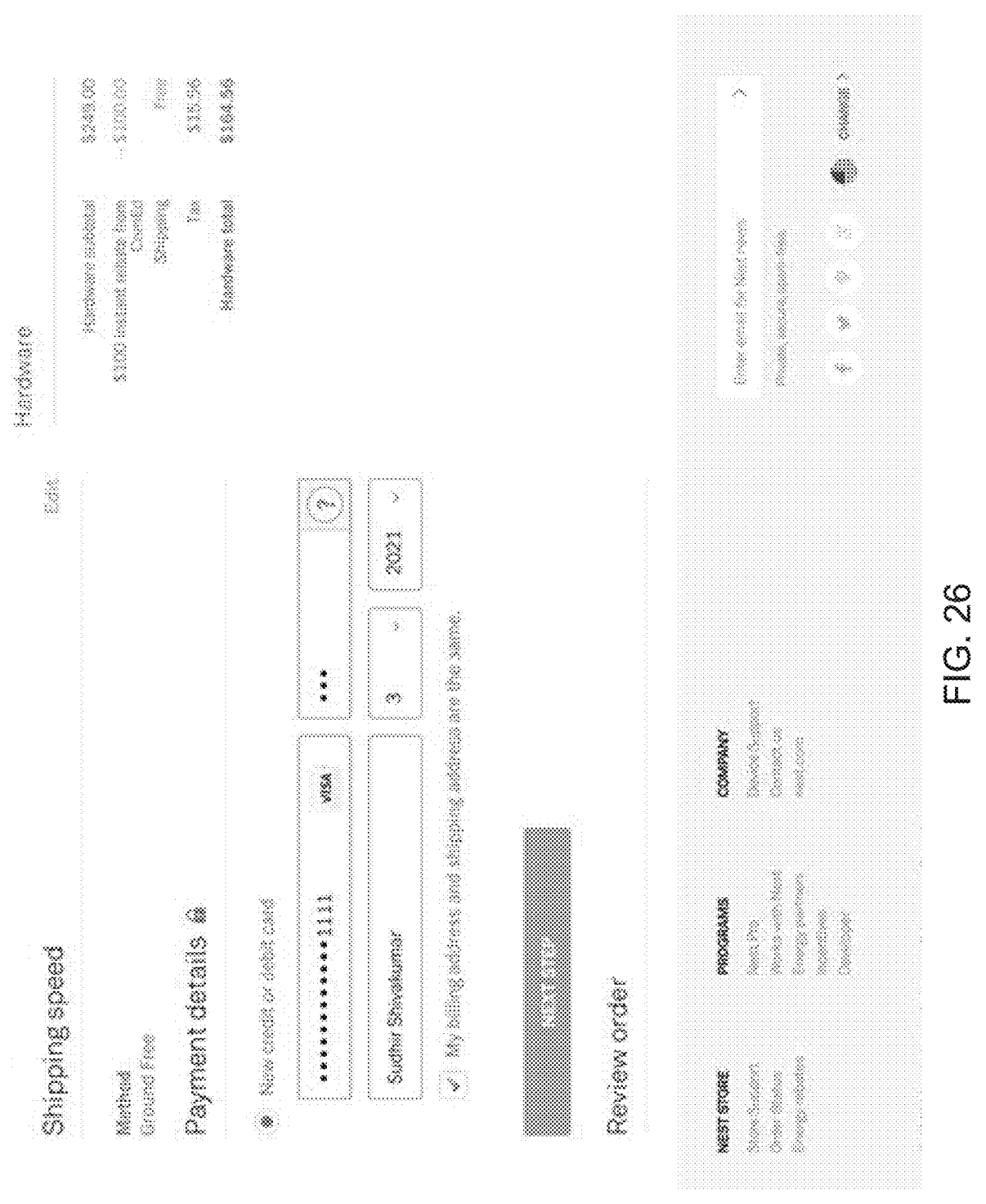
Figure 27:
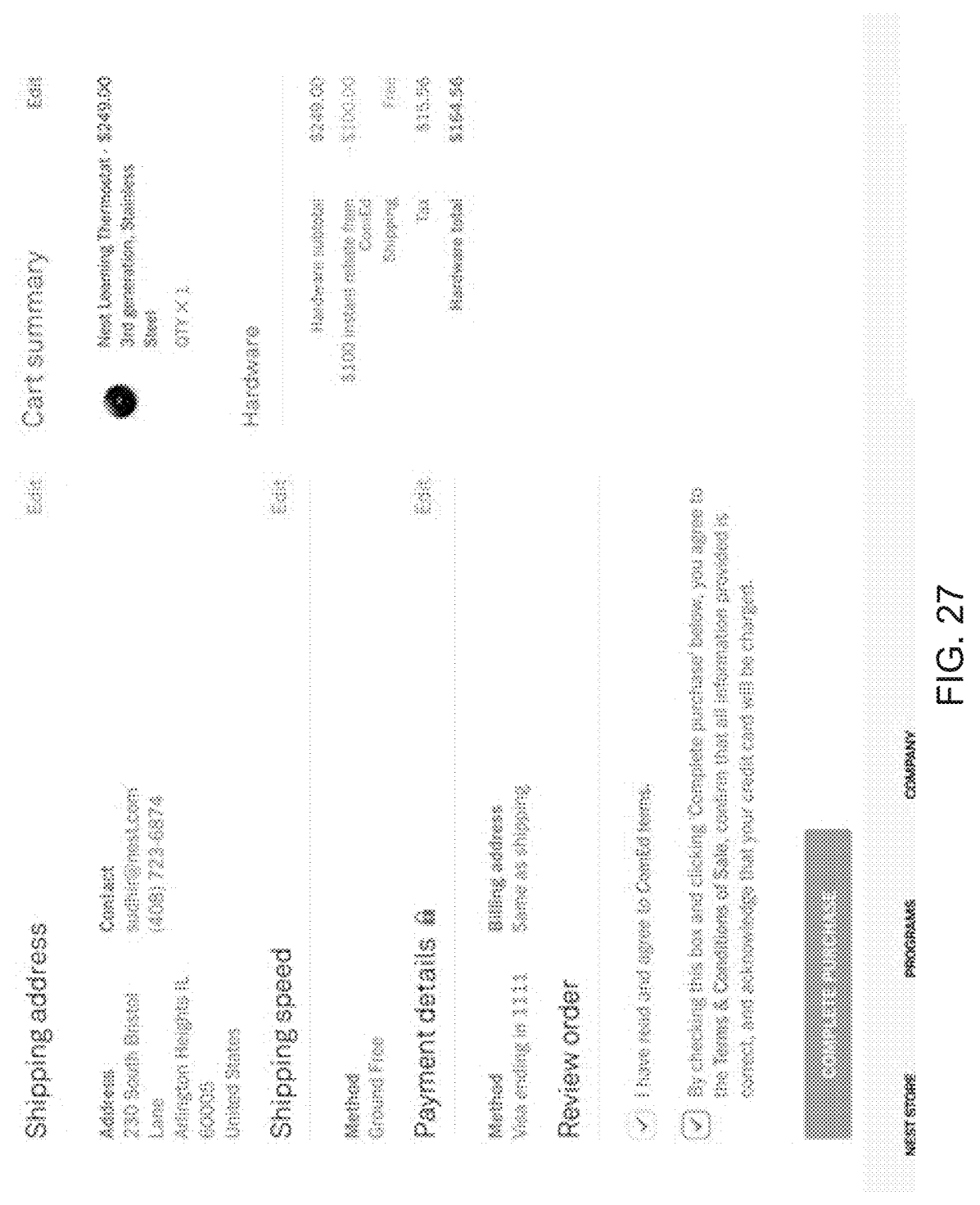
Figure 28:
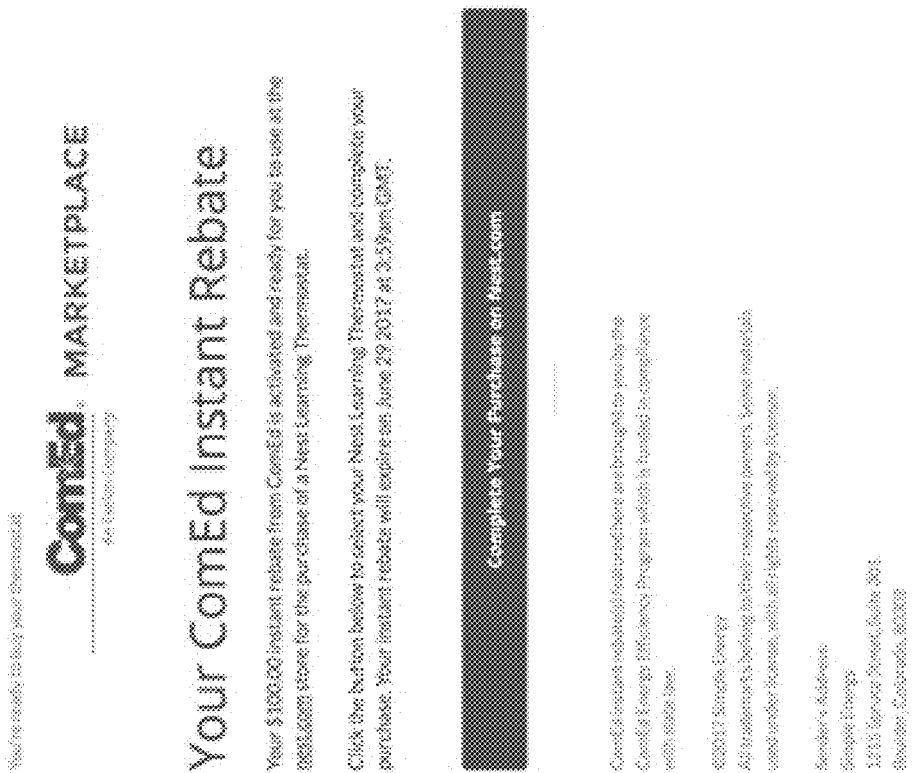
FIG. 28 illustrates another user interface that can be displayed on a frontend.
Figure 29:
FIG. 29 illustrates another user interface that can be displayed on a frontend.

Once validation is completed, the customer can be directed back to the product vendor or retailer webpage, and a coupon for the rebate value can be automatically applied as shown in FIG. 22. The customer can then complete the purchase through the vendor/retailer website. However, in some cases, there may be further checks on eligibility. For instance, the accounts service 326 may check address and/or account information during checkout as seen in FIGS. 23-26. In some cases, checkout may require further declarations to be completed—these declarations being specific to the user, product, and utility (see FIG. 27).

Where the customer is making a purchase through a utility website rather than through a manufacturer or retailer webpage or app, the system may direct the customer to a product page after the customer has completed eligibility requirements (see FIG. 28). In such a situation, the system may communicate with the product vendor's API to apply the rebate to the product page that otherwise would not be visible/accessible (see FIG. 29)

While this disclosure has largely focused on instant rebates for products, in other embodiments, instant rebates for services can be offered instead of or alongside products. For instance, the discountatron 325 can determine a value of instant rebates for services based on one or more of the following: type of request, whether the utility has a trade ally for the service, and whether the installation is part of an energy efficient utility program (e.g., the utility can get credit for installation of the device). Also, a contractor frontend 350 may be used to implement instant rebates for services.

Figure 30:
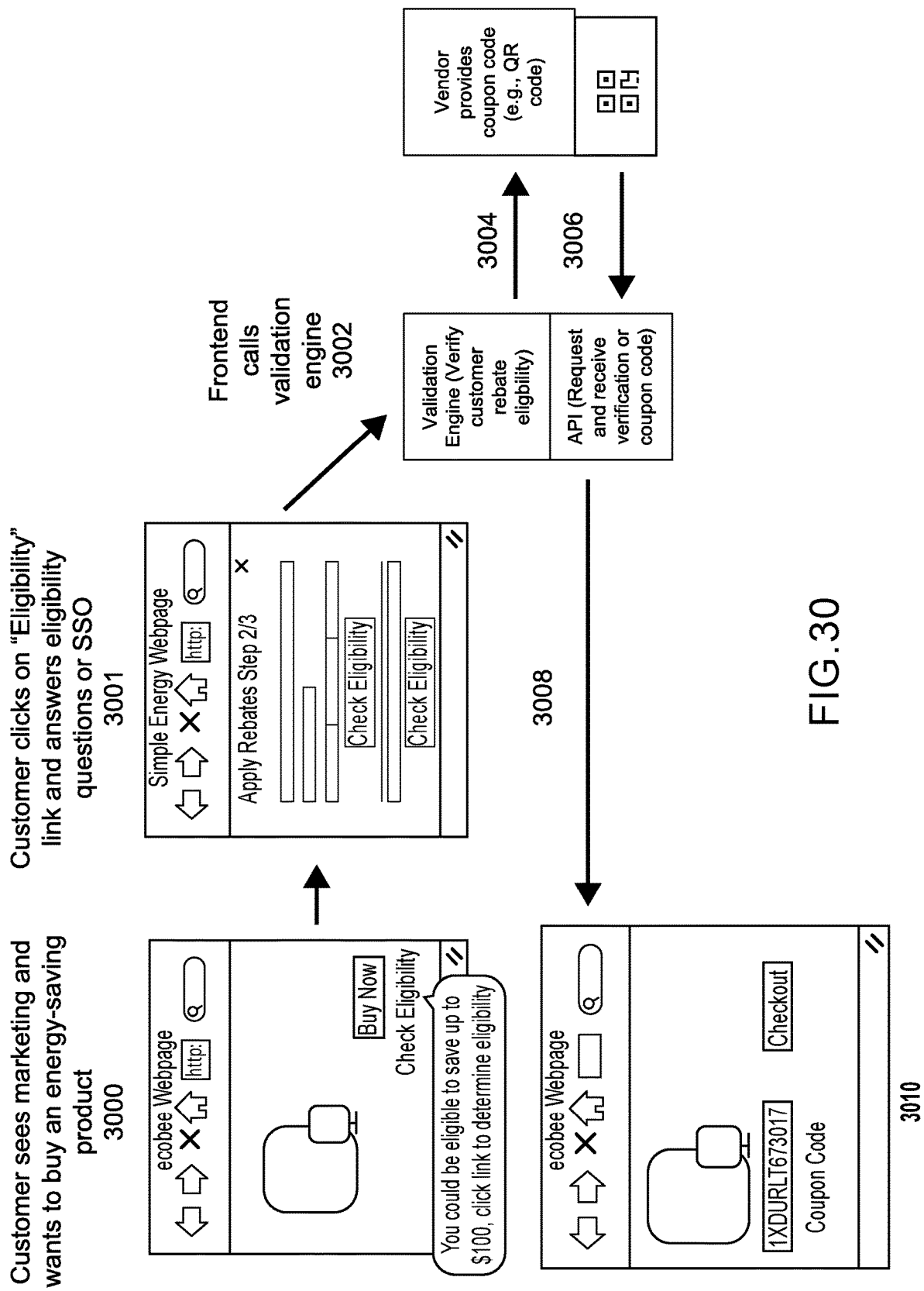
FIG. 30 illustrates an embodiment of a first portion of a method for implementing an instant rebate system.
Figure 31:
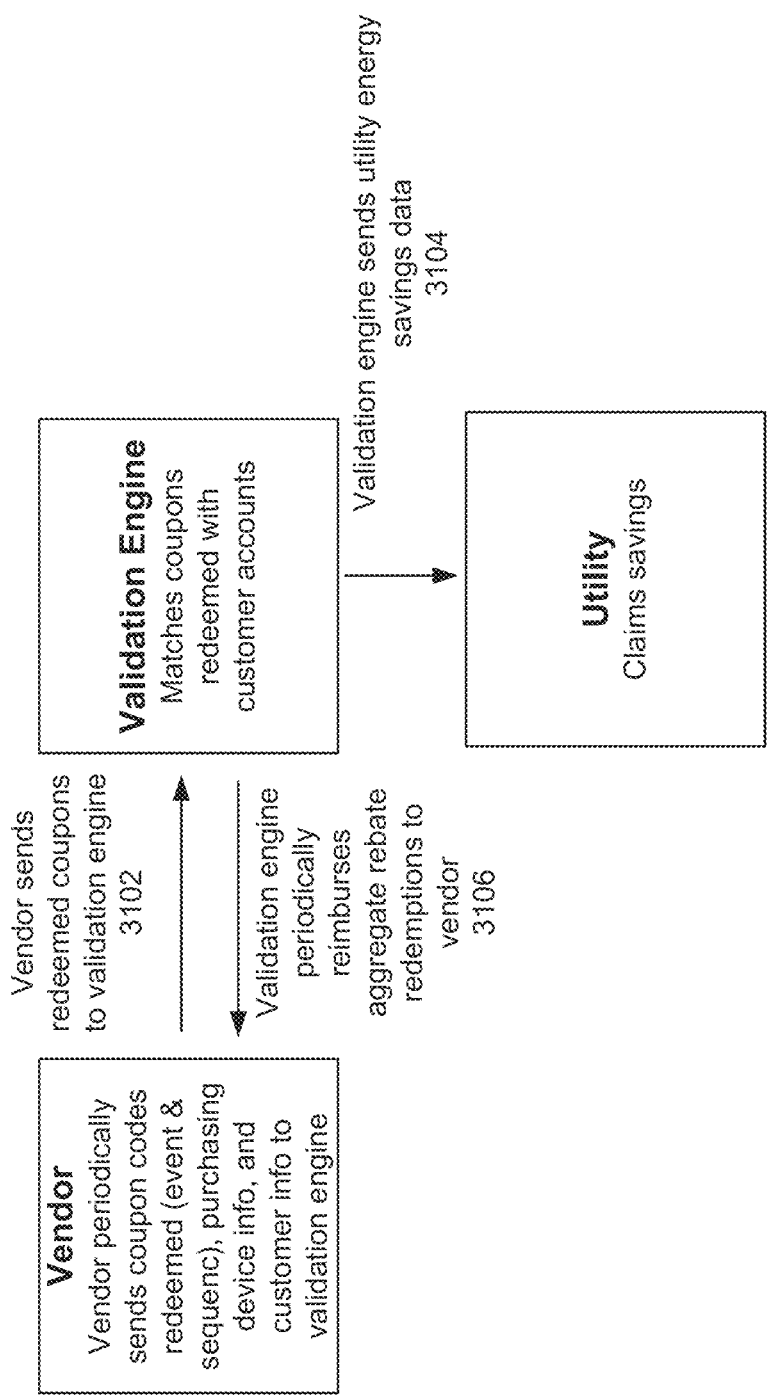
FIG. 31 illustrates a second portion of the method shown in FIG. 31.

The flowcharts in FIGS. 30 and 31 show an embodiment of a flow for the instant rebate system illustrated and described earlier (see FIG. 30). In this method, a customer accesses a frontend (either directly through a product vendor website, a utility website, or a retailer of the product) (3000). The customer is then presented with eligibility criteria via the user interface (e.g., address, account number, name, e-mail address, terms and conditions, rules) (3001). In an embodiment, the aforementioned can be accomplished at the application layer and via data already stored in the frontend. The frontend can then call the validation engine 300 and verify customer rebate eligibility (3002). Specifically, the rules engine 322 can determine eligibility, and if approved, the broker 324 can reach out to the product vendor (e.g., NEST or ECOBEE) requesting a rebate coupon via an API call (3004). This can be performed in real-time and with sufficient speed that the customer does not notice a delay, and the rebate appears "instantly." The product vendor and the broker 325 (or discountatron 325) can have an established trust, such that the broker 325 (or discountatron 325) only requests a coupon when eligibility has been confirmed by the rules engine 322. Thus, the product vendor need only provide coupons when requested—no validation is required by the product vendor. The product vendor then returns a coupon to the broker 324 (or discountatron 325) (3006) and the broker 324 sends the coupon back to the frontend (3008). The frontend can then display a code corresponding to the coupon or can automatically apply a value of the coupon to the product being purchased. The customer can then complete checkout at the discounted price without having to mail in any rebate forms (3010).

In the background of individual customer purchases and rebate validations, a trust relationship between the product vendor, the validation engine, and the utilities, can be established as shown in FIG. 31. A product vendor can send data to the validation engine (3102), and this can be done periodically (e.g., daily or weekly) or non-periodically (e.g., in real-time). The data can include redeemed coupon codes (including event and sequence), product info, and customer info. The validation engine can match this data with customer accounts for customers that have made purchases and to the coupons distributed to customers. Each coupon can be unique and can have a unique identification number. The validation engine can aggregate purchases made (e.g., via RRTS 321) and periodically transfer corresponding payments to the product vendor (e.g., monthly) (3106). The validation engine may also track energy usage associated with customers that have made purchases (e.g., through APIs provided by the utility). The validation engine can report energy usage to the utility, including analysis of costs savings resulting from customers who purchased and seemingly installed energy saving products (3104). In this way, the utility can claim cost savings and assess the effectiveness of rebates.

Figure 32:
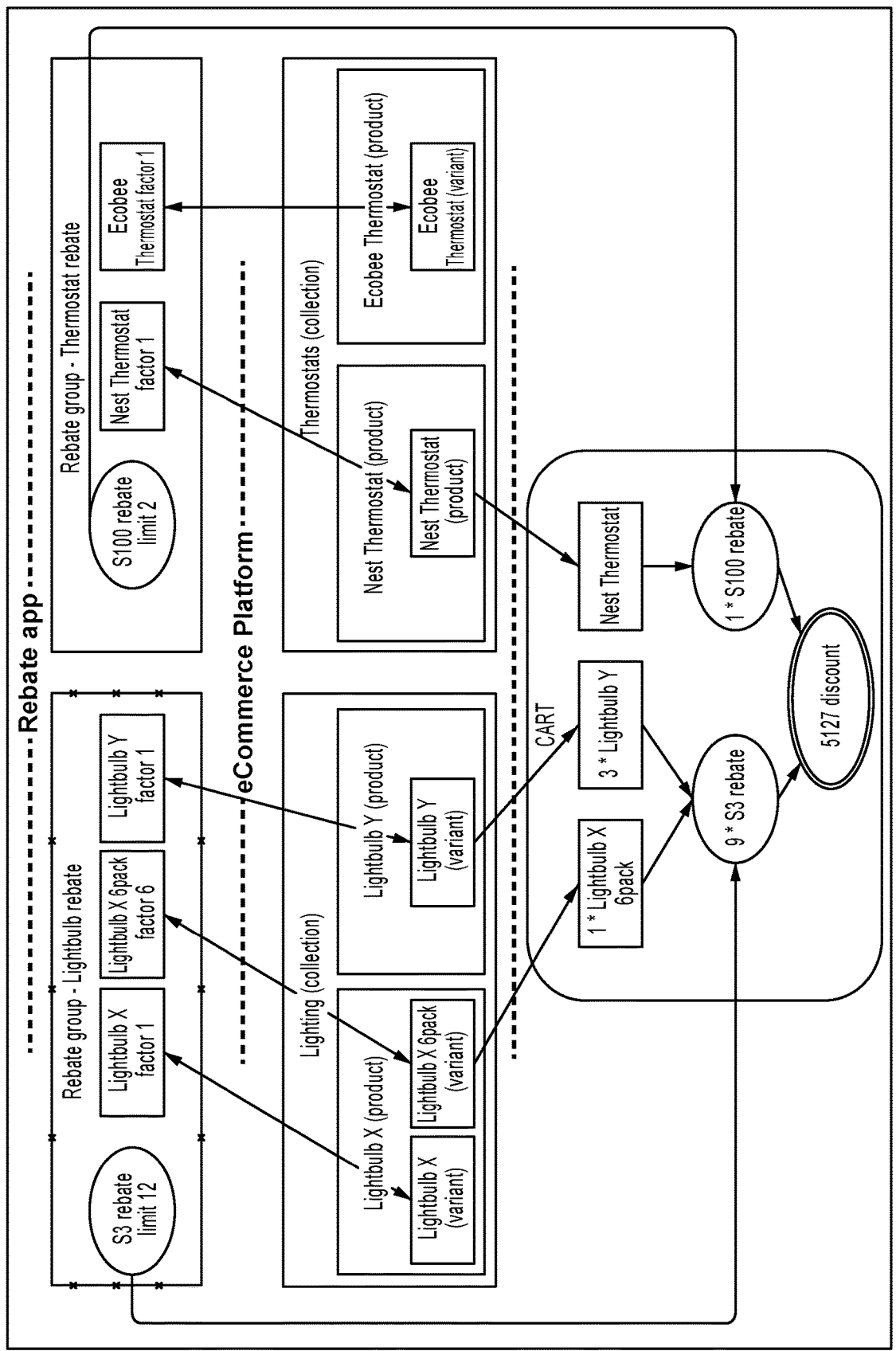
FIG. 32 illustrates a visualization of combining multiple rebates and rules regarding limits on stacking of rebates.

FIG. 32 illustrates a visualization of combining multiple rebates and rules regarding limits on stacking of rebates. This illustration includes a layer representing an application or other software that interfaces with a customer and tracks available products and available rebates. It also includes a vendor or eCommerce Platform layer (e.g., SHOPIFY).

Finally, there is a shopping cart layer. At the app layer, the app can include runtime rules for limits on the numbers of certain types of products that rebates can be applied to as well as amounts of the rebates. For instance, for lightbulbs, or product Group A, there is a $3 rebate per lightbulb and a limit of 12 rebates. There are also three product types: individually-packaged lightbulbs of type X, 6-packs of lightbulbs type X, and individually-packaged lightbulbs of type Y. For thermostats, or product Group B, there is a $100 rebate and a limit of 2 rebates. Thermostats are individually-packaged and sold by either NEST or ECOBEE in this example.

A customer can add products to the shopping cart and the Shopify layer can track the stacking of rebates. For instance, if a customer adds one 6-pack of type X lightbulbs and three single bulbs of type Y, then the total rebate value for lightbulbs is 9×$3 or $27, and the total rebates, 9, is less than the limit, to the purchase can be approved. At the same time, the customer may also add a single smart thermostat to the shopping cart, adding an additional $100 rebate to the total, or $127 total. Since there are no rules that limit combinations of thermostats and lightbulbs, the combined rebate can be approved.

Figure 33:
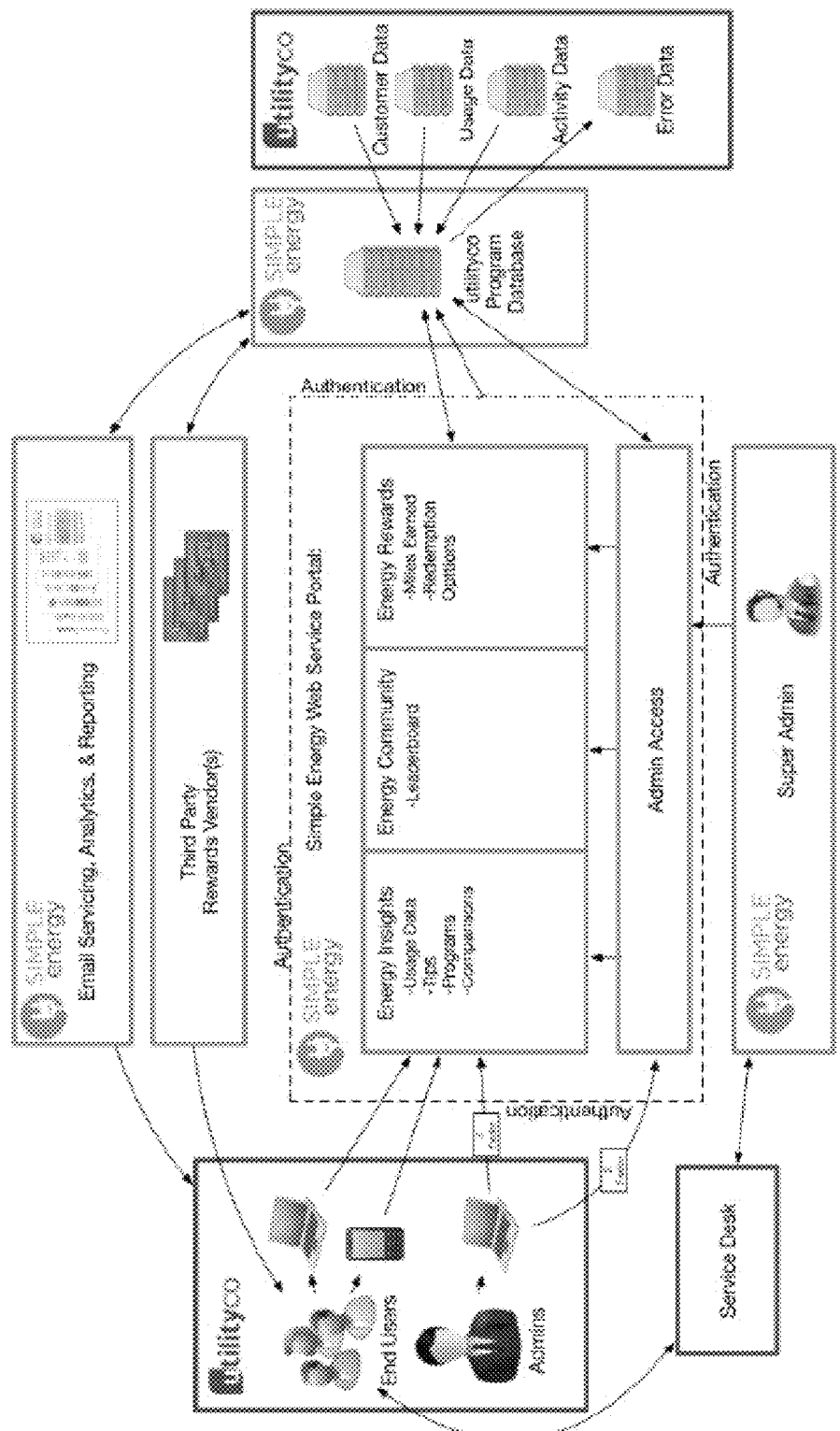
FIG. 33 illustrates one embodiment of an engagement engine and portal.

FIG. 33 shows one embodiment of an engagement engine and portal. End users interact with a portal having the engagement engine as a backend, but branded to look and feel the same as the utility partner's website. The engagement engine uses an extensive database to store information about the users, their behavior and their energy usage. The information in the database comes from the utility partner and the engagement engine. Information from the utility partner includes customer account data, including their premises, energy usage data and utility partner program participation.

Demand Response Enrollment & Demand Response Rebate Generation.

When a utility customer joins a demand response program with a utility, the customer agrees to allow the utility to remotely control a heating unit, cooling unit, or other energy-consuming device, at the utility's discretion, in order to reduce regional demand on power stations during peak usage periods of the year and day. During these peak demand times, utilities commonly find the overall energy demand far greater than average and must either design for extra capacity in the utility's power generation stations or face blackouts. For example, raising the set temperature in the customer's residence during peak high-temperature times, and decreasing the set temperature in customer's residence during low temperature times, accomplishes a net reduction in power consumption seen by the utility. Additionally, smart home controllers may provide utilities even further control over customer energy consumption via demand response programs. For instance, smart home controllers may optimize power consumption and/or generation of electric vehicle chargers, electric water heaters with smart controllers, WIFI connected lighting, smart plugs, smart power strips, and other appliances on a WIFI network, to lower the electrical usage and/or generation during peak demand times. Such lowering of the set point temperatures or the optimization of smart devices is possible through internet communication with the customer's home. However, in order for the utility to effectively implement demand response measures, the customer device(s) must be enrolled in the utilities' demand response program.

The customer typically enrolls in a demand response program after purchasing and installing a demand response eligible product (e.g., a smart thermostat, smart water heater or controller, EV charger, networked outlet, networked light bulb, etc.). As such, many customers fail to register for demand response due to the additional steps required after purchase of the energy-related device. This disclosure solves this challenge by enabling enrollment at the time of purchasing the energy saving device that is demand response eligible. Providing the rebate at checkout may also incentive device purchases as well as demand response enrollment. The present embodiments of the disclosure relate to a customer's enrollment in such demand response programs at the time of purchase of an energy-related device. The ability to quickly check demand response eligibility as well as device rebate eligibility, is made possible in part via the instant rebate systems and methods previously described.

Instant Rebates for Demand Response Enrollment

Figure 34:
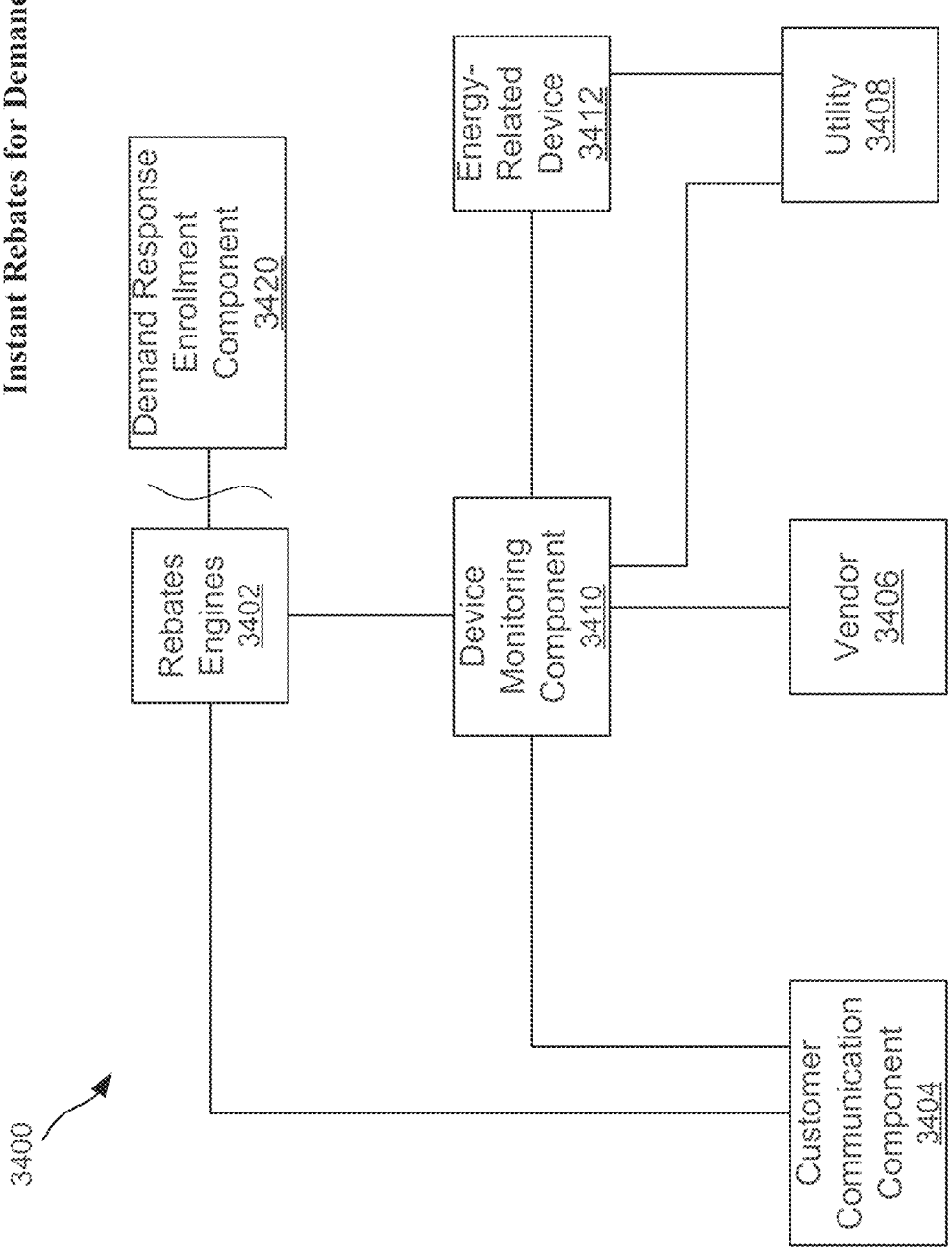
FIG. 34 illustrates a system for implementing instant rebates for demand response enrollment in accordance with embodiments discussed herein.

FIG. 34 illustrates a system for implementing instant rebates for demand response enrollment. The demand response instant rebate system 3400 may include rebates engine 3402, customer communication device 3404, vendor 3406, utility 3408, device monitoring component 3410, customer energy-related device 3412, and demand response enrollment component 3420. Rebates engine 3402 may incorporate instant rebate generation systems, methods, and apparatuses such as those of the instant rebate system 102 (see FIG. 1). Accordingly, all previous discussion of instant rebate system 102 in relation to instant rebate eligibility and delivery at the time of checkout for energy-related devices is incorporated by reference into this discussion of instant demand response rebates. Such rebates may be immediate financial discounts at the time of purchase of the energy-related device and/or enrollment in the demand response program, but may also include recurring financial incentive (e.g. monthly or annual bill discounts), a free product, or points for a customer rewards program, to name a few non-limiting examples.

Rebates engine 3402 may communicate with device monitoring component 3410. Device monitoring component 3410 may be a third-party service, such as Energy Hub, AutoGrid or other suitable services, that directly monitors energy-related devices (e.g., through the Internet and a network connection to the energy-related device). Such energy-related devices may be smart thermostats, such as NEST or ECOBEE thermostats, or other smart energy-related devices including electric vehicle chargers, electric water heaters with smart controllers, WIFI connected lighting, smart plugs, smart power strips, and other appliances on the home's WIFI network. Device monitoring component 3410 may monitor the energy-related device's internet connection and usage data via APIs associated with the energy-related device provided by the energy-related device vendor to determine if the energy-related device is connected to a WIFI network and operational. When a customer purchases a qualifying energy-related device, rebates engine 3402 may obtain one or more of the following pieces of information, for instance, from demand response enrollment component 3420 and pass it to device monitoring component 3410: purchase date; fulfillment date; energy-related device model; energy-related device ID (e.g., device serial number); and customer account number. Additionally, rebates engine 3402 may communicate with device monitoring component 3410 to confirm that the energy-related device has been installed through device monitoring component 3410's APIs with the energy-related device vendors. Data obtained from device monitoring component 3410 may be shared with, and accessed by, customer communication device 3404, vendor 3406, and/or utility 3408. Device monitoring component 3410 may provide one or more of the following to rebates engine 3402: confirmation the energy-related device 3412 has been installed and is configured for demand response with the utility 3406; energy-related device 3412 identification (e.g., serial number); and customer service account number of the installed energy-related device. Rebates engine 3402 also may be in communication with a demand response enrollment component 3420.

Figure 35:
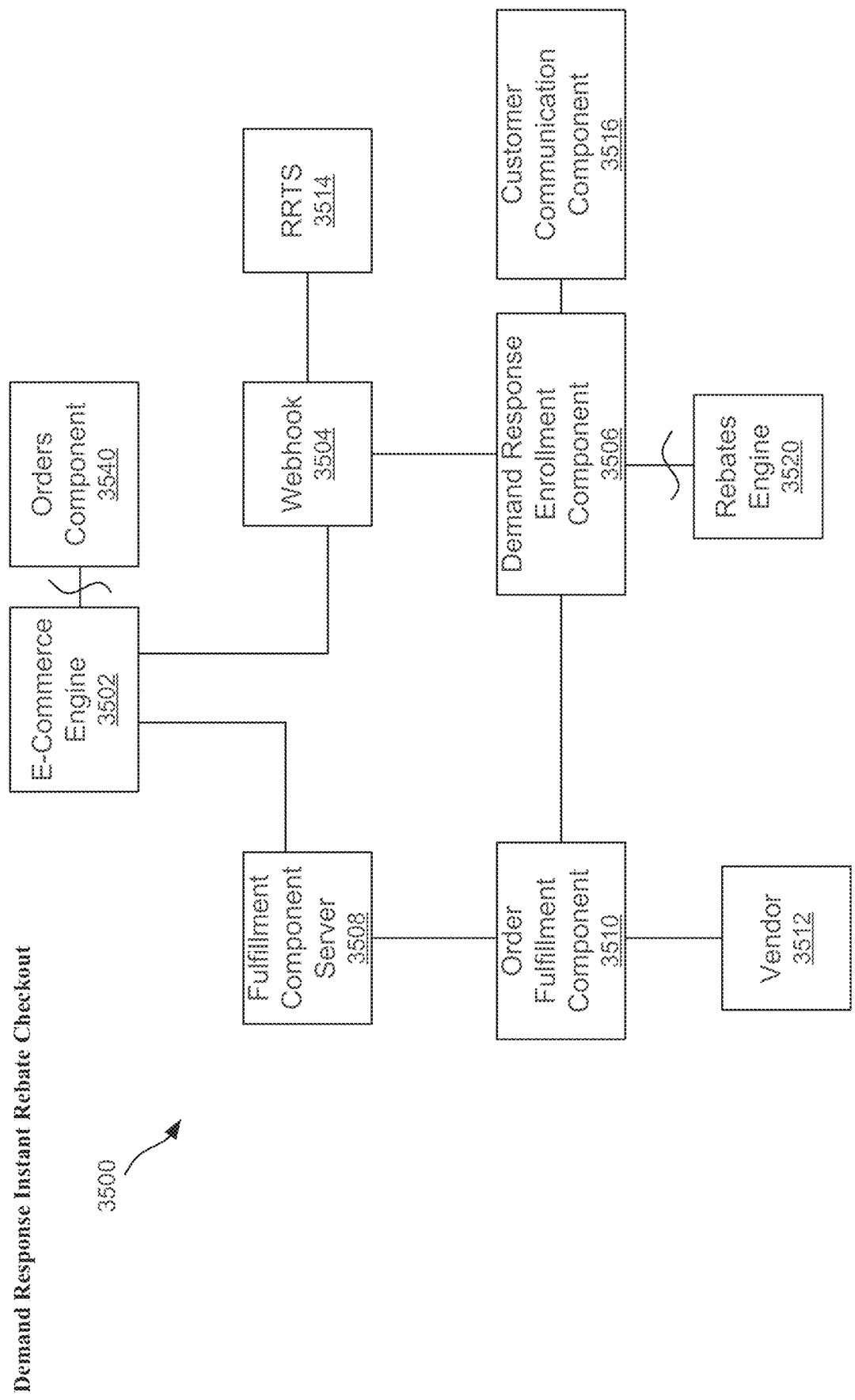
FIG. 35 illustrates a system for demand response instant rebate checkout in accordance with embodiments discussed herein.
Figure 36:
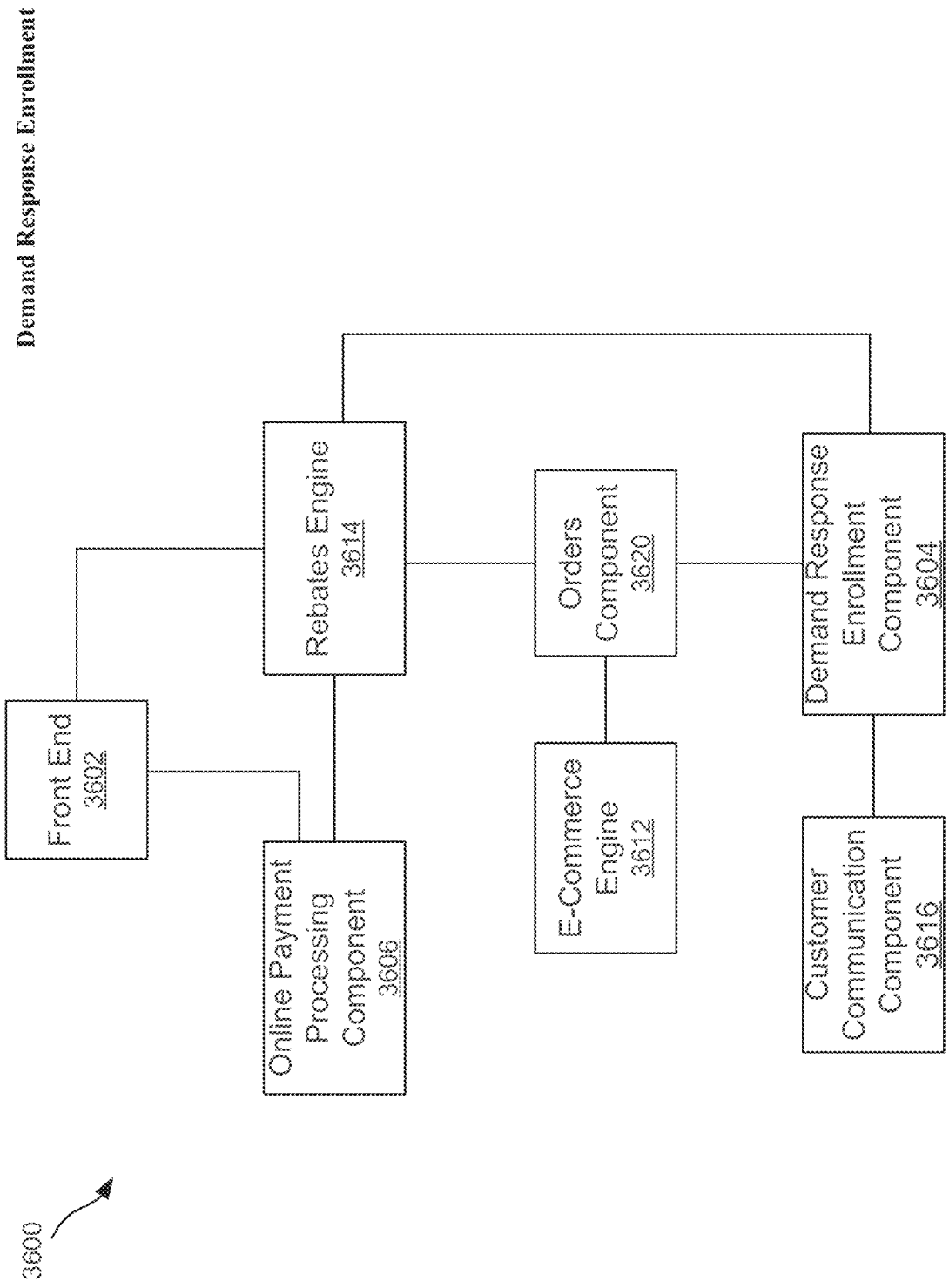
FIG. 36 illustrates system for demand response enrollment in accordance with embodiments discussed herein.

Demand response enrollment component 3420 may be the same as demand response enrollment component 3506 as discussed in relation to FIG. 35, and/or demand response enrollment component 3604 as discussed in relation to FIG. 36. Demand response enrollment component 3420 may confirm that an energy-related device has been enrolled in demand response. Additionally, rebates engine 3402 may supply information to demand response enrollment component 3420 to confirm that the energy-related device has been installed and is operational, as supplied through device monitoring component 3410. In an embodiment, demand response enrollment component 3420 may record and/or access any one or more of the following upon a customer purchase of an energy-related device, for instance, from rebates engine 3402: energy-related device's SKU, order number, retailer, and/or serial numbers. Once an order of an energy-related device is completed, rebates engine 3402 may pass one or more of the following to vendor 3406: CUSTOMER_REF_ID; PROGRAM_ENROLLMENT; and TC_ACCEPT_TIMESTAMP.

Rebates engine 3402 may also carry out auto-enrollment of a customer in the NEST Rush Hour Rewards program by adding an "opt-in date" field to orders of NEST energy-related devices which are enrolled in the Rush Hour Rewards program by rebates engine 3402's bulk store API. This may be presented to the customer similarly to the terms and conditions requirements of front end 3602 as discussed and illustrated in FIG. 36 below. Alternatively, rebates engine 3402 may enable the customer to purchase an energy-related device without enrolling in a demand response program or NEST Rush Hour Rewards program and enroll the device(s) at a later date in such programs. If a customer purchases two energy-related devices, the customer may be eligible for two rebates and both devices may be enrolled in the demand response program separately from one another.

Demand Response Instant Rebate Checkout

FIG. 35 illustrates an embodiment of a system for demand response instant rebate checkout. Demand response instant rebate checkout system 3500 may include e-commerce engine 3502, webhook 3504, demand response enrollment component 3506, fulfillment company server 3508, order fulfillment component 3510, vendor 3512, RRTS 3514, customer communication component 3516, rebates engine 3520, and orders component 3540. Rebates engine 3520 may be the same as rebates engine 3402 and/or 3614. Demand response enrollment component 3506 may be the same as demand response enrollment component 3420 and/or demand response enrollment component 3604. Demand response instant rebate checkout system 3500 may govern checkout and fulfillment of the order of an energy-related device including pre-enrollment in demand response at the time of checkout. Additionally, demand response instant rebate checkout system 3500 may supply information to be utilized by demand response instant rebate system 3400 to issue rebates for enrolling the energy-related device in demand response as well as communicating with demand response enrollment system 3600 to finalize enrollment of the energy-related device in demand response.

E-commerce engine 3502 may be in communication with orders component 3540. Orders component 3400 may be the same as orders component 3620 as illustrated and discussed in FIG. 36. Orders component 3540 may pass information regarding the transaction of an energy-related device to instant rebate checkout system 3500 through e-commerce engine 3502 (e.g., see the interface generated by an embodiment of the e-commerce engine 3502 at FIG. 39). Such an e-commerce engine may be Shopify or other e-commerce type engines. E-commerce engine 3502 may then pass the order information to rebate redemption transaction service (RRTS) 3514 and demand response enrollment component 3506. The passing of information from e-commerce engine 3502 to RRTS 3514 and demand response enrollment component 3506 may be accomplished via e-commerce engine 3502's communication with webhook 3504. Webhook 3504 may be customized to fit certain e-commerce engines, such as Shopify or other suitable e-commerce sites. RRTS 3514 may be a logging component that stores information regarding all rebates for energy-related devices, including rebates for purchasing energy-related devices and/or enrolling in demand response. Demand response enrollment component 3506 may also log relevant info about an order of an energy-related device, such as, but not limited to, SKU, order number, retailer, and serial number for the energy-related device purchased. Demand response enrollment component 3506 may also be in communication with rebates engine 3520. Rebates engine 3520 may be the same as rebates engine 3402 and/or rebates engine 3614. Rebates engine 3520 may provide information to demand response enrollment component 3506 including an energy-related device's SKU, order number, retailer, and/or serial numbers.

E-commerce engine 3502 may additionally communicate with fulfillment company server 3508 regarding the purchase of the energy-related device. Such a fulfillment company server may be Ship Fusion or other suitable fulfillment company servers. Fulfillment company server 3508 may pass the information supplied by e-commerce engine 3502 to order fulfillment component 3510. Order fulfillment component 3510 may be in communication with demand response enrollment component 3506 and may query demand response enrollment component 3506 to determine if a matching order of an energy-related device exists. This may be accomplished by order fulfillment component 3510 checking all orders from the fulfillment company server 3508 to determine if an order of an energy-related product is associated with a corresponding demand response enrollment. If a match is found between demand response enrollment component 3506 and fulfillment company servers 3508 on an order of an energy-related device, then order fulfillment component 3510 may request a product serial number from vendor 3512 or third-party shipper (e.g., SHIP FUSION). Such a vender may be NEST, ECOBEE, RHEEM, TESLA or other energy-related device vendors. This request can be accomplished through communication via vendor 3512 with order fulfillment component 3510 if the vendor drop ships the product or via the third-party shipper if shipped via that method. Such a request may be a periodic request (e.g., twice a day) that is made until vendor 3512 or third-party shipper identifies an energy-related device that is being, will be, or has been shipment to the customer. Additionally, through the communication of vendor 3512 or third-party shipper with order fulfillment component 3510, order fulfillment component 3510 may inform vendor 3512 of the quantity of energy-related devices ordered, and thus how many orders vendor 3512 must fill. Once vendor 3512 has identified the energy-related device being shipped, the serial number of said energy-related device may be passed back to order fulfillment component

3510. Order fulfillment component 3510 may then pass this information to demand response enrollment component 3506. Demand response enrollment component 3506 may then pre-enroll the energy-related device in demand response. In other words, the energy-related device can be paired with or put in communication with the utility company before being shipped. In another embodiment, identification of the energy-related device can be passed to the utility company such that the utility company can initiate communication with the energy-related device as soon as it is installed and connected to WIFI or the Internet. Alternatively, the energy-related device can be enrolled after being installed. Demand response enrollment is completed by demand response enrollment system 3600 and is discussed in relation to FIG. 36 below.

Once an energy-related device associated with the instant rebate transaction has been identified by vendor 3512, communication with the customer may take place via customer communication component 3516. Customer communication component 3516 (e.g., an e-mail server) may initiate an email campaign, or other suitable communication campaign method, to encourage and remind the customer to install the energy-related device before a demand response rebate deadline. Such a rebate deadline may be fifty days, sixty days, or more or less than these amounts after purchase of the energy-related device. Customer communication component 3516's reminders may continue until either (1) the customer installs the device, which is confirmed via the device monitoring component 3410's communication with rebates engine 3520, or (2) the rebate deadline lapses. Alternatively, the communication may terminate if the customer returns the energy-related device. If the customer purchases two energy-related devices, two individual paths may be initiated for each energy-related device such that two chains of reminders will continue to be sent by customer communication component 3516 until each individual energy-related device is installed, returned, or the installation deadline passes on each energy-related device. Such communications can reference the two energy-related devices specifically as to designate the difference between the two energy-related devices. In the event that the customer either fails to install the energy-related device (as confirmed by device monitoring component 3410's communication with rebates engine 3520), or if the energy-related device is returned, demand response enrollment may be terminated. Since there has been no match of an installed energy-related device between demand response enrollment component 3506 and e-commerce engine 3502, there is no enrollment in the program.

Demand Response Enrollment

FIG. 36 illustrates a system for demand response enrollment. Demand response enrollment system 3600 may include front end 3602, demand response enrollment component 3604, online payment processing component 3606, rebates engine 3614, e-commerce engine 3612, rebates engine 3614, customer communication component 3616, and orders component 3620. Demand response enrollment component 3604 may be the same as demand response enrollment component 3420 and/or demand response enrollment component 3506. Rebates engine 3614 may be the same as rebates engine 3402 and/or 3520, and e-commerce engine 3612 may be the same as e-commerce engine 3502. Demand response enrollment system 3600 may enroll an energy-related device in demand response at the time of purchase of the energy-related device. Demand response enrollment system 3600 may also be incorporated into rebate system 3400 through rebates engine 3614 (e.g., where 3402=3614), which may issue an instant rebate on qualifying energy-related devices upon checkout. Demand response enrollment system 3600 may also be incorporated into demand response instant rebate checkout system 3500 through e-commerce engine 3612 to fulfill the order of a demand response enrolled energy-related device (e.g., 3612=3502). Additionally, demand response enrollment system 3600 may claw back, or recoup costs of, the rebates applied by instant rebates system 3400 to the energy-related device at the time of purchase. This claw back may be accomplished in a variety of scenarios including if the customer fails to install the energy-related device, or if the customer returns the energy-related device.

Front end 3602 may receive a customer's purchase selection of an energy-related device and correspondingly initiate checkout. The front end 3602 may be embodied in software, hardware, firmware, or a combination thereof at a customer device such as a smartphone, tablet, laptop, or desktop computer. The front end 3602 may be a web browser. Front end 3602 may be in communication with rebates engine 3614. Rebates engine 3614 may verify rebate eligibility utilizing the systems, methods, and/or apparatuses as discussed in relation to instant rebate system 102. All previous discussion of instant rebate eligibility determination is incorporated herein by reference. Rebates engine 3614 may verify that the customer is eligible to receive a given rebate. Additionally, rebates engine 3614 may verify availability for rebates applicable to the specific energy-related device. Such rebates may be for energy-related device purchase rebates and/or rebates for enrolling in a demand response program. The rebates may be immediate financial discounts at the time of purchase of the energy-related device but may also include recurring financial incentive (e.g. monthly or annual bill discount), a free product, or points for a customer rewards program. Once rebates engine 3614 has confirmed that the customer is eligible for rebate(s) and either or both types of rebates are available, front end 3602 may apply the rebate deduction(s) to the customer's shopping cart instantly utilizing the instant rebate methods, systems, and/or apparatuses as discussed in relation to instant rebate system 102.

Front end 3602 may then present a list of terms and conditions that the customer must agree to before pre-enrollment and receipt of the demand response instant rebate (or applied to the customer's shopping cart in the front end 3602). Such terms and conditions of the rebate may include, but are not limited to: (1) this energy-related device will control central air conditioning in customer's home; (2) this energy-related device will be connected to Wi-Fi in customer's home; (3) this energy-related device will remain enrolled in the program for at least two weeks; (4) customer agrees to let the utility make brief, limited adjustments to customer's connected energy-related device during times of peak electric demand; (5) customer certifies that he/she is an residential customer of given utility with a service account in a corresponding state or region; (6) the energy-related device will be installed in customer's permanent residence located in state/region and serviced by given utility; (7) customer understands that by claiming this rebate, customer is not eligible for additional rebates through any other Energy Efficiency programs in given state for this product type; and (8) customer agrees to the vendor conditions of the energy-related device. Additionally, the customer may agree to install the energy-related device within a set time after purchase of the energy-related device. Such a set time period may be regarded as a rebate deadline. Such a rebate deadline may be fifty days, sixty days, or more or less than these amounts after the purchase of the energy-related device.

Once the customer has agreed to the terms and conditions and finished the purchase at front end 3602, payment processing of the energy-related device may be conducted by an online payment processing component 3606. Such online payment processing component may be STRIPE or other suitable online payment processing systems. Online payment processing component 3606 may verify valid payment of the customer for the energy-related device and pass a confirmation indication to front end 3602. Once confirmation is received, front end 3602 may communicate with rebates engine 3614 to confirm the order. Rebates engine 3614 may then serve as a broker of information to orders component 3620. Orders component 3620 may receive the customer order information regarding the energy-related device from rebates engine 3614 and may manage the lifecycle of the order. Orders component 3620 may also be in communication with e-commerce engine 3612. E-commerce engine 3612 may verify fulfillment of the order of an energy-related device, as discussed in relation to, and illustrated in, FIG. 35. Orders component 3620 may then communicate with demand response enrollment component 3604. Rebates engine 3614 may also pass confirmation of the customer's agreement to the terms and conditions required for demand response enrollment and confirmation of payment to order component 3620, which then passes these confirmations to demand response enrollment component 3604. This information confirms that the purchased energy-related device and customer is eligible for demand response enrollment.

The eligibility steps described above may further be embodied in a method of instant demand response eligibility, which may begin with ingesting customer and rebate data from one or more utility companies, via an ingest subsystem, to form normalized customer data and normalized rebate data, wherein the normalized rebate data includes rebate rules specific to ones of the one or more utility companies. This method may further include storing persistent utility rebate rules in a rebates database, wherein the persistent utility rebate rules constitute rebate eligibility parameters; and storing runtime rebate rules in the rebates database, wherein the runtime rebate rules represent rebate eligibility parameters for a provider of energy-related products and are customer-specific. The method may further include applying, via a rules engine, the persistent utility rebate rules to the normalized rebate data to generate rebate profiles, and storing the rebate profiles in the rebate database, wherein the rebate profiles include a plurality of rebate eligibilities for a plurality of redemption scenarios, and wherein each rebate profile is not customer-specific. When a customer initiates a transaction, the method can query, via the rules engine, the rebates database for ones of the rebate profiles corresponding to a customer identification received from an API of a frontend client service. The method can then apply, via the rules engine, the runtime rebate rules to the rebate profiles to identify one or more customer-specific rebate, wherein the one or more customer-specific rebates is a demand response enrollment rebate and/or an energy-related device purchase rebate. The method may then return, via the rules engine, the customer-specific rebate to the API, so that the one of the frontend client services that provided the customer identification can apply the customer-specific rebate(s) to the customer's purchase.

Once eligibility of the energy-related device and customer is confirmed by demand response enrollment component 3604, the customer may finish checkout and the vendor can ship the product to the customer.

The demand response enrollment component 3604 may then communicate with the customer via a customer communication component 3616 to ensure that the device is installed and connected to the utility. This communication may be the same communication initiated in system 3500 and system 3600. Customer communication component 3616 may initiate an email campaign, or other suitable communication campaign methods, to encourage and remind the customer to install the energy-related device before a demand response rebate deadline. Such a rebate deadline may be fifty days, sixty days, or more or less than these amounts, after the purchase of an energy-related device. Customer communication component 3616's reminders may continue until either the customer installs the device as confirmed by rebates engine 3614, or the rebate deadline lapses. Alternatively, the communication may terminate if the customer returns the energy-related device. If the customer purchases two energy-related devices, two individual paths may be taken for each energy-related device such that two chains of reminders will continue to be sent by customer communication component 3616 until each individual energy-related device is installed, returned, or the installation deadline passes on each energy-related device. Such communications may reference the two energy-related devices specifically as to designate the difference between the two energy-related devices.

Demand response enrollment component 3604 may then communicate with rebates engine 3614. Rebates engine 3614, through its communication with vendors, utilities, and energy-related devices (as discussed in relation to rebate system 3400) may return confirmation of the energy-related devices installation and connection to a WIFI network. For instance, the rebates engine 3614 may periodically ping the energy-related device to see if the device has been installed, is optionally controlling another device such as HVAC or a water heater, and is acting as an interface between the energy saving device or controlled device and the utility. Once demand response enrollment component 3604 receives confirmation that the energy-related device has been installed and is providing a network connection between the utility and the energy-related device or a device that the energy-related device controls, from rebates engine 3614, it may finalize demand response enrollment of the energy-related device. However, if the demand response rebate deadline has elapsed without this confirmation, or if the energy-related device has been returned, orders component 3620 may begin a claw-back procedure of the issued rebate to the customer on the energy-related device.

Claw-back of the demand response rebate may be initiated if rebates engine 3520 determines that the purchased energy-related device has either not been installed or not been connected so as to provide a network connection between the utility and the energy-related device or the device it controls. The rebates engine 3520 may then convey to the demand response enrollment component 3604 that installation requirements of the demand response program were not met by the rebate deadline. Demand response enrollment component 3604 may then communicate to order component 3620 that the customer has either returned the energy-related device or the deadline for installation of the energy-related device has passed (as confirmed by rebates engine 3614). Orders component 3620 may then communicate with rebates engine 3614 to initiate charging the customers payment method to recoup the checkout-applied rebate for the demand response enrollment. This may be accomplished via rebates engine 3614 communicating with online payment processing component 3606. Online payment processing component 3606 may be configured to charge the customer's credit card or other payment method to recover the instant rebate for the demand response applied to the energy-related device. However, other rebates, such as for purchase of the energy-related device as discussed in relation to instant rebate system 102, are retained by the customer (i.e., there is no claw-back for the device rebate). This enables demand response enrollment system 3600 to recoup the demand response rebate. Additionally, since there has been no confirmation between rebates engine 3614 and demand response enrollment component 3604 of an installed energy-related device, enrollment in demand response is terminated. If an energy saving device is defective and has been replaced by the manufacturer, claw-back will not be triggered. The returned defective energy-related device's demand response enrollment will be terminated via the same steps of clawing-back a disqualified energy-related device. However, the new energy-related device will substitute the defective energy-related device and all information regarding the defective energy-related device will be replaced (i.e., serial number, SKU number, etc.) in demand response enrollment system 3600 such that demand response enrollment may proceed normally. A new demand response rebate deadline will be initiated for the customer to install and complete demand response enrollment of the replacement energy-related device.

Figure 37:
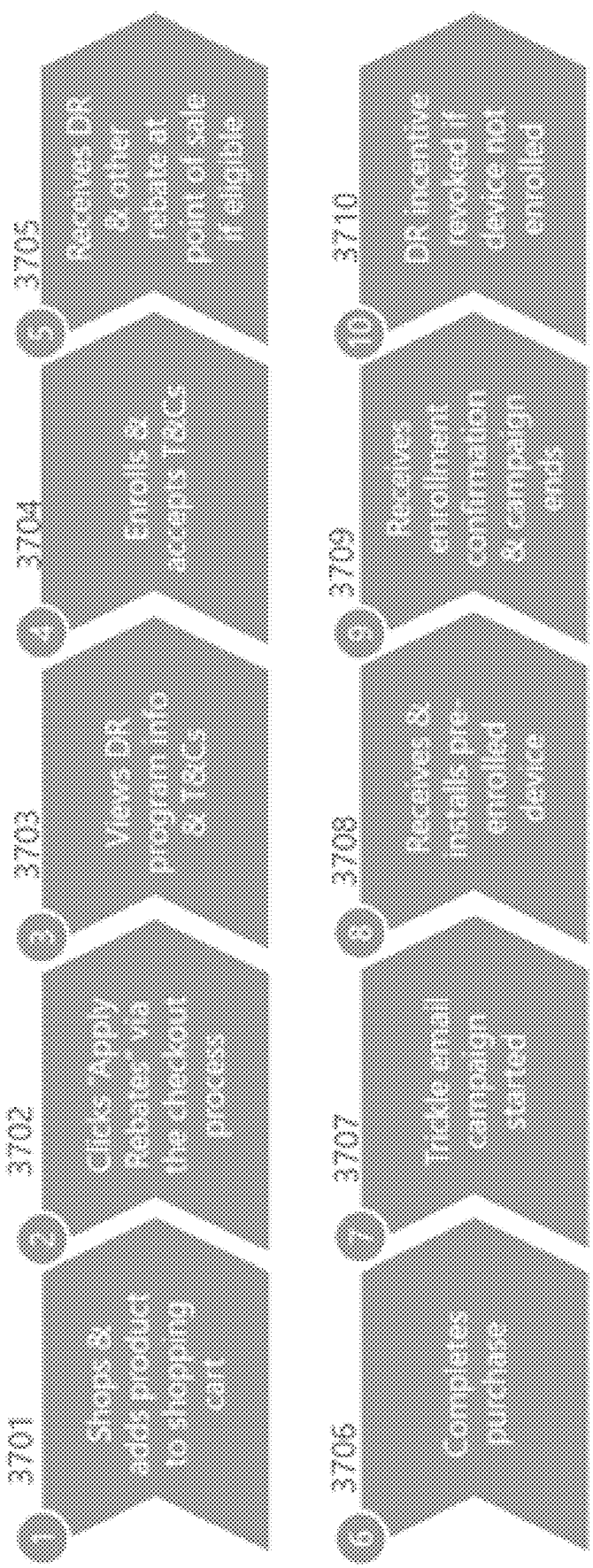
FIG. 37 illustrates an exemplary path of enrollment in a demand response program that a customer may follow in accordance with embodiments discussed herein.
Figure 38:
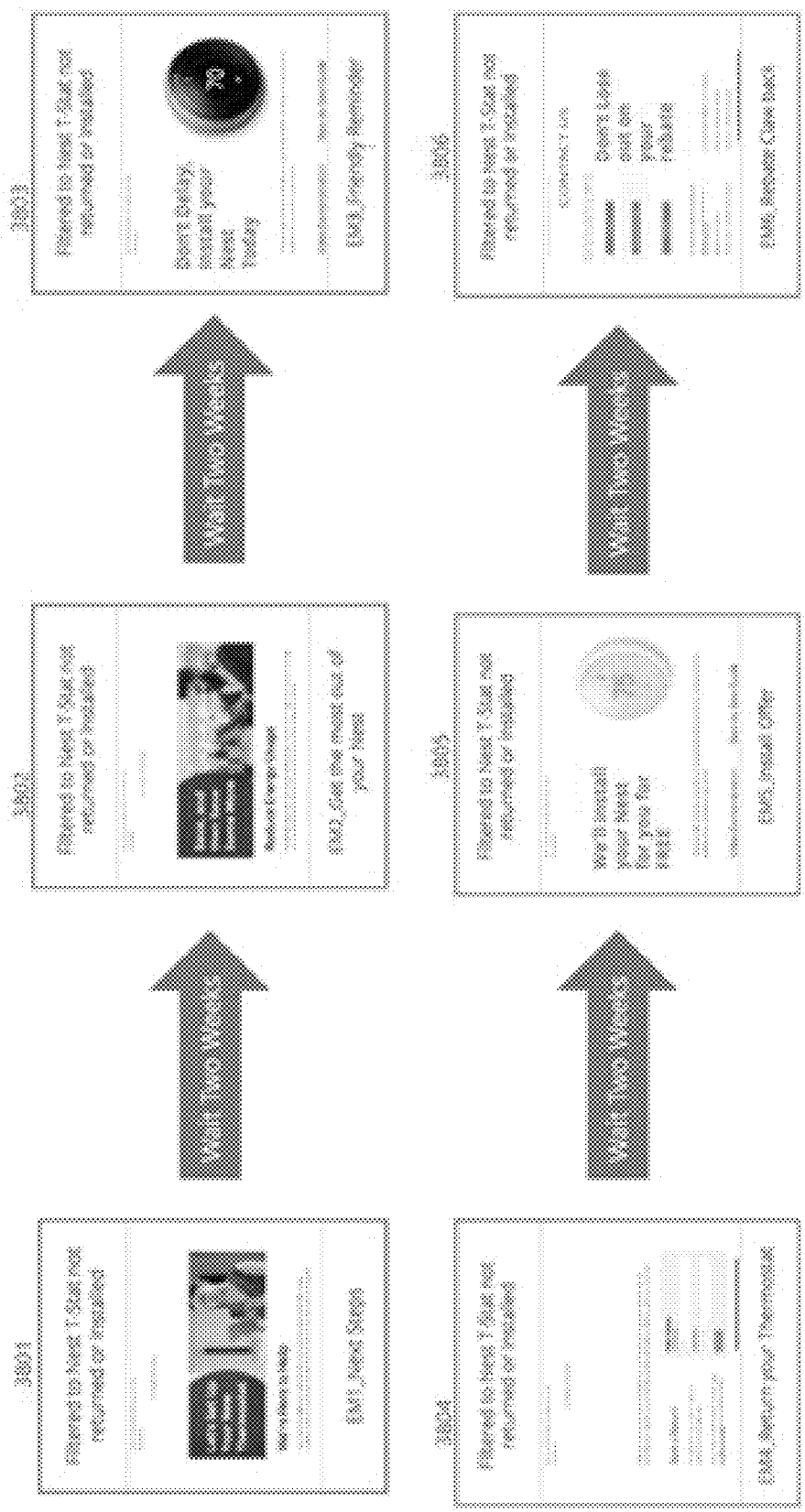
FIG. 38 illustrates an exemplary embodiment of an email campaign in accordance with embodiments discussed herein.

FIG. 37 illustrates an exemplary path of enrollment in a demand response program that a customer may follow. A customer may shop on an online retailer and add an energy saving product to a shopping cart at step 3701. A customer may then select an "apply rebates", or other similar function, at the checkout screen at step 3702. A customer may then view the terms and conditions of demand response, as discussed previously in reference to system 3600, and agree to such terms and conditions at step 3703. A customer may then receive the demand response rebate which may comprise immediate financial discounts at the time of purchase of the energy-related device but may also include recurring financial incentive (e.g. monthly or annual bill discounts), a free product, or points for a customer rewards program at step 3705. The customer may then complete the purchase of the qualifying energy-related device at step 3706. Upon the completion of purchase of an energy-related device, an email communication campaign to remind and encourage the customer to install the energy-related device may begin. An exemplary email campaign is shown in FIG. 38. The customer may receive the energy-related device, install the energy-related device at step 3708, and electronically connect the device to the utility. The customer may receive enrollment confirmation of the energy-related device's enrollment in demand response and the email communication campaign may end at step 3709. If the customer chooses not to enroll the device in demand response, for example by failing to install the energy-related device, or failing to electronically connect the device to the utility, the incentives may be clawed back and revoked at step 3710.

FIG. 38 illustrates an exemplary embodiment of an email campaign that system 3400 may initiate at the time of purchase of an energy-related device. At step 3801, a customer may receive an initial email reminder to install the energy-related device which may supply a URL link to installation assistance. After a determined time period, for example two weeks from the previous email, a customer may receive a second email reminder to install the energy-related device which may supply a URL link to energy-related device information at step 3802. After a determined time period, for example two weeks after the previous email, a customer may receive a third email reminder which may explicitly remind the customer of the agreed timeframe of installation (i.e. the rebate deadline) and the requirement of the customer to install the energy-related device at step 3803. After a determined time period, for example two weeks after the previous email, a customer may receive a fourth email which may present the customer with an option to return the energy-related device at step 3804. After a determined time period, for example two weeks after the previous email, a customer may receive a fifth email which may offer the customer the option for free installation of the energy saving product by a $3^{rd}$ party at step 3805. After a determined time period, for example two weeks after the previous email, a customer may receive a sixth email which may inform the customer of the loss of rebate and that claw-back (e.g., charging the customer the amount) of the initial demand response rebate has been initiated.

FIG. 39 illustrates an exemplary energy-related product selection view on an e-commerce website (e.g., Shopify), powered by an embodiment of the e-commerce engine 3502. Such product selection view may present the customer with demand response enrollment incentive information that may be selected at the time of checkout. The customer may be informed of the rebate amount and presented with the ability to instantly apply the rebate at the time of checkout.

Figure 40:
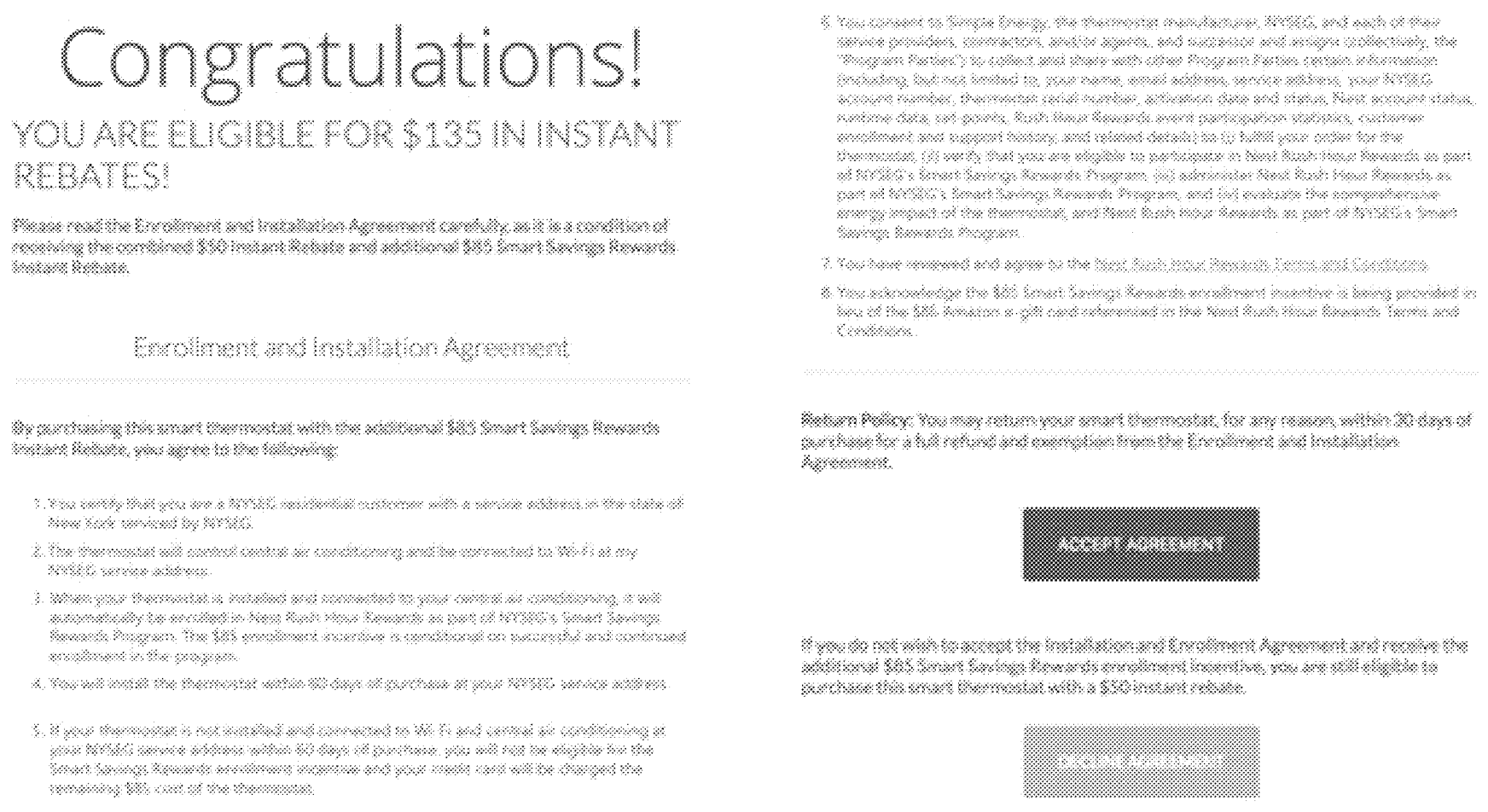

FIG. 40 illustrates an exemplary embodiment of a terms and conditions agreement view that a customer may agree to during demand response enrollment at the time of purchase of an energy-related device. The customer may be presented with the ability to agree to the terms and conditions instantly at the time of checkout by clicking on an agree selection on the web page.

FIG. 41 illustrates an exemplary confirmation view of an enrolled energy-related device that has been pre-enrolled in demand response at the time of purchase by the customer and instant rebates have been applied to the purchase. Instant rebates may be applied at the time of checkout utilizing the previously discussed methods of providing instant rebates and enrollment in demand response.

Figure 42:
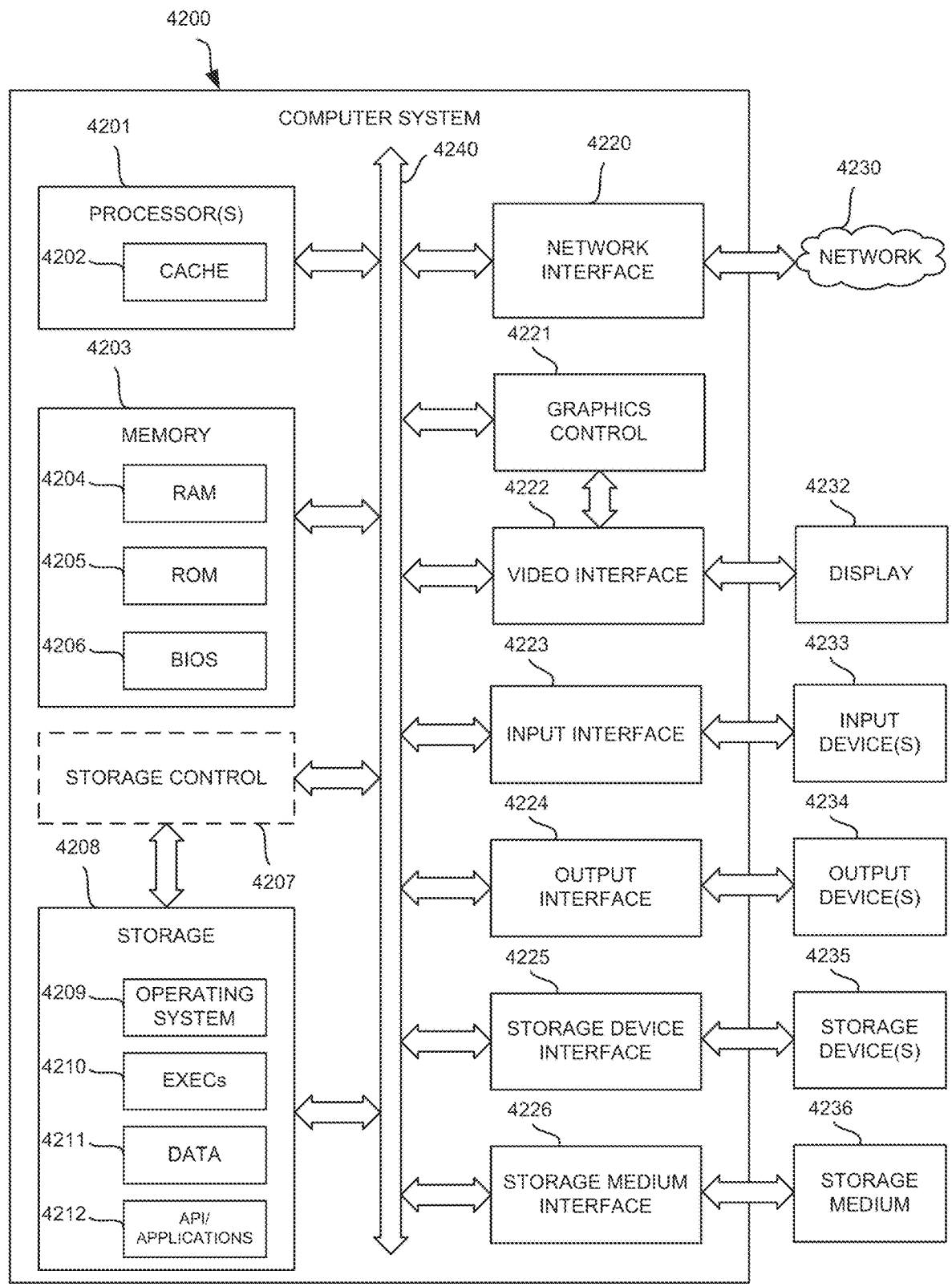
FIG. 42 shows a diagrammatic representation of one embodiment of a computer system within which a set of instructions can execute for causing a device to perform or execute any one or more of the aspects and/or methodologies of the present disclosure.

The systems and methods described herein can be implemented in a computer system in addition to the specific physical devices described herein. FIG. 42 shows a diagrammatic representation of one embodiment of a computer system 4200 within which a set of instructions can execute causing a device to perform or execute any one or more of the aspects and/or methodologies of the present disclosure. The instant rebate engine may operate on one implementation of the computer system 4200. The components in FIG. 42 are examples only and do not limit the scope of use or functionality of any hardware, software, firmware, embedded logic component, or a combination of two or more such components implementing particular embodiments of this disclosure. Some or all of the illustrated components can be part of the computer system 4200. For instance, the computer system 4200 can be a general-purpose computer (e.g., a laptop computer) or an embedded logic device (e.g., an FPGA), to name just two non-limiting examples.

Computer system 4200 includes at least a processor 4201 such as a central processing unit (CPU) or an FPGA to name two non-limiting examples. A processor for running the instant rebate engine is one implementation of the processor 4201. The computer system 4200 may also comprise a memory 4203 and a storage 4208, both communicating with each other, and with other components, via a bus 4240. The bus 4240 may also link a display 4232, one or more input devices 4233 (which may, for example, include a keypad, a keyboard, a mouse, a stylus, etc.), one or more output devices 4234, one or more storage devices 3435, and various non-transitory, tangible computer-readable storage media 4236 with each other and with one or more of the processor 4201, the memory 4203, and the storage 4208. These elements may interface directly or via one or more interfaces or adaptors to the bus 4240. For instance, the various non-transitory, tangible computer-readable storage media 4236 can interface with the bus 4240 via storage medium interface 4226. Computer system 4200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 4201 (or central processing unit(s) (CPU(s))) optionally contains a cache memory unit 4202 for temporary local storage of instructions, data, or computer addresses. Processor(s) 4201 are configured to assist in execution of computer-readable instructions stored on at least one non-transitory, tangible computer-readable storage medium. Computer system 4200 may provide functionality as a result of the processor(s) 4201 executing software embodied in one or more non-transitory, tangible computer-readable storage media, such as memory 4203, storage 4208, storage devices 4235, and/or storage medium 4236 (e.g., read only memory (ROM)). For instance, a method for operating the validation engine 300, the ingest subsystem 306, or the demand response enrollment component 3506 may be embodied in one or more non-transitory, tangible computer-readable storage media. The non-transitory, tangible computer-readable storage media may store software that implements particular embodiments, such as the methods for operating the instant rebate engine, and processor(s) 3401 may execute the software. Memory 4203 may read the software from one or more other non-transitory, tangible computer-readable storage media (such as mass storage device(s) 4235, 4236) or from one or more other sources through a suitable interface, such as network interface 4220. One embodiment of the network interface 4220 may be used to communicate info from the ingest subsystem 306 to utilities, or from the validation engine 300 to retailers, manufacturers, and frontends 338. The software may cause processor(s) 4201 to carry out one or more processes or one or more steps of one or more processes described or illustrated herein. Carrying out such processes or steps may include defining data structures stored in memory 4203 and modifying the data structures as directed by the software (e.g., modifying the rebated database 314). In some embodiments, an FPGA can store instructions for carrying out functionality as described in this disclosure (e.g., the methods for operating the validation engine 300, the ingest subsystem 306, or the demand response enrollment component 3506). In other embodiments, firmware includes instructions for carrying out functionality as described in this disclosure (e.g., the methods for operating the validation engine 300, the ingest subsystem 306, or the demand response enrollment component 3506).

The memory 4203 may include various components (e.g., non-transitory, tangible computer-readable storage media) including, but not limited to, a random access memory component (e.g., RAM 4204) (e.g., a static RAM "SRAM", a dynamic RAM "DRAM, etc.), a read-only component (e.g., ROM 4205), and any combinations thereof. ROM 4205 may act to communicate data and instructions unidirectionally to processor(s) 4201, and RAM 4204 may act to communicate data and instructions bidirectionally with processor(s) 4201. ROM 4205 and RAM 4204 may include any suitable non-transitory, tangible computer-readable storage media described below. In some instances, ROM 4205 and RAM 4204 include non-transitory, tangible computer-readable storage media for carrying out the methods for operating the validation engine 300, the ingest subsystem 306, or the demand response enrollment component 3506. In one example, a basic input/output system 4206 (BIOS), including basic routines that help to transfer information between elements within computer system 4200, such as during start-up, may be stored in the memory 4203.

Fixed storage 4208 is connected bidirectionally to processor(s) 4201, optionally through storage control unit 4207. Fixed storage 4208 provides additional data storage capacity and may also include any suitable non-transitory, tangible computer-readable media described herein. Storage 4208 may be used to store operating system 4209, EXECs 4210 (executables), data 4211, API applications 4212 (application programs), and the like. For instance, the storage 4208 could be implemented for storage of rebate rules, rebate profiles, and/or customer data as described above. Often, although not always, storage 4208 is a secondary storage medium (such as a hard disk) that is slower than primary storage (e.g., memory 4203). Storage 4208 can also include an optical disk drive, a solid-state memory device (e.g., flash-based systems), or a combination of any of the above. Information in storage 4208 may, in appropriate cases, be incorporated as virtual memory in memory 4203.

In one example, storage device(s) 4235 may be removably interfaced with computer system 4200 (e.g., via an external port connector (not shown)) via a storage device interface 4225. Particularly, storage device(s) 4235 and an associated machine-readable medium may provide nonvolatile and/or volatile storage of machine-readable instructions, data structures, program modules, and/or other data for the computer system 4200. In one example, software may reside, completely or partially, within a machine-readable medium on storage device(s) 4235. In another example, software may reside, completely or partially, within processor(s) 4201.

Bus 4240 connects a wide variety of subsystems. Herein, reference to a bus may encompass one or more digital signal lines serving a common function, where appropriate. Bus 4240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 4200 may also include an input device 4233. In one example, a user of computer system 4200 may enter commands and/or other information into computer system 4200 via input device(s) 3433. Examples of an input device(s) 4233 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 4233 may be interfaced to bus 4240 via any of a variety of input interfaces 4223 (e.g., input interface 4223) including, but not limited to, serial, parallel, game port, USB, FIREWIRE, THUNDERBOLT, or any combination of the above.

In particular embodiments, when computer system 4200 is connected to network 4230 (such as a network between the validation engine 300 and the frontends 338 or between the ingest subsystem 306 and the utilities 302), computer system 4200 may communicate with other devices, such as mobile devices and enterprise systems, connected to network 4230. Communications to and from computer system 4200 may be sent through network interface 4220. For example, network interface 4220 may receive incoming communications (such as requests or responses from other devices) in the form of one or more packets (such as Internet Protocol (IP) packets) from network 4230, and computer system 4200 may store the incoming communications in memory 4203 for processing. Computer system 4200 may similarly store outgoing communications (such as requests or responses to other devices) in the form of one or more packets in memory 4203 and communicated to network 4230 from network interface 4220. Processor(s) 4201 may access these communication packets stored in memory 4203 for processing.

Examples of the network interface 4220 include, but are not limited to, a network interface card, a modem, and any combination thereof. Examples of a network 4230 or network segment 4230 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 4230, may employ a wired and/or a wireless mode of communication. In general, any network topology may be used.

Information and data can be displayed through a display 4232. Examples of a display 4232 include, but are not limited to, a liquid crystal display (LCD), an organic liquid crystal display (OLED), a cathode ray tube (CRT), a plasma display, and any combinations thereof. The display 4232 can interface to the processor(s) 4201, memory 4203, and fixed storage 4208, as well as other devices, such as input device(s) 4233, via the bus 4240. The display 4232 is linked to the bus 4240 via a video interface 4222, and transport of data between the display 4232 and the bus 4240 can be controlled via the graphics control 4221.

In addition to a display 4232, computer system 4200 may include one or more other peripheral output devices 4234 including, but not limited to, an audio speaker, a printer, and any combinations thereof. Such peripheral output devices may be connected to the bus 3440 via an output interface 4224. Examples of an output interface 4224 include, but are not limited to, a serial port, a parallel connection, a USB port, a FIREWIRE port, a THUNDERBOLT port, and any combinations thereof.

In addition or as an alternative, computer system 4200 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods for operating the validation engine 300, the ingest subsystem 306, or the demand response enrollment component 3506) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for enrolling an energy-related device in a demand response program during checkout and generating an instant demand response rebate during the checkout, the method comprising:
    receiving a purchase selection of a customer of an energy-related device at a front end device;
    verifying, via a rebates engine, eligibility of the energy-related device and customer for a demand response rebate and a demand response enrollment, both the demand response rebate and demand response enrollment associated with a utility;
    applying the demand response rebate to the energy-related device at the front end device during purchase of the energy-related device;
    communicating, via the rebates engine, a confirmed order to an orders component;
    communicating, via the orders component, the confirmed order of the energy-related device to an e-commerce engine and a demand response enrollment component;
    generating, via a vendor and the e-commerce engine, an identification of the energy-related device;
    initiating, via a customer communication component, an email communication campaign with the customer;
    communicating the energy-related device's identification information to the rebates engine;
    confirming, via the rebates engine, an installation and a communication between the energy saving device and the utility, wherein the confirming the installation and the communication comprises remotely determining, based at least in part on the energy-related device's identification information, whether the energy-related device is connected to a network and is operational;
    communicating, via the rebates engine, confirmation of the installation and the communication to the demand response enrollment component; and
    ending, via the customer communication component, the email communication campaign.

2. The method of claim 1, further comprising presenting a demand response terms and conditions list at the front end and receiving a demand response terms and conditions agreement at the front end.

3. The method of claim 1, wherein the generating further comprises:
    communicating, via the e-commerce engine, the confirmed order of the energy-related device to a fulfillment company server, the demand response enrollment component, and a logging component;
    communicating, via the fulfillment company server and an orders fulfillment component, the confirmed order of the energy-related device to the vendor;
    identifying and communicating an identification of the energy-related device, at the vendor, to the orders fulfillment component and then on to the demand response enrollment component.

4. The method of claim 3, wherein the confirmed order of the energy saving device is communicated to the demand response enrollment component and the logging component via a webhook.

5. The method of claim 3, further comprising enrolling the energy-related device in a demand response program of the utility before the vendor ships the energy-related device.

6. The method of claim 3, further comprising enrolling the energy-related device in a demand response program of the utility after the vendor ships the energy-related device.

7. The method of claim 6, further comprising enrolling the energy-related device in the demand response program of the utility after the energy-related device is installed and is in communication with the utility.

8. The method of claim 1, wherein the confirmation of the installation and the communication further comprises:
    communicating, via the rebates engine, the energy-related device's identification information to a device monitoring component;
    checking, via an API of the device monitoring component with the vendor of the energy-related device, the installation and communication; and
    communicating, via the device monitoring component, confirmation of the installation and the communication to the rebates engine.

9. The method of claim 1 further comprising, communicating, via the rebates engine, confirmation of a non-installation or a non-communication to the demand response enrollment component, wherein the demand response enrollment component, after a rebate deadline, initiates a claw back of the demand response rebate.

10. The method of claim 9, wherein the claw back of the demand response rebate further comprises:
    communicating, via the demand response enrollment component, the non-installation or the non-communication to the orders component;
    generating, via the orders component, a recouping charge for the demand response rebate and communicating the recouping charge to the rebates engine;
    communicating, via the rebates engine, the recouping charge to the online payment processing component; and
    charging, via the online payment processing component, the amount of the recouping charge to the customer's online payment method.

11. The method of claim 1 further comprising, communicating, via the orders component, confirmation of a return of the energy-related device to the demand response enrollment component, wherein the demand response enrollment component initiates a claw back of the demand response rebate.

12. The method of claim 11, wherein the claw back of the demand response rebate further comprises:
    generating, via the orders component, a recouping charge for the demand response rebate and communicating the recouping charge to the rebates engine;
    communicating, via the rebates engine the recouping charge to the online payment processing component; and
    charging, via the online payment processing component, the amount of the recouping charge to the customer's online payment method.

* * * * *